US012300837B2

(12) United States Patent
Havskjold et al.

(10) Patent No.: US 12,300,837 B2
(45) Date of Patent: May 13, 2025

(54) MAGNETICALLY ATTACHABLE BATTERY PACK

(71) Applicant: Apple Inc., Cupertino, CA (US)

(72) Inventors: David G. Havskjold, Portola Valley, CA (US); Patrick T. Ryan, San Francisco, CA (US); Daniel A. Pfaff, San Bruno, CA (US); Emery A. Sanford, San Francisco, CA (US); Miranda L. Daly, Mountain View, CA (US); Demetrios B. Karanikos, San Francisco, CA (US); Geng Luo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/362,821

(22) Filed: Jun. 29, 2021

(65) Prior Publication Data
US 2022/0045398 A1 Feb. 10, 2022

Related U.S. Application Data

(60) Provisional application No. 63/083,288, filed on Sep. 25, 2020, provisional application No. 63/061,783, filed on Aug. 5, 2020.

(51) Int. Cl.
*H02J 50/90* (2016.01)
*H01F 7/02* (2006.01)
*H01M 50/244* (2021.01)
*H02J 50/10* (2016.01)

(52) U.S. Cl.
CPC ........ *H01M 50/244* (2021.01); *H01F 7/0221* (2013.01); *H02J 50/10* (2016.02); *H02J 50/90* (2016.02)

(58) Field of Classification Search
CPC .................................................. H02J 50/90
USPC ........................................................ 320/108
See application file for complete search history.

(56) References Cited

U.S. PATENT DOCUMENTS

| D296,440 | S | 6/1988 | Smith et al. |
|---|---|---|---|
| 4,865,285 | A | 9/1989 | Gaggianese |
| 6,149,116 | A | 11/2000 | Won |
| 6,888,940 | B1 | 5/2005 | Deppen |
| 7,374,142 | B2 | 5/2008 | Carnevali |
| 7,775,567 | B2 | 8/2010 | Ligtenberg et al. |
| 7,852,621 | B2 | 12/2010 | Lin et al. |

(Continued)

FOREIGN PATENT DOCUMENTS

| CN | 101771283 A | 7/2010 |
|---|---|---|
| CN | 102893495 A | 1/2013 |

(Continued)

OTHER PUBLICATIONS

First Examination Report (FER) dated Jun. 24, 2022 in Indian Patent Application No. 202114034999, 5 pages.

(Continued)

*Primary Examiner* — Edward Tso
*Assistant Examiner* — Ahmed H Omar
(74) *Attorney, Agent, or Firm* — Kilpatrick Townsend & Stockton LLP

(57) ABSTRACT

Battery packs that can provide power to an electronic device, can be easy to use and simple to connect to the electronic device, have a small and efficient form factor, and can readily be powered for use.

20 Claims, 43 Drawing Sheets

(56) References Cited

U.S. PATENT DOCUMENTS

| | | | |
|---|---|---|---|
| 8,073,324 B2 | 12/2011 | Tsai | |
| 8,558,411 B2 | 10/2013 | Baarman | |
| 8,688,037 B2 | 4/2014 | Chatterjee et al. | |
| 8,902,574 B2 | 12/2014 | Su | |
| 8,907,752 B2 | 12/2014 | Wodrich et al. | |
| 8,912,686 B2 | 12/2014 | Stoner et al. | |
| 9,025,318 B2 | 5/2015 | Ashcraft et al. | |
| 9,038,971 B1 | 5/2015 | Guthrie | |
| 9,063,693 B2 | 6/2015 | Raken et al. | |
| 9,106,083 B2 | 8/2015 | Partovi | |
| 9,112,364 B2 | 8/2015 | Partovi | |
| 9,158,384 B2 | 10/2015 | Whitt, III et al. | |
| 9,277,661 B2 | 3/2016 | Andre et al. | |
| 9,413,191 B2 | 8/2016 | Kim et al. | |
| 9,575,579 B2 | 2/2017 | Ashcraft et al. | |
| 9,627,130 B2 | 4/2017 | Golko et al. | |
| 9,778,700 B2 | 10/2017 | Zaloom | |
| 10,153,666 B2 | 12/2018 | Lee et al. | |
| 10,243,402 B2 | 3/2019 | Park et al. | |
| 10,273,942 B2 | 4/2019 | Nakamura | |
| 10,404,089 B2 | 9/2019 | Kasar et al. | |
| 10,418,839 B2 | 9/2019 | Miller | |
| 10,491,041 B2 | 11/2019 | Wittenberg et al. | |
| 10,615,552 B2* | 4/2020 | Miller | H04M 1/026 |
| 10,622,842 B2 | 4/2020 | Lee et al. | |
| 10,649,548 B2 | 5/2020 | Pirie et al. | |
| 10,703,297 B1 | 7/2020 | Cohen et al. | |
| 11,031,164 B2 | 6/2021 | Marshall et al. | |
| 11,342,800 B2 | 5/2022 | Oro et al. | |
| 11,349,346 B2 | 5/2022 | Han et al. | |
| 11,733,741 B2 | 8/2023 | Sung et al. | |
| 2008/0297328 A1 | 12/2008 | Crawford et al. | |
| 2009/0212637 A1* | 8/2009 | Baarman | H04B 5/79 307/104 |
| 2009/0278642 A1 | 11/2009 | Fullerton et al. | |
| 2010/0081377 A1 | 4/2010 | Chatterjee et al. | |
| 2010/0219217 A1 | 9/2010 | Andochick | |
| 2010/0252337 A1 | 10/2010 | Yang | |
| 2011/0310065 A1 | 12/2011 | Liang | |
| 2012/0068942 A1 | 3/2012 | Lauder | |
| 2012/0112553 A1 | 5/2012 | Stoner, Jr. et al. | |
| 2012/0146576 A1* | 6/2012 | Partovi | H02J 7/0044 320/108 |
| 2012/0306440 A1 | 12/2012 | Yeh | |
| 2013/0021729 A1 | 1/2013 | Su | |
| 2013/0099730 A1 | 4/2013 | Yoon | |
| 2013/0113423 A1 | 5/2013 | Baarman | |
| 2013/0187596 A1 | 7/2013 | Eastlack | |
| 2013/0260677 A1 | 10/2013 | Partovi | |
| 2013/0307470 A1 | 11/2013 | Watanabe et al. | |
| 2014/0029182 A1 | 1/2014 | Ashcraft et al. | |
| 2014/0049894 A1 | 2/2014 | Rihn et al. | |
| 2014/0242429 A1 | 8/2014 | Lee | |
| 2014/0354218 A1 | 12/2014 | Kaynar et al. | |
| 2015/0130412 A1 | 5/2015 | Partovi | |
| 2016/0040825 A1* | 2/2016 | Franklin | F16M 13/02 439/39 |
| 2016/0094076 A1 | 3/2016 | Kasar et al. | |
| 2016/0105047 A1 | 4/2016 | Cui | |
| 2016/0128210 A1 | 5/2016 | Lee | |
| 2016/0206065 A1 | 7/2016 | Ehrlich | |
| 2017/0005399 A1 | 1/2017 | Ito et al. | |
| 2017/0070076 A1 | 3/2017 | Karanikos | |
| 2017/0245040 A1 | 8/2017 | Hankey | |
| 2018/0039343 A1 | 2/2018 | Park | |
| 2018/0069358 A1 | 3/2018 | Miller et al. | |
| 2018/0248406 A1 | 8/2018 | Bae et al. | |
| 2018/0301936 A1 | 10/2018 | Lee et al. | |
| 2019/0089188 A1 | 3/2019 | Chien et al. | |
| 2019/0198212 A1 | 6/2019 | Levy | |
| 2019/0363565 A1 | 11/2019 | Graham et al. | |
| 2020/0192429 A1* | 6/2020 | Wu | G06F 1/166 |
| 2020/0346006 A1 | 11/2020 | Eigentler et al. | |
| 2021/0099026 A1 | 4/2021 | Larsson | |
| 2021/0099027 A1 | 4/2021 | Larsson | |
| 2021/0373615 A1 | 12/2021 | Sung et al. | |
| 2022/0014655 A1 | 1/2022 | Hu | |
| 2022/0147100 A1 | 5/2022 | Kashyap et al. | |
| 2023/0067384 A1 | 3/2023 | Thome et al. | |
| 2024/0085947 A1 | 3/2024 | Ruscher et al. | |

FOREIGN PATENT DOCUMENTS

| | | |
|---|---|---|
| CN | 103748765 A | 4/2014 |
| CN | 104467129 A | 3/2015 |
| CN | 105305525 A | 2/2016 |
| CN | 205670700 U | 11/2016 |
| CN | 106877429 A | 6/2017 |
| CN | 207442540 U | 6/2018 |
| CN | 207475658 U | 6/2018 |
| CN | 208581077 U | 3/2019 |
| CN | 110855016 A | 2/2020 |
| EP | 0823717 A2 | 2/1998 |
| JP | 2013120837 A | 6/2013 |
| JP | 3197750 U | 5/2015 |
| JP | 2015171166 A | 9/2015 |
| JP | 6233504 B2 | 11/2017 |
| KR | 20180067998 A | 6/2018 |
| KR | 101945842 B1 | 2/2019 |
| KR | 20190000687 U | 3/2019 |
| KR | 20200002737 A | 1/2020 |
| KR | 102085646 B1 | 3/2020 |
| TW | M414057 U | 10/2011 |
| TW | 201347349 A | 11/2013 |
| TW | 201711335 A | 3/2017 |
| WO | 2010129369 A2 | 11/2010 |
| WO | 2011156768 A2 | 12/2011 |
| WO | 2016053633 A1 | 4/2016 |

OTHER PUBLICATIONS

Korean Patent Application No. 10-2021-0102579, "Office Action", Jul. 18, 2023, 5 pages.

Korean Patent Application No. 10-2021-0102579, "Notice of Decision to Grant", Aug. 1, 2024, 4 pages.

Korean Patent Application No. 10-2024-0152051, Office Action, Mailed On Dec. 18, 2024, 8 pages.

* cited by examiner

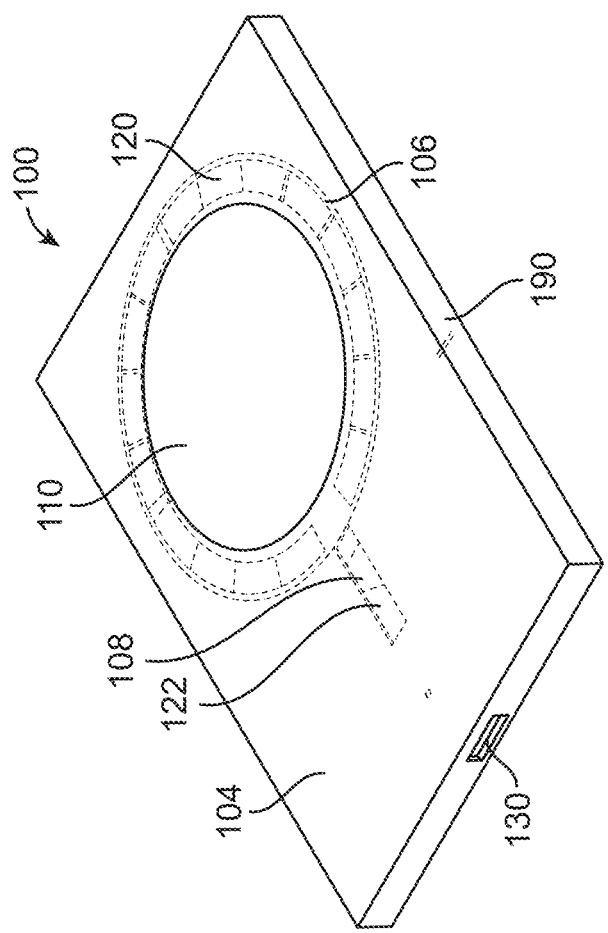
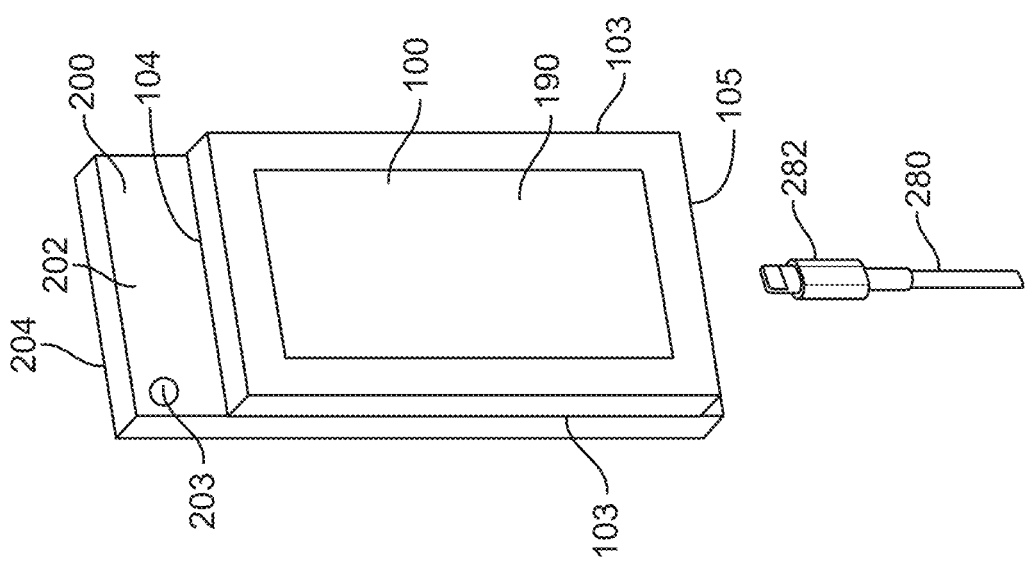
FIG. 1B
FIG. 1A

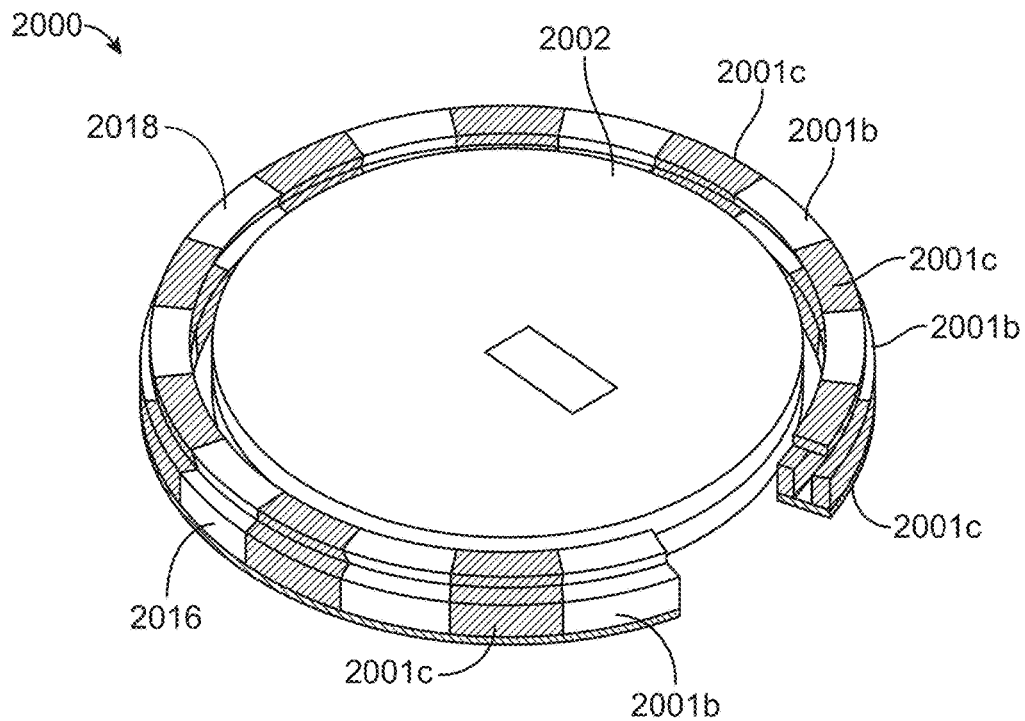
FIG. 20A
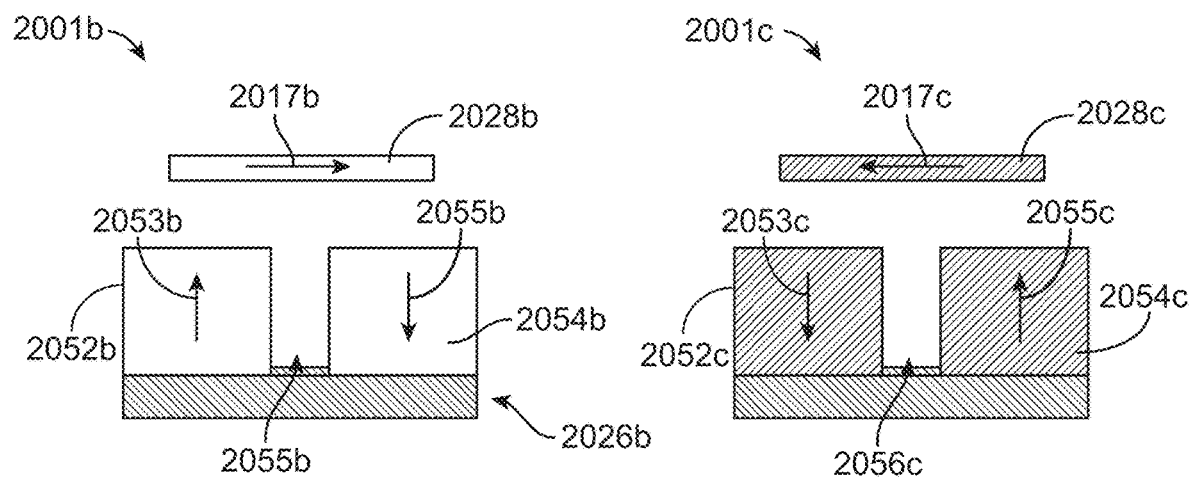
FIG. 20B
FIG. 20C

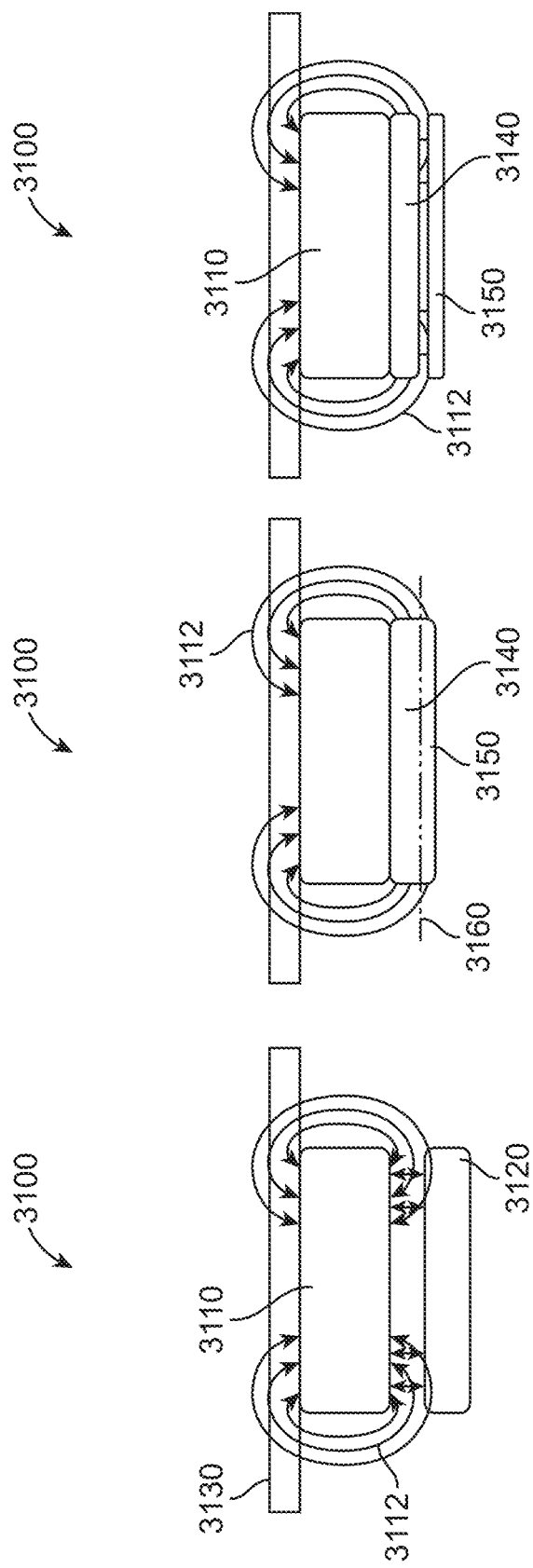

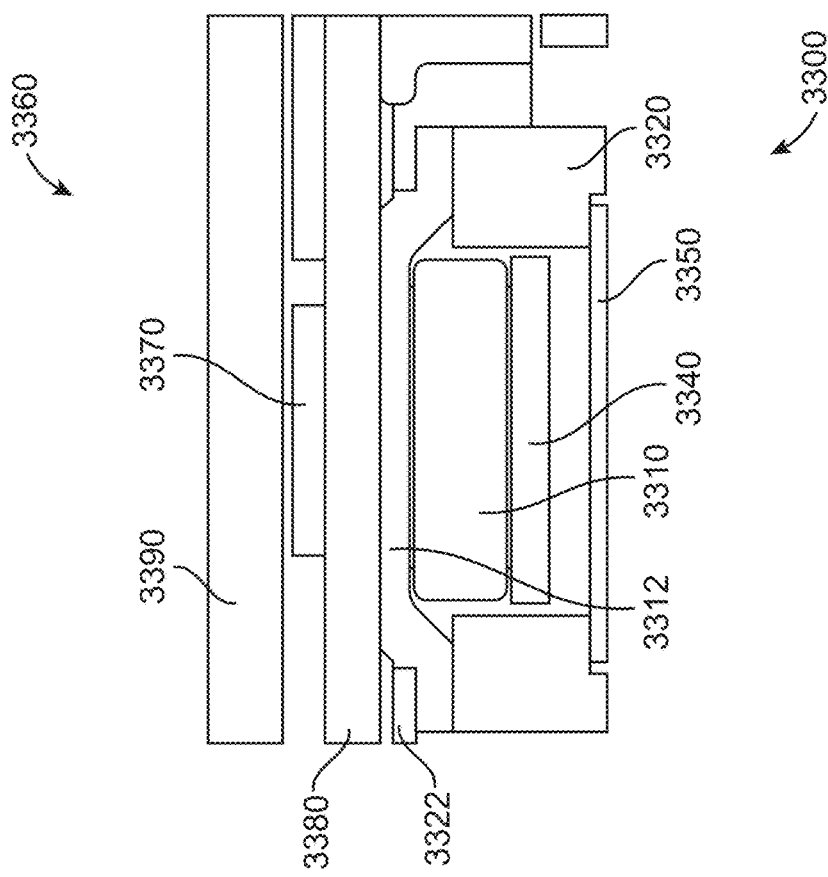
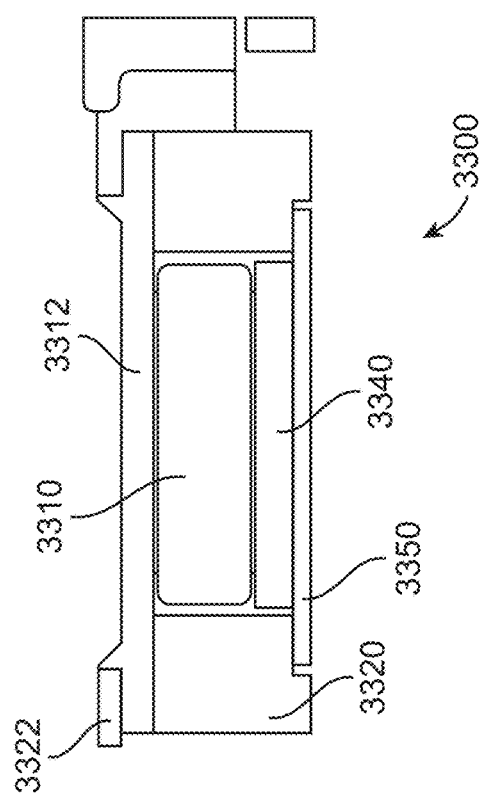
FIG. 33B
FIG. 33A

MAGNETICALLY ATTACHABLE BATTERY PACK

CROSS REFERENCES TO RELATED APPLICATIONS

This application claims the benefit of and priority to U.S. provisional patent application Nos. 63/083,288, filed Sep. 25, 2020, and 63/061,783, filed Aug. 5, 2020, which are incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, portable media recorders, navigation systems, monitors, adapters, and others, have become ubiquitous.

As a result of the ubiquity and increasing functionality of these electronic devices, they are now a constant companion for many. They are often used during or in conjunction with many daily activities, either while performing an activity or in a manner that supplements an activity.

Watching movies and reading texts are examples of daily activities that are performed using an electronic device. But these activities can quickly discharge a battery of the electronic device. Accordingly, it can be desirable to provide charging devices that have the capability of charging an electronic device.

Unfortunately, some charging devices can be complicated to use and can be bulky or otherwise impractical to carry. Accordingly, it can be desirable to provide a charging device that has a small and efficient form factor and is simple to use.

Also, it can be somewhat difficult to provide power to a charging device. Often a cable and power converter are needed, and only after the charging device is connected to receive power and charged is it able to provide power to an electronic device. Accordingly, it can be desirable to provide a charging device that can readily be charged for use.

Thus, what is needed are battery packs that can provide power to an electronic device, can be easy to use and simple to connect to the electronic device, have a small and efficient form factor, and can readily be charged for use.

SUMMARY

Accordingly, embodiments of the present invention can provide battery packs that can provide power to an electronic device, can be easy to use and simple to connect to the electronic device, have a small and efficient form factor, and can readily be charged for use.

These and other embodiments of the present invention can provide a battery pack that can provide power to an electronic device. The battery pack can include a battery, control circuitry, and a coil. The battery pack can store power in the battery and provide power from the battery to the control circuitry. The control circuitry can providing alternating currents to the coil. Currents in the coil can generate a time-varying magnetic field that can induce currents in a corresponding coil in the electronic device. The electronic device can use the induced currents to charge a battery internal to the electronic device. The battery pack can charge the electronic device in various ways. For example, the battery in the battery pack can continue to charge the electronic device until it is depleted or charged at a minimal level. The battery in the battery pack can continue to charge the electronic device until a battery in the electronic device is charged to a threshold or is fully charged. The battery in the battery pack can provide enough charge to the electronic device such that the electronic device can operate, but without charging the battery of the electronic device.

These and other embodiments of the present invention can provide a battery pack that can be easy to use. The battery pack can be charged using a wired connection or a wireless charger. The battery pack can then be attached to an electronic device to charge the electronic device. Informational light-emitting diodes can be used to indicate the charge status of the battery pack.

These and other embodiments of the present invention can provide a battery pack that can readily connect to an electronic device. A battery pack can include a magnet that can attract a corresponding magnet in the electronic device to attach the battery pack to the electronic device. The battery pack can also or instead include a number of magnets that can attract a corresponding number of magnets in the electronic device to attach the battery pack to the electronic device. The battery pack can also or instead include a magnet array that can attract a corresponding magnet array in the electronic device to attach a contacting surface of the battery pack to a surface of the electronic device. Once attached, the electronic device can determine that it is attached to a battery pack. The electronic device can prompt charging by the battery pack and the battery pack can begin to charge the electronic device.

These and other embodiments of the present invention can provide a battery pack having a magnet, a number of magnets, or a magnet array. In this arrangement it can be desirable to limit a strength of a magnetic field generated by the magnetic array at a contacting surface of the battery pack in order to protect information that might be magnetically stored, for example on credit cards, transit passes, or elsewhere. But it can also be desirable to increase the magnetic field to improve the attachment of the battery pack to the electronic device. Accordingly, the magnetic field can be increased when the battery pack is or is about to be attached to the electronic device and decreased at other times. For example, an electromagnet can be used. Current through the electromagnetic can be increased in order to increase magnetic attraction. Also or instead, the magnet array of a battery pack can be a moving magnet array. This moving magnet array can move from a first position away from a contacting surface to a second position near the contacting surface when the battery pack is or is about to be attached to the electronic device, thereby increasing the magnetic attraction between magnets in the battery pack and magnets in the electronic device. When the battery pack is removed from the electronic device, the moving magnet array can return to the first position away from the contacting surface, thereby increasing the magnetic field at the surface of the battery pack and protecting magnetically stored information.

These and other embodiments of the present invention can provide a moving magnet array that generates specific sound profiles when moving from the first position to the second position and from the second position to the first position. For example, when moving from the first position away from the contacting surface to the second position near or at the contacting surface, the moving magnets can encounter the contacting surface and make a subtle but informative sound to indicate that a connection between the battery pack and electronic device has been made. When moving from the second position near or at the contacting surface to the first position away from the contacting surface, the moving magnets can encounter a damper that can limit the resulting noise. The damper can be formed of foam or other material. The foam can be magnetically conductive.

These and other embodiments of the present invention can include one or more alignment features to align a battery pack to an electronic device. The battery pack can include an alignment magnet (or magnets) that is either part of the magnet array or separate from the magnet array. The alignment magnet can align with a corresponding magnet (or magnets) in the electronic device. The alignment magnet can align the battery pack to the electronic device in a specific orientation.

These and other embodiments of the present invention can provide a battery pack having a small and efficient form factor. The magnet array can be positioned to laterally and circumferentially surround the coil such that space is conserved and the battery pack size reduced accordingly. The battery pack can efficiently align with the electronic device to provide a combination of devices that can be easily carried.

These and other embodiments of the present invention can provide a battery pack that can be readily charged for use. A battery pack can include a battery that can be charged via a connector receptacle of the battery pack. The battery pack can also be wirelessly charged via the coil and control electronics of the battery pack. Once charged, the battery in the battery pack can wirelessly provide charging to an electronic device.

These and other embodiments of the present invention can provide a battery pack that limits interference with functionalities provided by the electronic device. For example, a battery pack can be housed in an enclosure that is formed of a contacting surface and an enclosure. The contacting surface can be placed adjacent to a surface of an electronic device. For example, it can be placed adjacent to a backside of a phone such that a screen on a front side of a phone remains visible. But the backside of the phone can include camera lenses and other features. Accordingly, the battery pack can be of limited size such that the camera lenses are not blocked by the battery pack and remain unobstructed. Further, the enclosure of the battery pack can be given colors or contours, or both, that limit interference of the operation of the camera lenses caused by stray or reflected light from surfaces of the battery pack.

These and other embodiments of the present invention can provide a battery pack that can be identified by an electronic device. Once an electronic device identifies that it is attached to a battery pack, the electronic device can commence charging or performing other operations. For example, the electronic device can comprise a magnetometer. The magnetometer can detect a magnet array in the battery pack. In response to this detection, the electronic device can generate a field using a near-field communication receiver. The near-field communication receiver can detect a near-field communication transmitter in the battery pack and determine that the electronic device is attached to a battery pack. The near-field communication transmitter in the battery pack can include a tag, capacitors, and other components. The near-field communication circuits in the electronic device and the near-field communication circuits in the battery pack can be used for two-way data communication as well.

Once the electronic device determines that it is attached to a battery pack, the electronic device can transmit data from a charging coil of the electronic device to a charging coil in the battery pack. For example, control electronics in the electronic device can generate modulated currents in a charging coil. The currents can be modulated in amplitude, frequency, phase, or combination thereof. The modulated currents can generate a time-varying magnetic field that can induce currents in a charging coil of the battery pack. Control circuitry in the battery pack can then recover the data. The data can include device identification, charging status, charging capability, or other information. The battery pack can then begin charging based on this information or can hold charging in abeyance. Data can similarly be transmitted from the battery pack to the electronic device.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 1A and FIG. 1B illustrate a battery pack according to an embodiment of the present invention;

FIG. 17B shows an axial cross-section view through a portion of the system of FIG. 17A, while

FIG. 20A shows a perspective view of a magnetic alignment system according to some embodiments, and FIGS. 20B and 20C show axial cross-section views through different portions of the system of FIG. 20A;

FIGS. 31A through 31C illustrate moving magnets according to an embodiment of the present invention;

FIGS. 33A and 33B illustrate a moving magnetic structure according to an embodiment of the present invention;

DESCRIPTION OF ILLUSTRATIVE EMBODIMENTS

Figure 2:
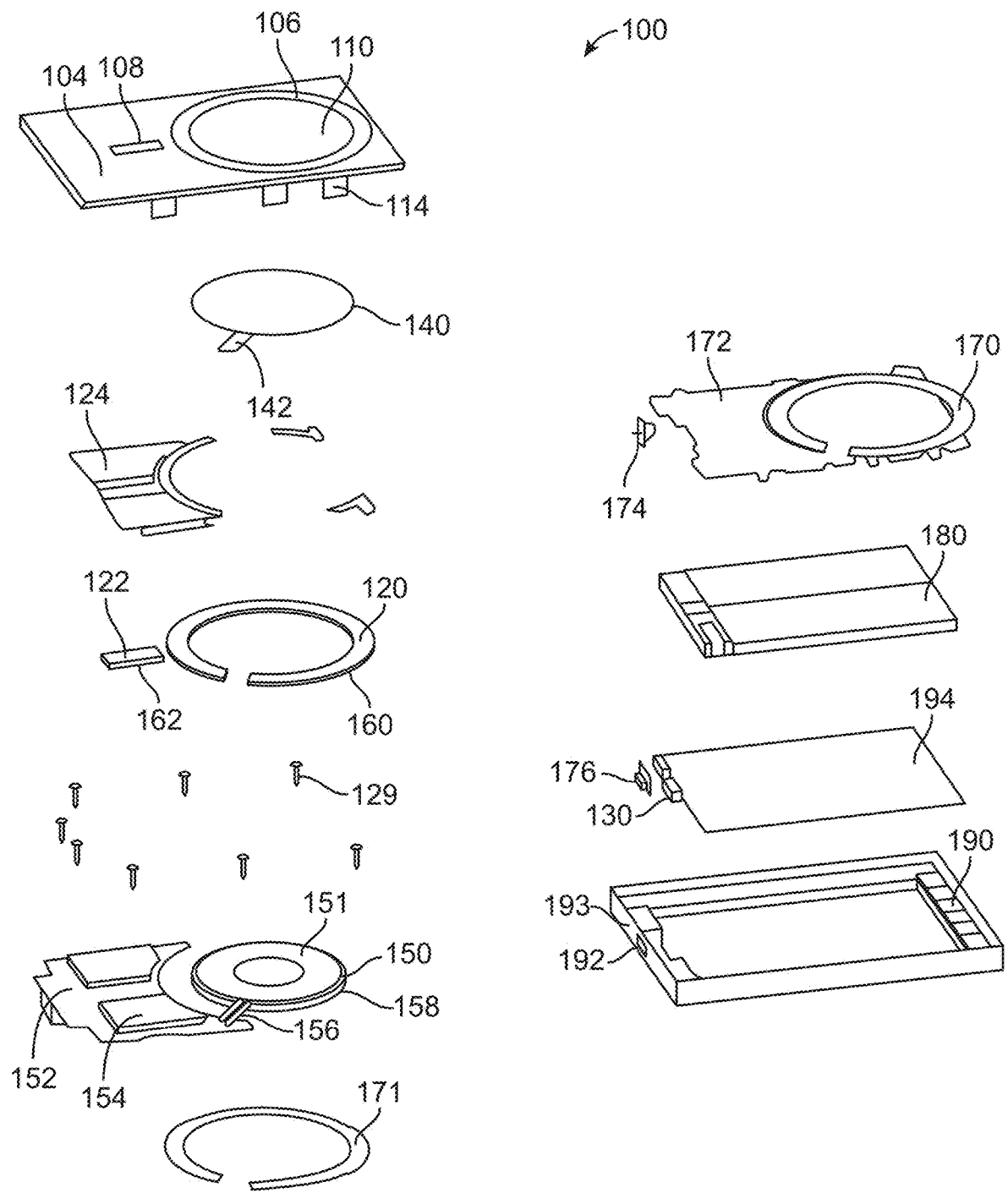
FIG. 2 is an exploded diagram of the battery pack of FIG. 1A and FIG. 1B.

FIG. 1A and FIG. 1B illustrate a battery pack according to an embodiment of the present invention. This figure, as with the other included figures, is shown for illustrative purposes and does not limit either the possible embodiments of the present invention or the claims.

Battery pack 100 can be easy to use and easy to connect to an electronic device. For example, battery pack 100 can include an attachment feature that attaches battery pack 100 to back surface 202 of electronic device 200. Battery pack 100 can further include an alignment feature to align battery pack 100 to electronic device 200. Once attached, electronic device 200 can detect that battery pack 100 is attached and can, if necessary, begin receiving charge from battery pack 100.

Battery pack 100 can fit well with electronic device 200 and provide a small and efficient form factor that can be readily carried along with electronic device 200. Battery pack 100 can attach to electronic device 200 in order to charge a battery internal to or otherwise associated with electronic device 200. Specifically, front surface 104 of battery pack 100 can attach to a back surface 202 of electronic device 200. This arrangement can leave a screen (not shown) on a front side 204 of electronic device 200 unobstructed. When attached, battery pack 100 can be at least approximately coincident with electronic device 200 along sides 103 and bottom 105, though one or more sides 103 or bottom 105 of battery pack 100 can be offset inside or can overhang corresponding edges of electronic device 200. Battery pack 100 can have a height that is shorter than a height of electronic device 200 such that lens 203 for a camera and other structures in or associated with electronic device 200 can remain unobstructed. Battery pack 100 can be at least partially housed by front surface 104 and enclosure 190. Front surface 104 can be a single unbroken feature, contacting surface 110 can be a distinct feature, either or both region 106 and region 108 can be distinct features, or any combination thereof can be employed.

Battery pack 100 can also be readily charged for use. For example, battery pack 100 can receive charge over cable 280, where connector insert 282 can be plugged into connector receptacle 130 on battery pack 100. Battery pack 100 can also be placed on a charging pad or other wireless charger (not shown) to be charged for use. That is, front surface 104 can be placed adjacent to a surface of a wireless charging device to charge battery 180 internal to battery pack 100.

In these and other embodiments of the present invention, battery pack 100 can utilize a magnet as an attachment feature. Battery pack 100 can include a magnet that can attract a corresponding magnet (not shown) in electronic device 200 to attach battery pack 100 to electronic device 200. Battery pack 100 can also or instead include a number of magnets that can attract a corresponding number of magnets (not shown) in the electronic device 200 to attach battery pack 100 to electronic device 200. Battery pack 100 can also or instead include magnet array 120 that can attract a corresponding magnet array (not shown) in electronic device 200 to attach contacting surface 110 of front surface 104 of battery pack 100 to a back surface 202 of electronic device 200.

Battery pack 100 can further include one or more alignment magnets, referred to as alignment magnet 122. Alignment magnet 122 can align with a corresponding magnet (not shown) in electronic device 200. Alignment magnet 122 can help to orient battery pack 100 to electronic device 200 in a specific space efficient configuration as shown in FIG. 1A.

Magnet array 120 and alignment magnet 122 can generate a magnetic field or magnetic flux at front surface 104 of battery pack 100. It can be desirable that this magnetic field or magnetic flux be high in order to securely attach battery pack 100 to electronic device 200. However, an excessive magnetic field or magnetic flux can inadvertently erase or damage information stored magnetically on credit cards, transit passes, and the like. Accordingly, it can be desirable that the magnetic field or magnetic flux provided by magnet array 120 and alignment magnet 122 remain low until battery pack 100 is or is about to be attached to electronic device 200. Once battery pack 100 is or is about to be attached to electronic device 200, it can be desirable that the magnetic field or magnetic flux provided by magnet array 120 and alignment magnet 122 increase. Accordingly, magnet array 120 alignment magnet 122 can be supplemented by an electromagnet (not shown.) Current in the electromagnet can increase to increase the magnetic field to provide a secure attachment between battery pack 100 and electronic device 200. Also or instead, some or all of the magnets in magnet array 120 and alignment magnet 122 can move closer to front surface 104 when battery pack 100 is or is about to be attached to electronic device 200 in order to increase a magnetic field or magnetic flux at front surface 104 of battery pack 100. When battery pack 100 is disconnected from electronic device 200, some or all of the magnets in magnet array 120 and alignment magnet 122 can move away from front surface 104, thereby reducing a magnetic field or magnetic flux at the front surface 104 in order to protect magnetically stored information.

Battery pack 100 can include additional attachment features. For example, contacting surface 110 and other portions of front surface 104 can be high friction or high stiction surfaces. That is, contacting surface 110 can be a high friction or high stiction surface. Most or all of front surface 104, including or excluding contacting surface 110, region 106, and region 108, can be a high friction or high stiction surface. These high-friction or high-stiction surfaces can engage with back surface 202 of electronic device 200 to increase a shear force needed to remove electronic device 200 from battery pack 100. The high-friction surfaces can be formed of an elastomer, plastic, PVC plastic, rubber, silicon rubber, polycarbonate (PC), urethane, polyurethane, nitrile, neoprene, silicone, or other material or combination of materials. Some or all of the high-friction surfaces, such as a contacting surface, can also or instead be formed using an adhesive. Using an adhesive can increase both a shear force and a normal force needed to remove the electronic device from the attachment device.

Battery pack 100 can include a front surface 104 that can be at least partially transparent. When front surface 104 is at least partially transparent, magnet array 120 and alignment magnets 122 can be visible. Whether or not front surface 104 is partially transparent, region 106 over magnet array 120 and region 108 over alignment magnet 122 can be thinned. These thinned regions can allow for an increased magnetic field at front surface 104.

FIG. 2 is an exploded diagram of the battery pack of FIG. 1A and FIG. 1B. Battery pack 100 can include front surface 104, which can also be referred to as a foot. Front surface 104 can include thinned region 106 over magnet array 120 and thinned region 108 over alignment magnet 122, as well as contacting surface 110. Magnet array 120 can laterally and circumferentially surround near-field communications coil 140. Near-field communications coil 140 can be attached to near-field communication circuitry 142, which can be a transmitter including a tag and one or more capacitors. Adhesive layers 124 can attach front surface 104 to control circuitry 154 and board 152. Control circuitry 154 can drive and receive currents in charging coil 150 through leads 156. Charging coil 150 can be covered by E-shield 151 and can be supported by ferritic enclosure 158.

Magnet array 120 can be attached to shield 160 and alignment magnet 122 can be attached to shield 162. Shield 160 and shield 162 (and the other shields shown here) can be formed of a material that has high magnetic permeability, such as stainless steel. Magnet array 120 and shield 160 can be magnetically attracted to return plate 170, which can be attached to mid-plate 172. Return plate 170 (and the other return plates shown here) can be formed of a material that has high magnetic permeability, such as stainless steel. Foam layer 171 can be attached to a top surface of return plate 170. Foam layer 171 can suppress noise when magnet array 120 and shield 160 return to return plate 170. Foam layer 171 can be formed of a magnetically conductive and compressible material. Mid-plate 172 can cover battery 180. Connector receptacle 130 can be connected to plate 194. Enclosure 190 can include opening 192 allowing access to connector receptacle 130. Ground shield 176 can be located in opening 192, as shown in FIG. 12C. Light pipe 174 can guide light from a light emitting diode (not shown) in order provide an indication of status for battery pack 100. Light pipe 174 can terminate at opening 193 in enclosure 190. This status indicator can be a first color, for example green, when battery pack 100 is fully charged. The status indicator can be a second color, for example amber, when the charge of battery pack 100 is low. Other indications, for example indications that charging of either electronic device 200 or battery pack 100 itself is occurring, high-temperature warnings, and others can be provided by different colors, sequences of different colors, flashing or changes to the light, or other visual indications. Board 152 and mid-plate 172 can be attached to enclosure 190 using fasteners 129. Tabs 114 on foot or front surface 104 can be used to join front surface 104 to enclosure 190.

Battery pack 100 can be identified by electronic device 200 (shown in FIG. 1.) Once electronic device 200 identifies that it is attached to battery pack 100, electronic device 200 can commence charging or performing other operations. For example, electronic device 200 can comprise a magnetometer (not shown.) The magnetometer can detect magnet array 120 in battery pack 100. In response to this detection, electronic device 200 can generate a field using a near-field communication receiver (not shown.) The near-field communication receiver can detect near-field communication circuitry 142, which can be a transmitter in battery pack 100 and read information from the transmitter to determine that electronic device 200 is attached to battery pack 100. The near-field communication circuits in electronic device 200 and near-field communication circuitry 142 in battery pack 100 can be used for two-way data communication as well.

Once electronic device 200 determines that it is attached to battery pack 100, electronic device 200 can transmit data from a charging coil (not shown) of electronic device 200 to charging coil 150 in battery pack 100. For example, control electronics (not shown) in electronic device 200 can generate modulated currents in the charging coil. The currents can be modulated in amplitude, frequency, phase, or combination thereof. The modulated currents can generate a time-varying magnetic field that can induce currents in charging coil 150 of battery pack 100. Control circuitry 154 in battery pack 100 can then recover the data. The data can include device identification, charging status, charging capability, or other information. Battery pack 100 can then begin charging based on this information or can hold charging in abeyance. Data can similarly be transmitted from battery pack 100 to electronic device 200.

Specifically, battery pack 100 can store power in battery 180 and provide power from battery 180 to control circuitry 154. Control circuitry 154 can providing alternating currents to coil 150. Currents in coil 150 can generate a time-varying magnetic field that can induce currents in a corresponding coil in electronic device 200. Electronic device 200 can use the induced currents to charge a battery (not shown) internal to electronic device 200. Charging can occur in various ways. For example, battery 180 in battery pack 100 can continue to charge electronic device 200 until it is depleted or charged at a minimal level. Battery 180 in battery pack 100 can continue to charge electronic device 200 until a battery (not shown) in electronic device 200 is charged to a threshold or is fully charged. Battery 180 in battery pack 100 can provide enough charge to electronic device 200 such that electronic device 200 can operate, but without charging the battery of electronic device 200.

In these and other embodiments of the present invention, these structures can be formed of various materials in various ways. Front surface 104, or portions of front surface 104 such as contacting surface 110, and the other front surfaces and contacting surfaces shown here or otherwise utilized by an embodiment of the present invention, can be formed of an elastomer, plastic, PVC plastic, rubber, silicon rubber, urethane, polyurethane, nitrile, polycarbonate, neoprene, silicone, or other material. Enclosure 190, mid-plate 172, plate 194, and the other enclosures, plates, and other enclosure portions, shown here or otherwise utilized by an embodiment of the present invention, can be formed of a metal, such as stainless steel or aluminum, plastic, nylon, or other conductive or nonconductive material, such as a plastic. They can be formed using computer numerical control (CNC) or other type of machining, stamping, metal injection molding (MIM), or other technique. Ferritic enclosure 158 can be formed of a material that has high magnetic permeability, such as stainless steel, ferritic stainless steel, oxides of iron, manganese, zinc, or other material or combination of materials. E-shield 151 can be formed of a layer of copper or other conductive material to intercept electric fields between coil 150 and a corresponding coil (not shown) in electronic device 200 (shown in FIG. 1), and can have a low magnetic permeability to pass magnetic fields between coil 150 and the corresponding coil. E-shield 151 can include breaks to prevent the formation of eddy currents. Board 152 can be formed of FR-4 or other material. Adhesive layers 124 and the other adhesive layers used here can be formed of a pressure-sensitive adhesive, a heat-activated film, or other type of adhesive.

Figure 3:
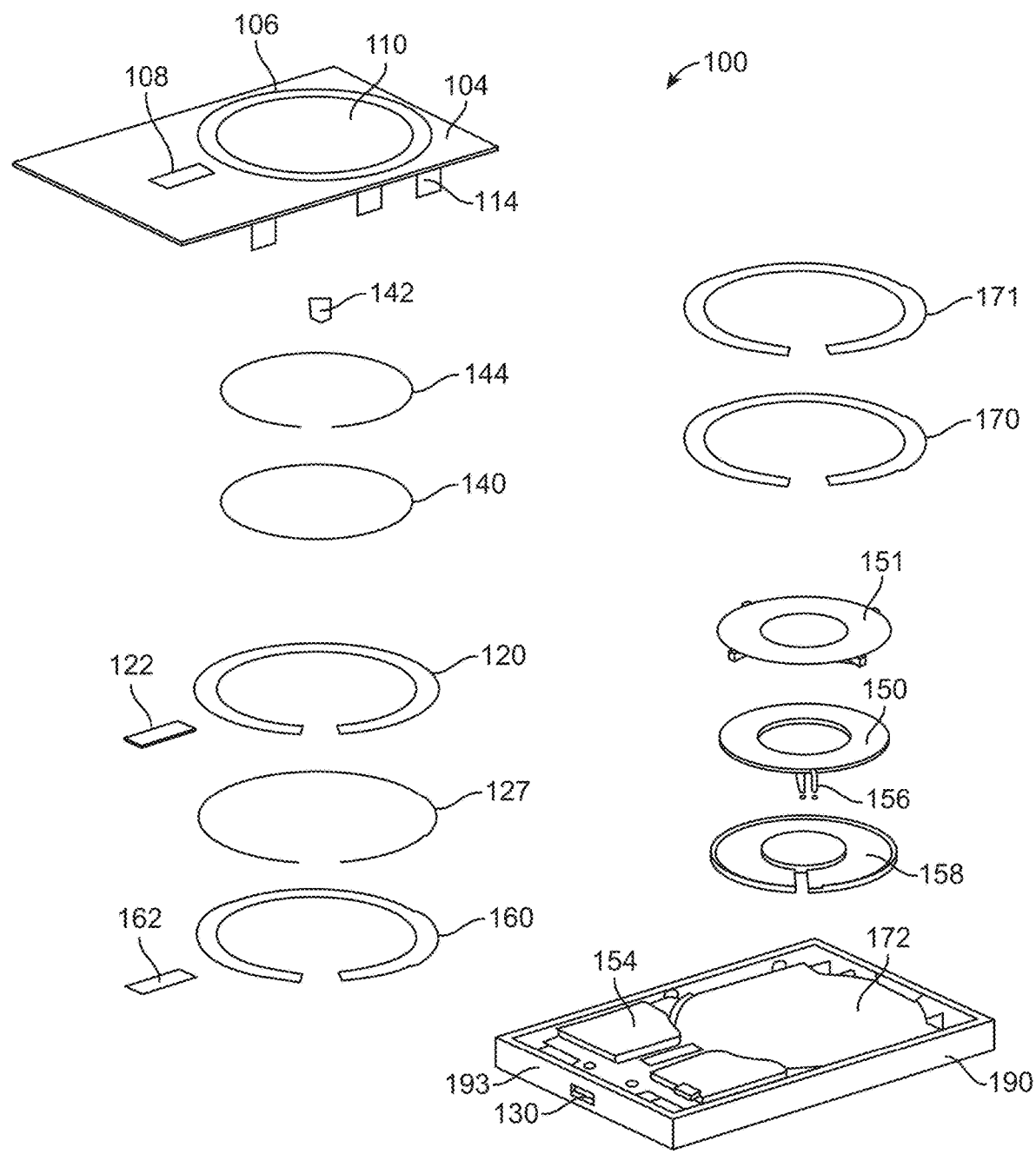
FIG. 3 is another exploded diagram of the battery pack of FIG. 1A and FIG. 1B.

FIG. 3 is another exploded diagram of the battery pack of FIG. 1A and FIG. 1B. Battery pack 100 can include front surface 104, which can also be referred to as a foot. Front surface 104 can include thinned region 106 over magnet array 120 and thinned region 108 over alignment magnet 122, as well as contacting surface 110. Magnet array 120 can laterally and circumferentially surround near-field communications coil 140. Near-field communications coil 140 can be attached to near-field communication circuitry 142. Adhesive layer 144 can attach near-field communications coil 140 to an underside of front surface 104. Adhesive layer 144 and the other adhesive layers used here can be formed of a pressure-sensitive adhesive, a heat-activated film, or other type of adhesive. Control circuitry 154 can drive and receive currents in charging coil 150 through leads 156. Charging coil 150 can be covered by E-shield 151 and can be supported by ferritic enclosure 158.

Magnet array 120 can be attached to shield 160 using adhesive 127. Alignment magnet 122 can be attached to shield 162. Magnet array 120 and shield 160 can be magnetically attracted to return plate 170, which can be attached to mid-plate 172. Foam layer 171 can be attached to a top surface of return plate 170. Foam layer 171 can suppress noise when magnet array 120 and shield 160 return to return plate 170. Foam layer 171 can be formed of a magnetically conductive and compressible material. Mid-plate 172 can cover battery 180 (shown in FIG. 2.) Connector receptacle 130 can be connected to plate 194 (shown in FIG. 2.) Enclosure 190 can include connector receptacle 130. Tabs 114 on foot or front surface 104 can be used to join front surface 104 to enclosure 190. Light pipe 174 (shown in FIG. 2) can guide light from a light emitting diode (not shown) in order provide an indication of status for battery pack 100. Light pipe 174 can terminate at opening 193 in enclosure 190. This status indicator can be a first color, for example green, when battery pack 100 is fully charged. The status indicator can be a second color, for example amber, when the charge of battery pack 100 is low. Other indications, for example indications that charging of either electronic device 200 or battery pack 100 itself is occurring, high-temperature warnings, and others can be provided by different colors, sequences of different colors, flashing or changes to the light, or other visual indications.

Figure 4:
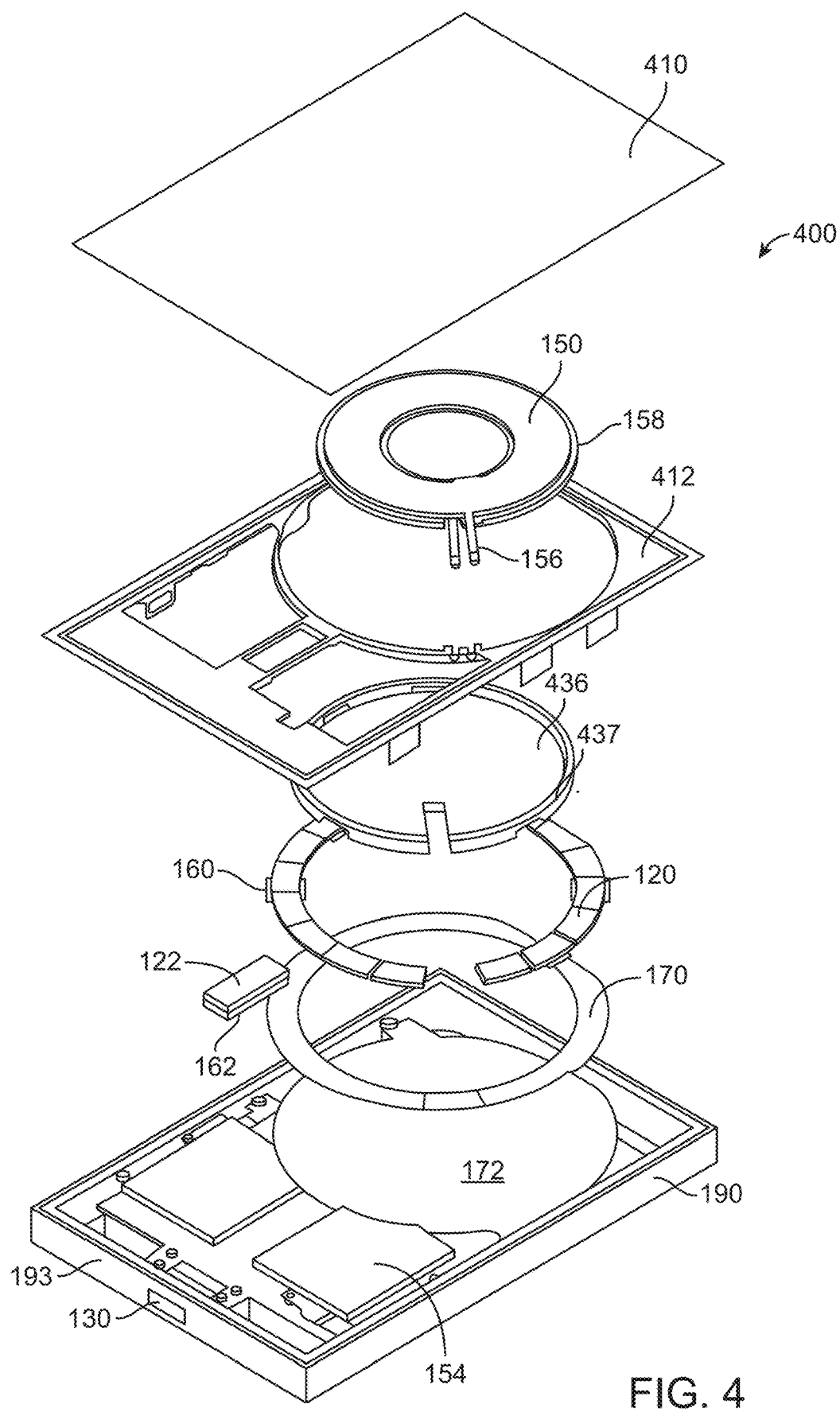
FIG. 4 is an exploded diagram of a battery pack according to an embodiment of the present invention.

FIG. 4 is another exploded diagram of a battery pack according to an embodiment of the present invention. Battery pack 400 can be the same or similar to battery pack 100 above. In this example, battery pack 400 does not include near-field communication circuitry and components, but this can be included in other versions of battery pack 400. Battery pack 400 can include front surface 410, which in this example can be formed of glass or other material. Front surface 410 can be attached to foot 412 to form a front surface of an enclosure for battery pack 400. Inner frame 436 can include an upper rim 437 positioned between charging coil 150 and magnet array 120. Control circuitry 154 can drive and receive currents in charging coil 150 through leads 156. Charging coil 150 can be supported by ferritic enclosure 158.

Magnet array 120 can be attached to shield 160. Alignment magnet 122 can be attached to shield 162. Magnet array 120 and shield 160 can be magnetically attracted to return plate 170, which can be attached to mid-plate 172. Mid-plate 172 can cover battery 180 (shown in FIG. 2.) Connector receptacle 130 can be connected to plate 194 (shown in FIG. 2.) Enclosure 190 can include connector receptacle 130. Light pipe 174 (shown in FIG. 2) can guide light from a light emitting diode (not shown) in order provide an indication of status for battery pack 100. Light pipe 174 can terminate at opening 193 in enclosure 190. This status indicator can be a first color, for example green, when battery pack 400 is fully charged. The status indicator can be a second color, for example amber, when the charge of battery pack 400 is low. Other indications, for example indications that charging of either electronic device 200 or battery pack 400 itself is occurring, high-temperature warnings, and others can be provided by different colors, sequences of different colors, flashing or changes to the light, or other visual indications.

Figure 5:
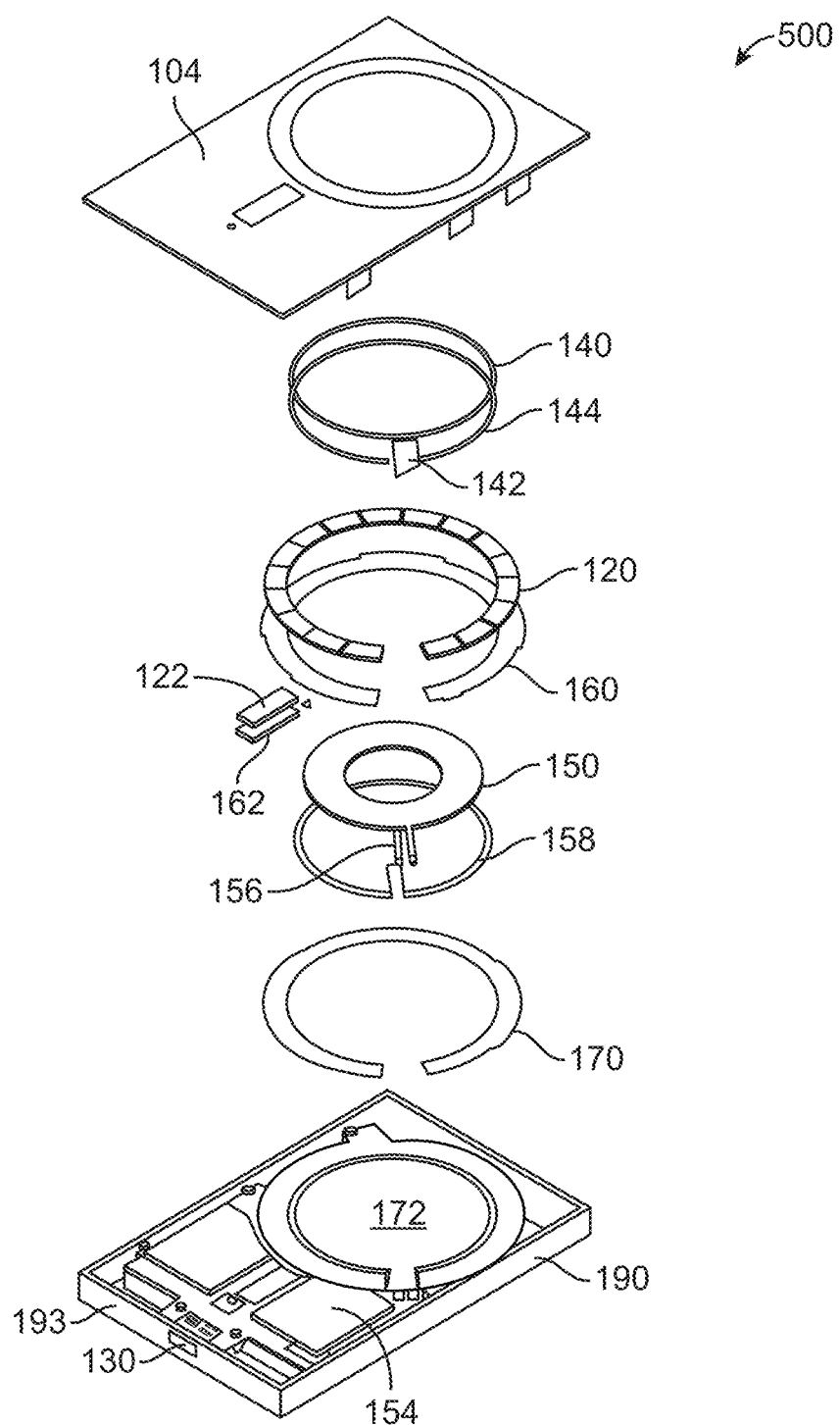
FIG. 5 is another exploded diagram of a battery pack according to an embodiment of the present invention.

FIG. 5 is another exploded diagram of a battery pack according to an embodiment of the present invention. Battery pack 500 can be the same or similar to battery pack 100 and battery pack 400 above. Battery pack 500 can include front surface 104, which can be similar to the front surface 104 shown in the above examples. Magnet array 120 can laterally and circumferentially surround near-field communications coil 140. Near-field communications coil 140 and near-field communications circuitry 142 can form a near-field communications transmitter. Near-field communications coil 140 can be attached to a surface, such as front surface 104, using adhesive layer 144. Control circuitry 154 can drive and receive currents in charging coil 150 through leads 156. Charging coil 150 can be supported by ferritic enclosure 158.

Magnet array 120 can be attached to shield 160. Alignment magnet 122 can be attached to shield 162. Magnet array 120 and shield 160 can be magnetically attracted to return plate 170, which can be attached to mid-plate 172. Mid-plate 172 can cover battery 180 (shown in FIG. 2.) Connector receptacle 130 can be connected to plate 194 (shown in FIG. 2.) Enclosure 190 can include connector receptacle 130. Light pipe 174 (shown in FIG. 2) can guide light from a light emitting diode (not shown) in order provide an indication of status for battery pack 100. Light pipe 174 can terminate at opening 193 in enclosure 190. This status indicator can be a first color, for example green, when battery pack 500 is fully charged. The status indicator can be a second color, for example amber, when the charge of battery pack 500 is low. Other indications, for example indications that charging of either electronic device 200 or battery pack 500 itself is occurring, high-temperature warnings, and others can be provided by different colors, sequences of different colors, flashing or changes to the light, or other visual indications.

The above battery packs, such as battery pack 100, 400, and 500, can readily attach to electronic device 200 using magnet array 120 or other magnet arrays according to an embodiment of the present invention. Details of magnet array 120 can be found, for example, in the description of primary magnetic alignment component 1316 in FIG. 13 and the other magnet arrays in the other figures below.

The above battery packs, such as battery pack 100, 400, and 500, can readily align to electronic device 200 using alignment magnet 122. Details of alignment magnet 122 can be found, for example, in the description of rotational alignment component 2324 in FIG. 23 and the alignment magnets in the other figures below.

The above battery packs, such as battery pack 100, 400, and 500, can readily be identified by electronic device 200 near-field communications coil 140 and near-field communication circuitry 142. Details of near-field communications coil 140 and near-field communication circuitry 142 can be found, for example, in the description of wireless transmitter coil assembly 3911 in FIG. 39 and the other coils in the other figures below.

The above battery packs, such as battery pack 100100, 400, and 500, can readily charge electronic device 200 using charging coil 150 and control circuitry 154. Details of charging coil 150 can be found, for example, in the description of inductive coil 1312 in FIG. 13 and the other charging coils in the other figures below.

Again, in these and other embodiments of the present invention, it can be desirable for a magnetic attraction provided by magnet array 120 to increase when battery pack 100 is or is about to be attached to an electronic device. Accordingly, magnet array 120 can move closer to front surface 104 of battery pack 100. Examples are shown in the following figure and in FIGS. 31-38 below.

Figure 6:
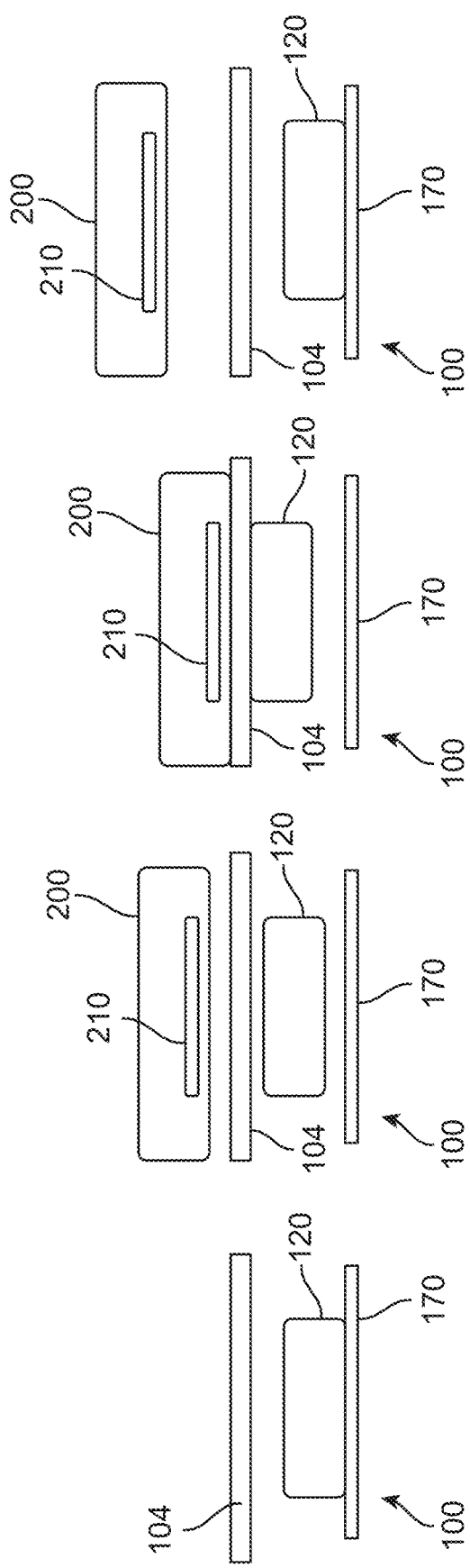
FIG. 6A through FIG. 6D illustrate a moving magnet array according to an embodiment of the present invention.

FIG. 6A through FIG. 6D illustrate a moving magnet array according to an embodiment of the present invention. In FIG. 6A, magnet array 120 can be attached to return plate 170 in battery pack 100. Magnet array 120 can be away from front surface 104 of battery pack 100. In this example, shield 160 (shown in FIG. 2) has been omitted for simplicity. In FIG. 6B, electronic device 200 can be about to be attached to battery pack 100. As a result, magnet array 120 can be attracted to magnet array 210 in electronic device 200. This attraction can cause the separation between magnet array 120 and return plate 170. Magnet array 120 can begin to move towards front surface 104. In FIG. 6C, battery pack 100 can be attached to electronic device 200. Magnet array 120 can be at or near front surface 104 of battery pack 100 and away from return plate 170. The flux or magnetic field provided by magnet array 120 can be higher at front surface 104 of battery pack 100 when magnet array 120 is in this position. The attraction between magnet array 120 in battery pack 100 and magnet array 210 in electronic device 200 can help to secure battery pack 100 in place against electronic device 200. In FIG. 6D, electronic device 200 and magnet array 210 can be removed from battery pack 100. Magnet array 120 can be attracted to return plate 170. As a result, magnet array 120 can return to and magnetically attach to return plate 170. In this position, magnet array 120 can be away from front surface 104. This can cause the magnetic field generated by magnet array 120 at front surface 104 to be reduced.

Figure 7:
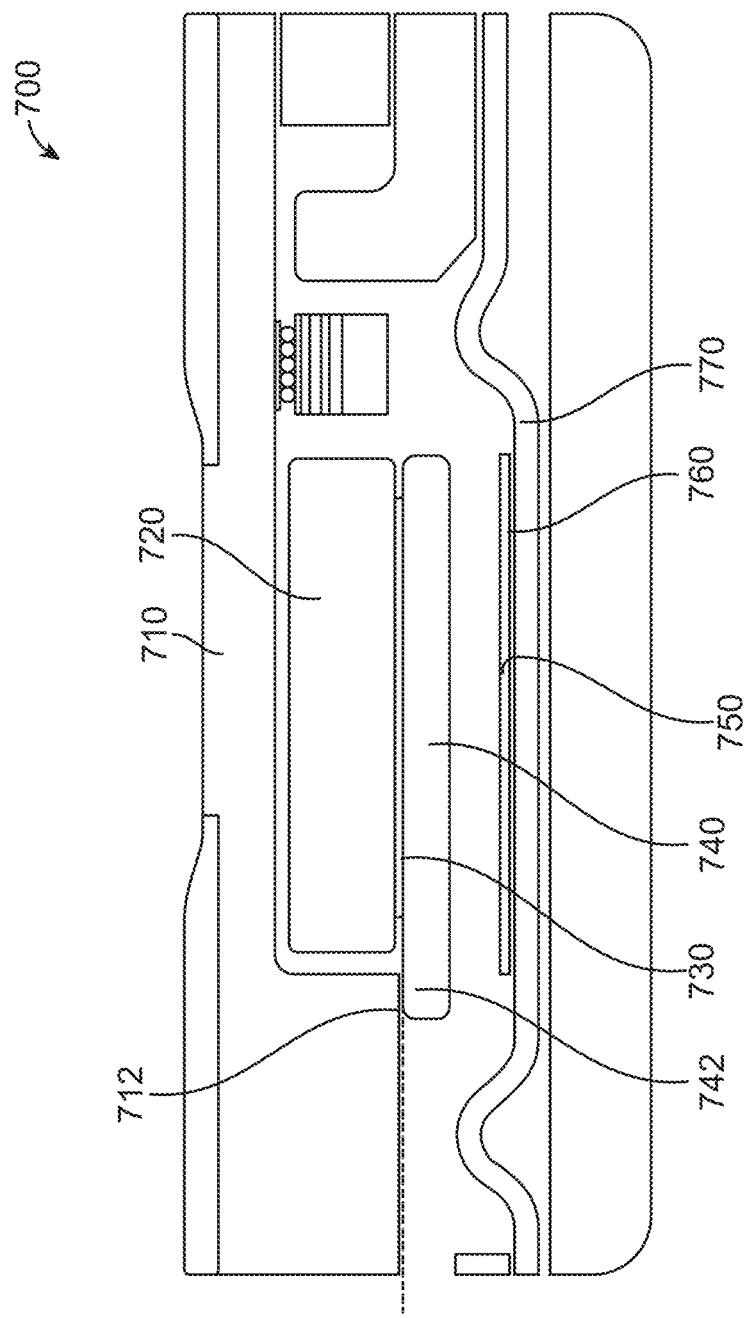
FIG. 7 illustrates another movable magnet array arrangement according to an embodiment of the present invention.

FIG. 7 illustrates another movable magnet array arrangement according to an embodiment of the present invention. Battery pack 700 shown in this example can be substantially the same or similar to battery pack 100, 400, and 500, shown above. In this example, magnet array 720 can be attached to shield 740 through adhesive layer 730. Magnet array 720 and shield 740 can be attracted to return plate 760. In this particular example, magnet array 720 can be attracted to a magnet (not shown) in an electronic device, such that magnet array 720 and shield 740 can be separated from return plate 760. Foam layer 750 can be provided on a top surface of return plate 760. Frame 770 can support return plate 760.

In these and other embodiments of the present invention, it can be desirable for moving magnets to make specific sounds as they move from one position to another. For example, it may be desirable that moving magnet array 720 make a subtle but distinct sound when battery pack 700 is attached to electronic device 200 (shown in FIG. 1.) It can further be desirable that moving magnet array 720 make only a small or an audible sound when battery pack 700 is detached from electronic device 200. Accordingly, ledge 712 of top surface 710 of battery pack 700 can encounter shield 740 when magnet array 720 is attracted to a corresponding magnet in electronic device 200. As shown, edge 742 of shield 740 can encounter ledge 712 of top surface 710 of battery pack 700. This can prevent magnet array 720 from encountering top surface 710 directly and can thereby reduce the noise associated with the (upward as shown in this figure) movement of magnet array 720. Foam layer 750 can act as a damper to reduce or eliminate noise as magnet array 720 and shield 740 return to return plate 760 following a disconnection of battery pack 700 from electronic device 200.

Figure 8A:
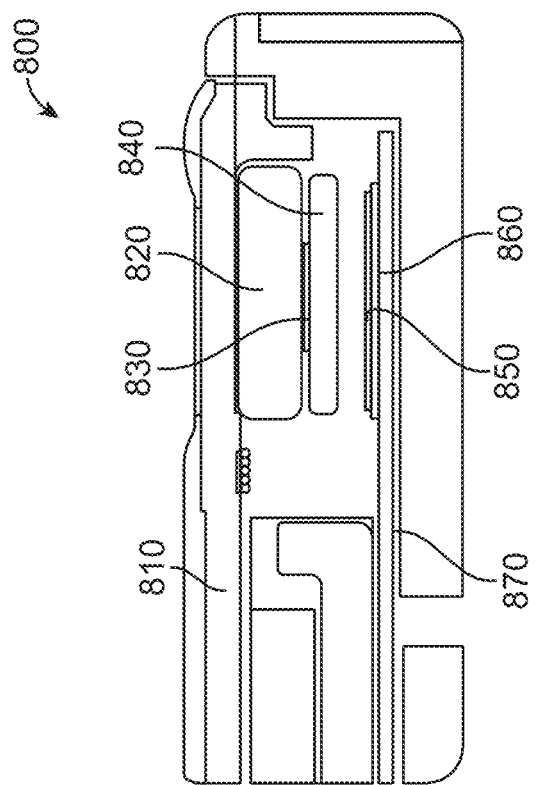
FIG. 8A and FIG. 8B illustrate another movable magnet arrangement according to an embodiment of the present invention.
Figure 8B:
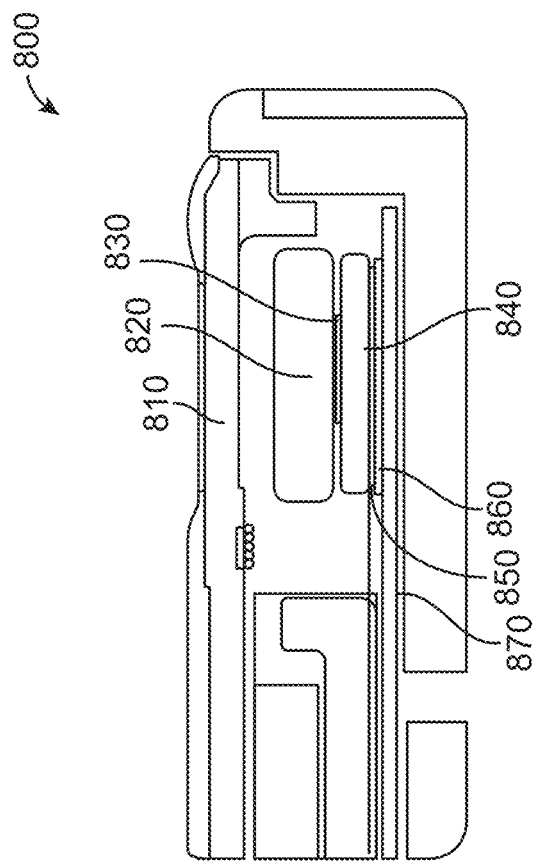

FIG. 8A and FIG. 8B illustrate another movable magnet array arrangement according to an embodiment of the present invention. Battery pack 800 shown in this example can be substantially the same or similar to battery pack 100, 400, 500, or 700 shown above. Magnet array 820 can be physically attached to shield 840 with an adhesive or other layer 830. Shield 840 can be magnetically attracted to return plate 860. Return plate 860 can be supported by bottom layer 870. Foam layer 850 can be placed over some or all of return plate 860. In this position, magnet array 820 can be positioned away from top surface 810 of battery pack 800.

As magnet array 820 is attracted to a corresponding magnet (not shown) in a corresponding electronic device, such as electronic device 200 (shown in FIG. 1), magnet array 820 and shield 840 can be pulled away from return plate 860. Magnet array 820 can encounter top surface 810 of battery pack 800 as shown in FIG. 8B. This movement can cause a subtle but distinct sound indicating to a user that battery pack 800 has engaged electronic device 200. As electronic device 200 is pulled away, magnet array 820 and shield 840 can return to return plate 860. Foam layer 850 can act as a damper to reduce or eliminate sound associated with this movement. Return plate 860 can be supported by bottom layer 870.

Figures 9A, 9B:
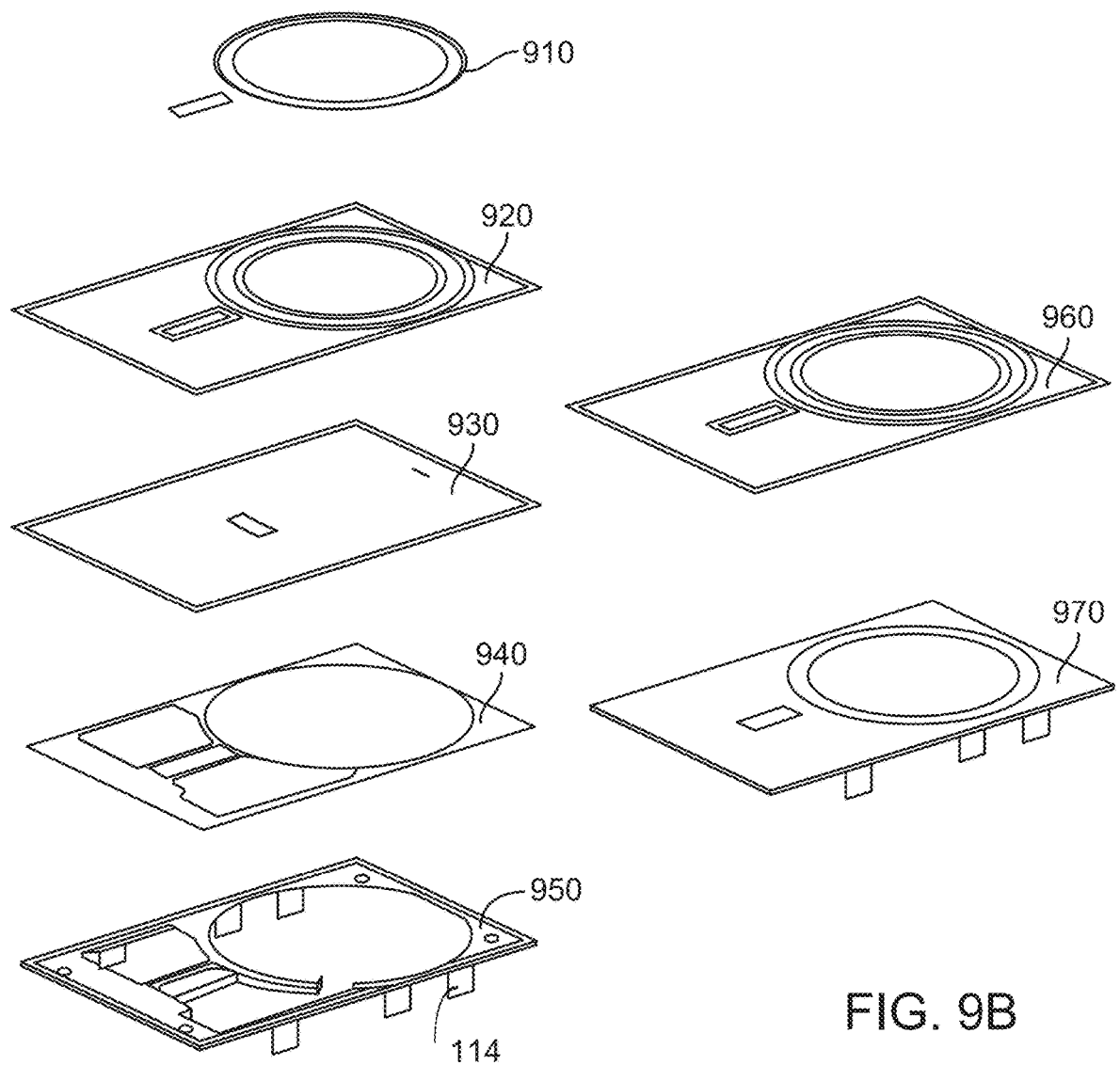
FIG. 9A and FIG. 9B illustrate the construction of a top surface for a battery pack according to an embodiment of the present invention.

FIG. 9A and FIG. 9B illustrate the construction of a top surface for a battery pack according to an embodiment of the present invention. These top surfaces can be used as front surface 104, top surface 710, top surface 810, or other top surfaces on other battery packs consistent with embodiments of the present invention. In FIG. 9A, decals 910 can be applied to silicone overmold 920. Silicone overmold 920 can be molded over composite sheet 930, which can be formed of ceramic fiber, polyvinyl fluoride film, or other material or combination of materials. The result can be attached to frame 950, which can be formed of glass-filled nylon, glass-filled polycarbonate, or other material or combination of materials, by adhesive layer 940. Frame 950 can include tabs 114. Adhesive layer 940, as with the other adhesive layers shown herein, can be a pressure-sensitive adhesive, a heat-activated film, or other type of adhesive. In FIG. 9B, a silicone overmold 960 can be formed over frame 970, which can be formed of glass-filled nylon, glass-filled polycarbonate, or other material or combination of materials.

As shown in FIG. 1, battery pack 100 can be attached to back surface 202 of electronic device 200. Battery pack 100 (and the other battery packs shown here or otherwise consistent with an embodiment of the present invention) can be positioned such that lens 203 is unobstructed. However, in some circumstances, light can reflect off surfaces of battery pack 100 and enter lens 203. This can cause haze and other visual artifacts of photographs taken using electronic device 200. Accordingly, embodiments of the present invention can utilize color, texture, shape, and other features to reduce or eliminate these reflections. An example of these reflections is shown in the following figure.

Figure 10:
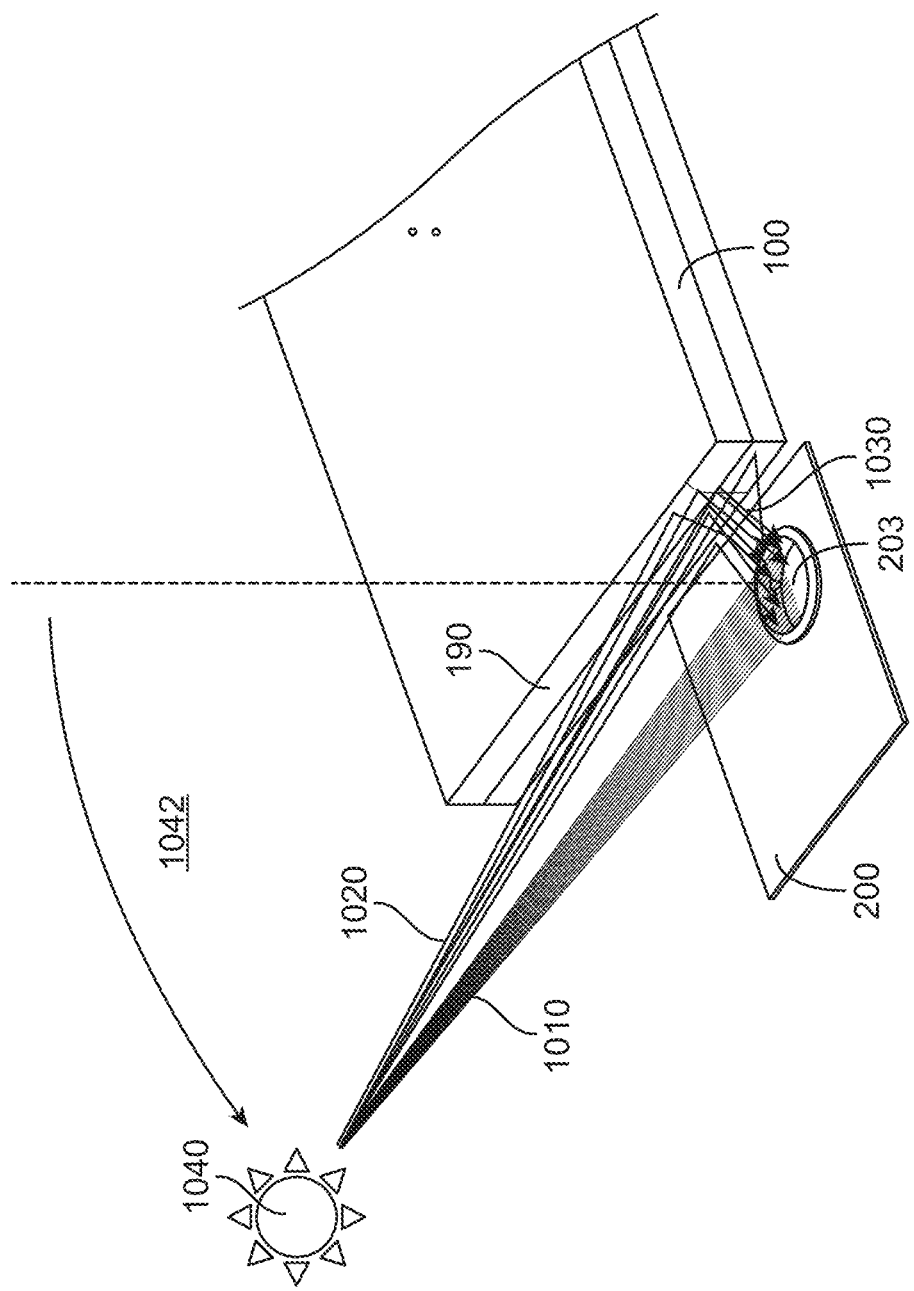
FIG. 10 illustrates light interactions with a surface of a battery pack according to an embodiment of the present invention.

FIG. 10 illustrates light interactions with a battery pack according to an embodiment of the present invention. In this example, light source 1040 can provide incident light 1010 to lens 203 of electronic device 200. Indirect light 1020 can reflect off a surface of enclosure 190 of battery pack 100 as reflected light 1030. Reflected light 1030 can enter lens 203, thereby causing haze in resulting images. The amount of reflected light can vary with the angle of inclination 1042. Accordingly, a surface of enclosure 190 can be modified to reduce an amount of reflected light 1030. Examples are shown in the following figures.

Figure 11A:
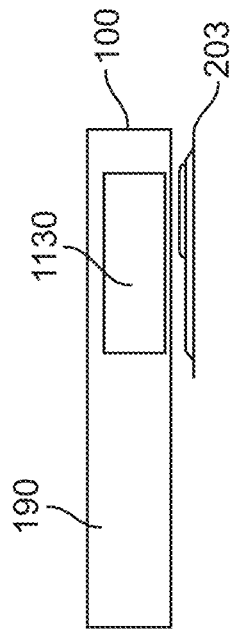
FIG. 11A through FIG. 11F illustrate surfaces of a battery pack according to an embodiment of the present invention.
Figure 11B:
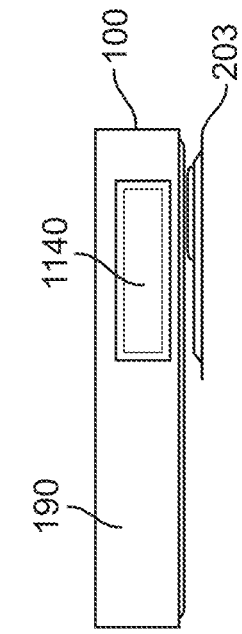

FIG. 11A through FIG. 11F illustrate surfaces of a battery pack according to an embodiment of the present invention. In FIG. 11A, a surface of enclosure 190 of battery pack 100 can be black or other light absorbing color. This color can be painted, printed, applied using physical vapor deposition, or applied in another manner. Some or all of enclosure 190 (shown in FIG. 2) can be formed using a material having a darker or less reflective color. The use of such a color can reduce an amount of light reflected into lens 203.

In these and other embodiments of the present invention, it may be desirable that battery pack 100 be primarily lighter, and therefore, a light reflecting color. In such a situation, a portion of a surface of enclosure 190 of battery pack 100 can be made a darker color. For example, in FIG. 11B, portion 1110 of a surface of enclosure 190 can be made a darker color to reduce an amount of light reflected into lens 203. The color for portion 1110 (and the other portions shown here) can be painted, printed, applied using physical vapor deposition, applied in another manner, or formed in another way. Portion 1110 can be formed of a material having a first color, while a remaining portion of enclosure 190 can be formed of the same or a different material having a second color, where the first color is a color that reflects light less than the second color.

Figure 11C:
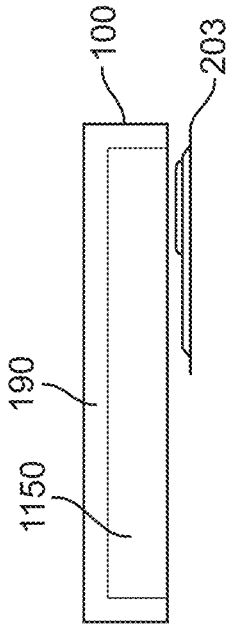
Figure 11D:
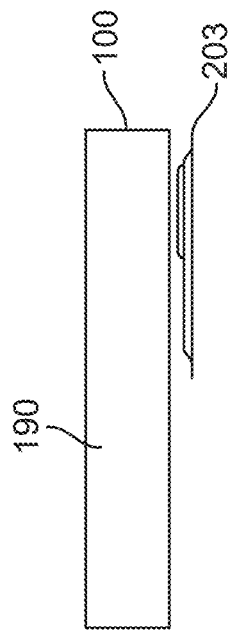
Figure 11E:
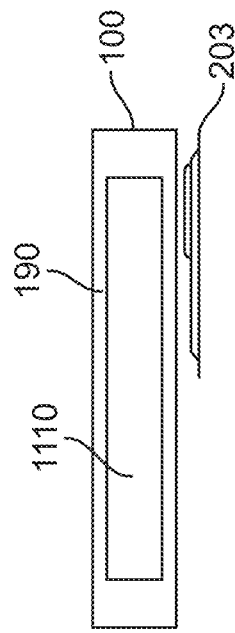

In FIG. 11C, portion 1120 of enclosure 190 of battery pack 100 can be the same or similar to portion 1110, but moved (downward as drawn) closer to lens 203. In FIG. 11D, portion 1130 of enclosure 190 of battery pack 100 can be limited in size and positioned near lens 203.

Figure 11F:
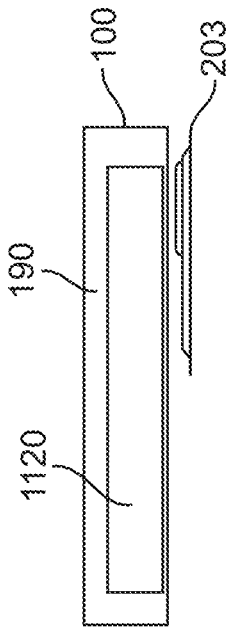

In these and other embodiments of the present invention, various textures, contours, and shapes can be used to reduce an amount of light reflected from a surface of enclosure 190 into lens 203. For example, in FIG. 11E, a scooped portion 1140 can be formed in a surface of enclosure 190 of battery pack 100 and positioned such that it can be near lens 203. This scooped portion can be formed as a recess or other contour in a surface of enclosure 190. Scooped portion 1140 can be the same color as a remainder of battery pack 100, or it can be a darker, less reflective color. Scooped portion 1140 can be formed as a concave indentation in a surface of enclosure 190. Scooped portion 1140 can be formed when enclosure 190 is molded, it can be cutout later by machining, or formed in other ways. The color for scooped portion 1140 can be painted, printed, applied using physical vapor deposition, applied in another manner, or formed other ways. In FIG. 11F, portion 1150 of enclosure 190 of battery pack 100 can have a less reflective color to reflect less light towards lens 203.

Figure 12B:
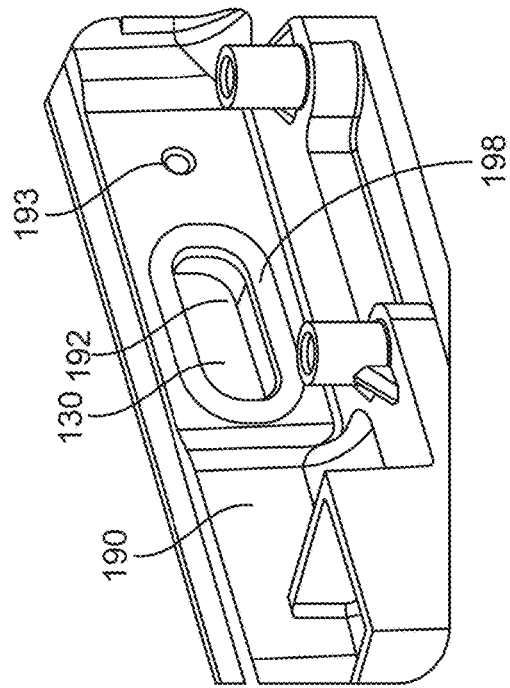
FIG. 12A through FIG. 12C illustrate portions of a connector receptacle for a battery pack according to an embodiment of the present invention.
Figure 12A:
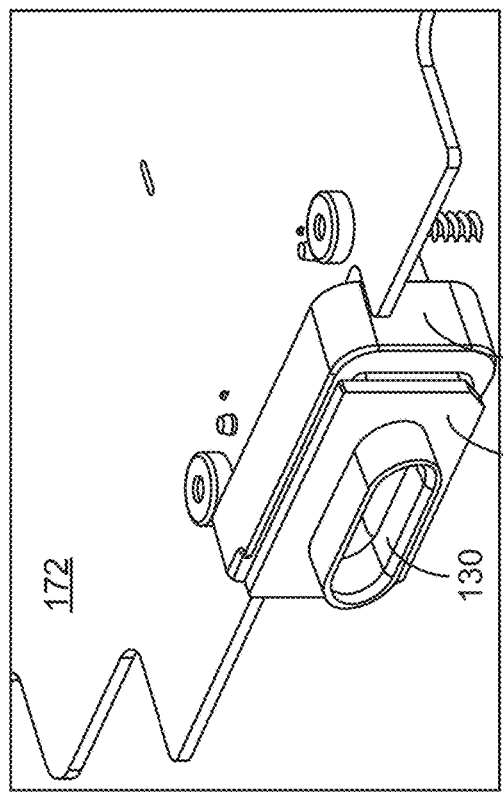
Figure 12C:
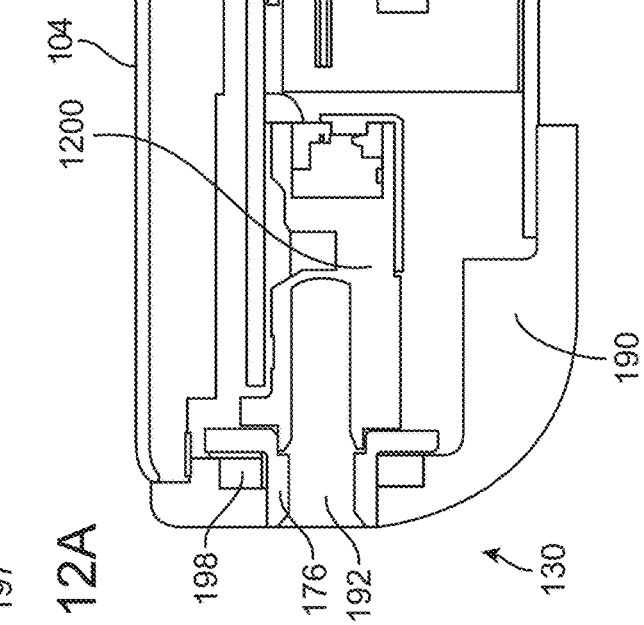

FIG. 12A through FIG. 12C illustrate portions of a connector receptacle for a battery pack according to an embodiment of the present invention. In FIG. 12A, connector receptacle 130 can include first ferritic clamp 197 attached to mid-plate 172. First ferritic clamp 197 can support ground shield 176, which can provide a ground path for a ground shield of a corresponding connector insert (not shown) when the corresponding connector insert is inserted into connector receptacle 130.

In FIG. 12B, connector receptacle 130 can include opening 192 in enclosure 190. Opening 192 can be framed by second ferritic clamp 198. Enclosure 190 can further include opening 193. Opening 193 can be used for indicator light pipe 174 (shown in FIG. 2.)

In FIG. 12C, enclosure 190 can include opening 192, which can be frame by second ferritic clamp 198. Ground shield 176 can be inserted into opening 192 in enclosure 190. Housing 1200 can support contacts (not shown) for connector receptacle 130. Front surface 104 can form a device enclosure, along with enclosure 190, for battery pack 100, or the other battery packs shown here or otherwise provided by an embodiment of the present invention. In this example, first ferritic clamp 197 can be omitted and second ferritic clamp 198 can be positioned between enclosure 190 and ground shield 176.

In this example, either or both first ferritic clamp 197 and second ferritic clamp 198 can be used in connector receptacle 130. This can provide an inductive component to power and ground lines of connector receptacle 130 and a corresponding connector insert. This inductive component can act to filter or reduce radio-frequency and other high frequency noise and interference.

Each of the battery packs such as battery pack 100, 400, 500, 700, and 800 can be substantially the same or similar and can each be used in the substantially the same or similar manner. Various features are detailed in the figures herein but some features, such as the magnet arrays, can be substantially the same or similar despite having different reference numbers.

Again, magnet arrays 120 and alignment magnets 122 can be fixed in place, or they can be movable between a first position and a second position. Examples of fixed magnets that can be used for magnet arrays 120 and alignment magnets 122 are shown in the following figures. For example, magnet arrays 120 can be any of the primary magnetic alignment components such as primary magnetic alignment component 1316. As another example, coil 570 can be inductive coil 1312 or any of the other coils shown herein. Battery pack 100 and the other battery packs can be implemented using the details of wireless charger device 1302 and the other wireless chargers below.

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system may be said to be "attached" to each other.)

For purposes of the present description, a number of different categories of devices can be distinguished. As used herein, a "portable electronic device" refers generally to any electronic device that is portable and that consumes power and provides at least some interaction with the user. Examples of portable electronic devices include: smart phones and other mobile phones; tablet computers; laptop computers; wearable devices (e.g., smart watches, headphones, earbuds); and any other electronic device that a user may carry or wear. Other portable electronic devices can include robotic devices, remote-controlled devices, personal-care appliances, and so on.

An "accessory device" (or "accessory") refers generally to a device that is useful in connection with a portable electronic device to enhance the functionality and/or esthetics of the portable electronic device. Many categories of accessories may incorporate magnetic alignment. For example, one category of accessories includes wireless charger accessories. As used herein, a "wireless charger accessory" (or "wireless charger device" or just "wireless charger") is an accessory that can provide power to a portable electronic device using wireless power transfer techniques. A "battery pack" (or "external battery") is a type of wireless charger accessory that incorporates a battery to store charge that can be transferred to the portable electronic device. In some embodiments, a battery pack may also receive power wirelessly from another wireless charger accessory. Wireless charger accessories may also be referred to as "active" accessories, in reference to their ability to provide and/or receive power. Other accessories are "passive accessories" that do not provide or receive power. For example, some passive accessories are "cases" that can cover one or more surfaces of the portable electronic device to provide protection (e.g., against damage caused by impact of the portable electronic device with other objects), esthetic enhancements (e.g., decorative colors or the like), and/or functional enhancements (e.g., cases that incorporate storage pockets, batteries, card readers, or sensors of various types). Cases can have a variety of form factors. For example, a "tray" can refer to a case that has a rear panel covering the back surface of the portable electronic device and side surfaces to secure the portable electronic device in the tray while leaving the front surface (which may include a display) exposed. A "sleeve" can refer to a case that has front and back panels with an open end (or "throat") into which a portable electronic device can be inserted so that the front and back surfaces of the device are covered; in some instances, the front panel of a sleeve can include a window through which a portion (or all) of a display of the portable electronic device is visible. A "folio" can refer to a case that has a retention portion that covers at least the back surface (and sometimes also one or more side surfaces) of the portable electronic device and a cover that can be closed to cover the display or opened to expose the display. It should be understood that not all cases are passive accessories. For example, a "battery case" can incorporate a battery pack in addition to protective and/or esthetic features; a battery case can be shaped generally as a tray, sleeve, or folio. Other examples of active cases can include cases that incorporate card readers, sensors, batteries, or other electronic components that enhance functionality of a portable electronic device.

In the present description, a distinction is sometimes made between a "charge-through accessory," which is an accessory that can be positioned between a portable electronic device and a wireless charger device without interfering with wireless power transfer between the wireless charger device and the portable electronic device, and a "terminal accessory," which is an accessory that is not a charge-through accessory. A wireless charging accessory is typically a terminal accessory, but not all terminal accessories provide wireless charging of a portable electronic device. For example some terminal accessories can be "mounting" accessories that are designed to hold the portable electronic device in a particular position. Examples of mounting include tripods, docking stations, other stands, or mounts that can hold a portable electronic device in a desired position and/or orientation (which might or might not be adjustable). Such accessories might or might not incorporate wireless charging capability.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory. (In this disclosure, adjectives such as "annular," "magnetic," "primary," "secondary" and "auxiliary" may be omitted when the context is clear.)

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. It should be understood that any device that has an annular alignment component might or might not also have a rotational alignment component, and rotational alignment components may be categorized as primary, secondary, or auxiliary depending on the type of device.

In some embodiments, a magnetic alignment system can also include a near-field communication (NFC) coil and supporting circuitry to allow devices to identify themselves to each other using an NFC protocol. An NFC coil in a particular device can be an annular coil that is disposed inboard of the annular alignment component or outboard of the annular alignment component. For example, in a device that has an annular alignment component surrounding an inductive charging coil, the NFC coil can be disposed in an annular gap between the inductive charging coil and the annular alignment component. It should be understood that an NFC component is optional in the context of providing magnetic alignment.

Figure 13:
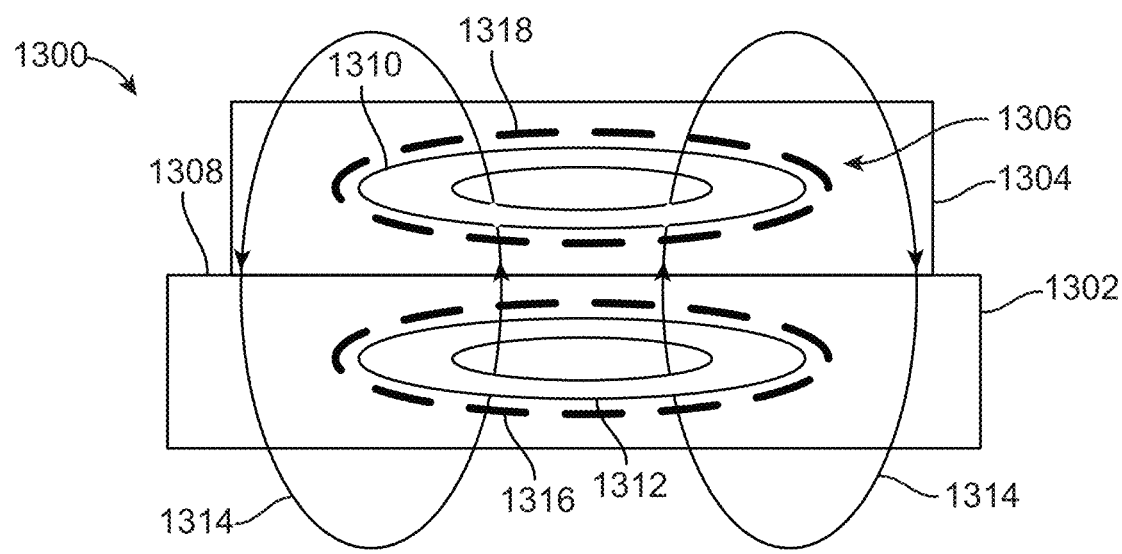
FIG. 13 shows a simplified representation of a wireless charging system incorporating a magnetic alignment system according to some embodiments.

FIG. 13 shows a simplified representation of a wireless charging system 1300 incorporating a magnetic alignment system 1306 according to some embodiments. A portable electronic device 1304 is positioned on a charging or contacting surface 1308 of a wireless charger device 1302. Portable electronic device 1304 can be a consumer electronic device, such as any of the battery packs above, a smart phone, tablet, wearable device, or the like, or any other electronic device for which wireless charging is desired. Wireless charger device 1302 can be any device that is configured to generate time-varying magnetic flux to induce a current in a suitably configured receiving device. For instance, wireless charger device 1302 can be a wireless charging mat, puck, docking station, or the like. Wireless charger device 1302 can include or have access to a power source such as battery power or standard AC power.

To enable wireless power transfer, portable electronic device 1304 and wireless charger device 1302 can include inductive coils 1310 and 1312, respectively, which can operate to transfer power between them. For example, inductive coil 1312 can be a transmitter coil that generates a time-varying magnetic flux 1314, and inductive coil 1310 can be a receiver coil in which an electric current is induced in response to time-varying magnetic flux 1314. The received electric current can be used to charge a battery of portable electronic device 1304, to provide operating power to a component of portable electronic device 1304, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 1312 and 1310. According to some embodiments, magnetic alignment system 1306 can provide such alignment. In the example shown in FIG. 13, magnetic alignment system 1306 includes a primary magnetic alignment component 1316 disposed within or on a surface of wireless charger device 1302 and a secondary magnetic alignment component 1318 disposed within or on a surface of portable electronic device 1304. Primary and secondary alignment components 1316 and 1318 are configured to magnetically attract one another into an aligned position in which inductive coils 1310 and 1312 are aligned with one another to provide efficient wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

Figure 14A:
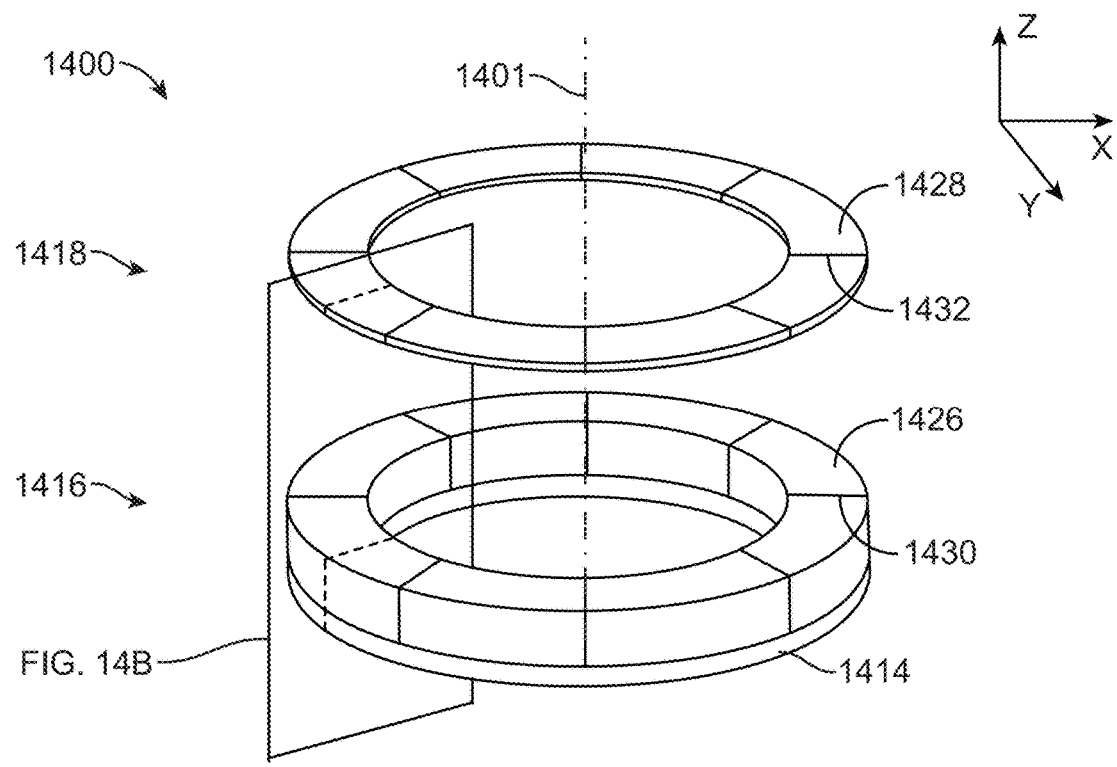
FIG. 14A shows a perspective view of a magnetic alignment system according to some embodiments.
Figure 14B:
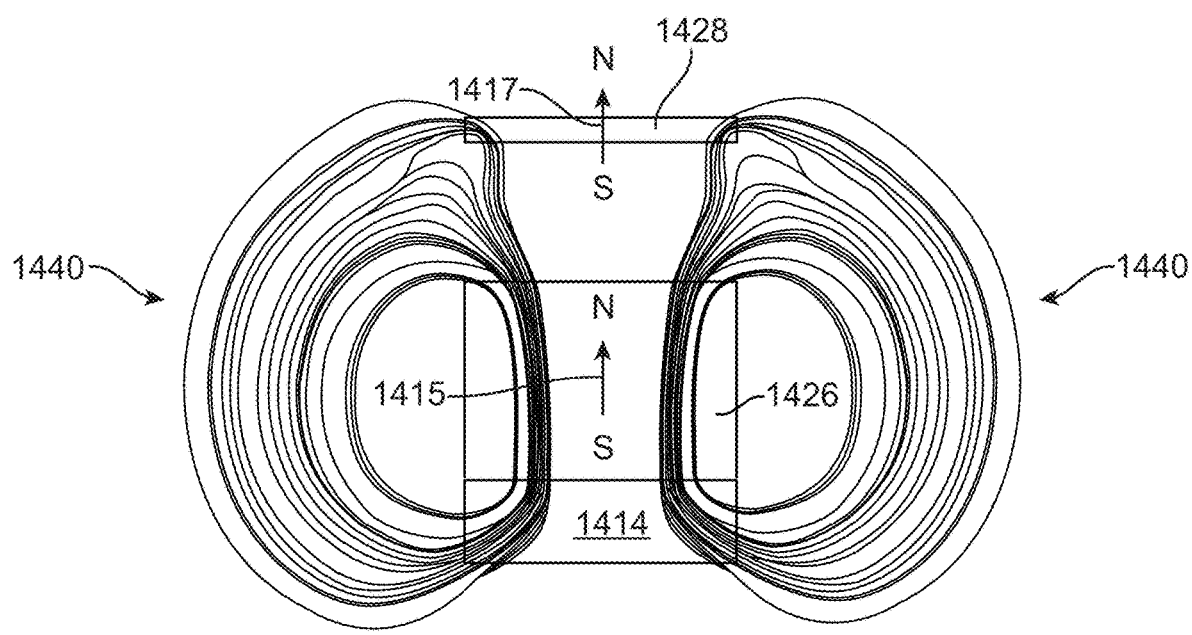
FIG. 14B shows a cross-section through the magnetic alignment system of FIG. 14A.

FIG. 14A shows a perspective view of a magnetic alignment system 1400 according to some embodiments, and FIG. 14B shows a cross-section through magnetic alignment system 1400 across the cut plane indicated in FIG. 14A. Magnetic alignment system 1400 can be an implementation of magnetic alignment system 1306 of FIG. 13. In magnetic alignment system 1400, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 1401 of magnetic alignment system 1400, and a transverse plane (also referred to as a "lateral" or "x" or "y" direction) is defined to be normal to axis 1401. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (The terms "top" and "bottom" may be used in reference to a particular view shown in a drawing but have no other significance.)

As shown in FIG. 14A, magnetic alignment system 1400 can include a primary alignment component 1416 (which can be an implementation of primary alignment component 1316 of FIG. 13) and a secondary alignment component 1418 (which can be an implementation of secondary alignment component 1318 of FIG. 13). Primary alignment component 1416 and secondary alignment component 1418 have annular shapes and may also be referred to as "annular" alignment components. The particular dimensions can be chosen as desired. In some embodiments, primary alignment component 1416 and secondary alignment component 1418 can each have an outer diameter of about 174 mm and a radial width of about 18 mm. The outer diameters and radial widths of primary alignment component 1416 and secondary alignment component 1418 need not be exactly equal. For instance, the radial width of secondary alignment component 1418 can be slightly less than the radial width of primary alignment component 1416 and/or the outer diameter of secondary alignment component 1418 can also be slightly less than the radial width of primary alignment component 1416 so that, when in alignment, the inner and outer sides of primary alignment component 1416 extend beyond the corresponding inner and outer sides of secondary alignment component 1418. Thicknesses (or axial dimensions) of primary alignment component 1416 and secondary alignment component 1418 can also be chosen as desired. In some embodiments, primary alignment component 1416 has a thickness of about 13.5 mm while secondary alignment component 1418 has a thickness of about 0.37 mm.

Primary alignment component 1416 can include a number of sectors, each of which can be formed of one or more primary arcuate magnets 1426, and secondary alignment component 1418 can include a number of sectors, each of which can be formed of one or more secondary arcuate magnets 1428. In the example shown, the number of primary magnets 1426 is equal to the number of secondary magnets 1428, and each sector includes exactly one magnet, but this is not required. Primary magnets 1426 and secondary magnets 1428 can have arcuate (or curved) shapes in the transverse plane such that when primary magnets 1426 (or secondary magnets 1428) are positioned adjacent to one another end-to-end, primary magnets 1426 (or secondary magnets 1428) form an annular structure as shown. In some embodiments, primary magnets 1426 can be in contact with each other at interfaces 1430, and secondary magnets 1428 can be in contact with each other at interfaces 1432. Alternatively, small gaps or spaces may separate adjacent primary magnets 1426 or secondary magnets 1428, providing a greater degree of tolerance during manufacturing.

In some embodiments, primary alignment component 1416 can also include an annular shield 1414 (also referred to as a DC magnetic shield or DC shield) disposed on a distal surface of primary magnets 1426. In some embodiments, shield 1414 can be formed as a single annular piece of material and adhered to primary magnets 1426 to secure primary magnets 1426 into position. Shield 1414 can be formed of a material that has high magnetic permeability, such as stainless steel, and can redirect magnetic fields to prevent them from propagating beyond the distal side of primary alignment component 1416, thereby protecting sensitive electronic components located beyond the distal side of primary alignment component 1416 from magnetic interference.

Primary magnets 1426 and secondary magnets 1428 (and all other magnets described herein) can be made of a magnetic material such as an NdFeB material, other rare earth magnetic materials, or other materials that can be magnetized to create a persistent magnetic field. In some embodiments, the magnets can be plated with a thin layer (e.g., 19-13 μm) of NiCuNi or similar materials. Each primary magnet 1426 and each secondary magnet 1428 can have a monolithic structure having a single magnetic region with a magnetic polarity aligned in the axial direction as shown by magnetic polarity indicators 1415, 1417 in FIG. 14B. For example, each primary magnet 1426 and each secondary magnet 1428 can be a bar magnet that has been ground and shaped into an arcuate structure having an axial magnetic orientation. (As will be apparent, the term "magnetic orientation" refers to the direction of orientation of the magnetic polarity of a magnet or magnetized region.) In the example shown, primary magnet 1426 has its north pole oriented toward the proximal surface and south pole oriented toward the distal surface while secondary magnet 1428 has its south pole oriented toward the proximal surface and north pole oriented toward the distal surface. In other embodiments, the magnetic orientations can be reversed such that primary magnet 1426 has its south pole oriented toward the proximal surface and north pole oriented toward the distal surface while secondary magnet 1428 has its north pole oriented toward the proximal surface and south pole oriented toward the distal surface.

As shown in FIG. 14B, the axial magnetic orientation of primary magnet 1426 and secondary magnet 1428 can generate magnetic fields 1440 that exert an attractive force between primary magnet 1426 and secondary magnet 1428, thereby facilitating alignment between respective electronic devices in which primary alignment component 1416 and secondary alignment component 1418 are disposed (e.g., as shown in FIG. 13). While shield 1414 can redirect some of magnetic fields 1440 away from regions below primary magnet 1426, magnetic fields 1440 may still propagate to regions laterally adjacent to primary magnet 1426 and secondary magnet 1428. In some embodiments, the lateral propagation of magnetic fields 1440 may result in magnetic field leakage to other magnetically sensitive components. For instance, if an inductive coil having a ferromagnetic shield is placed in the interior (or inboard) region of annular primary alignment component 1416 (or secondary alignment component 1418), leakage of magnetic fields 1440 may saturate the ferrimagnetic shield, which can degrade wireless charging performance.

It will be appreciated that magnetic alignment system 1400 is illustrative and that variations and modifications are possible. For instance, while primary alignment component 1416 and secondary alignment component 1418 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 1416 and/or secondary alignment component 1418 can each be formed of a single, monolithic annular magnet; however, segmenting magnetic alignment components 1416 and 1418 into arcuate magnets may improve manufacturing because (for some types of magnetic material) smaller arcuate segments may be less brittle than a single, monolithic annular magnet and less prone to yield loss due to physical stresses imposed on the magnetic material during manufacturing.

As noted above with reference to FIG. 14B, a magnetic alignment system with a single axial magnetic orientation may allow lateral leakage of magnetic fields, which may adversely affect performance of other components of an electronic device. Accordingly, some embodiments provide magnetic alignment systems with a "closed-loop" configuration that reduces magnetic field leakage. Examples will now be described.

Figure 15A:
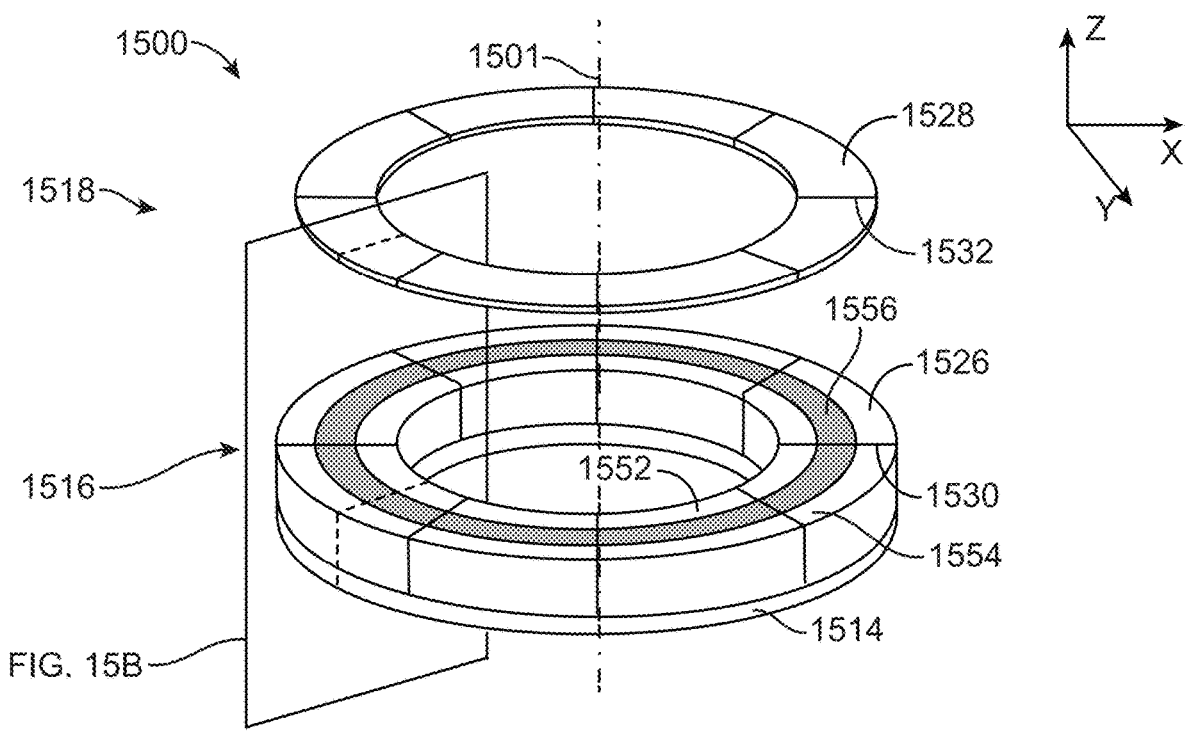
FIG. 15A shows a perspective view of a magnetic alignment system according to some embodiments.
Figure 15B:
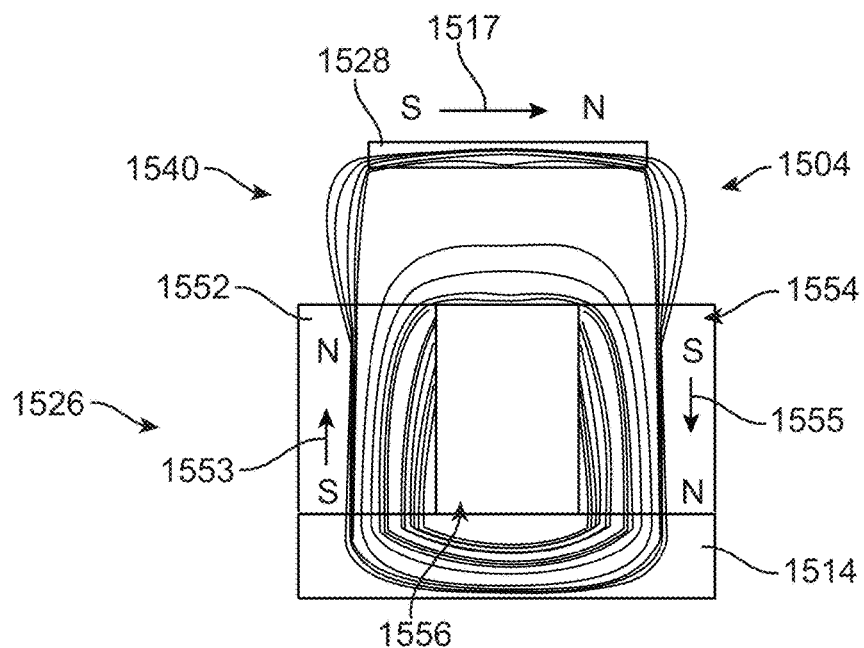
FIG. 15B shows a cross-section through the magnetic alignment system of FIG. 15A.

FIG. 15A shows a perspective view of a magnetic alignment system 1500 according to some embodiments, and FIG. 15B shows a cross-section through magnetic alignment system 1500 across the cut plane indicated in FIG. 15A. Magnetic alignment system 1500 can be an implementation of magnetic alignment system 1306 of FIG. 13. In magnetic alignment system 1500, the alignment components have magnetic components configured in a "closed loop" configuration as described below.

As shown in FIG. 15A, magnetic alignment system 1500 can include a primary alignment component 1516 (which can be an implementation of primary alignment component 1316 of FIG. 13) and a secondary alignment component 1518 (which can be an implementation of secondary alignment component 1318 of FIG. 13). Primary alignment component 1516 and secondary alignment component 1518 have annular shapes and may also be referred to as "annular"

alignment components. The particular dimensions can be chosen as desired. In some embodiments, primary alignment component 1516 and secondary alignment component 1518 can each have an outer diameter of about 174 mm and a radial width of about 18 mm. The outer diameters and radial widths of primary alignment component 1516 and secondary alignment component 1518 need not be exactly equal. For instance, the radial width of secondary alignment component 1518 can be slightly less than the radial width of primary alignment component 1516 and/or the outer diameter of secondary alignment component 1518 can also be slightly less than the radial width of primary alignment component 1516 so that, when in alignment, the inner and outer sides of primary alignment component 1516 extend beyond the corresponding inner and outer sides of secondary alignment component 1518. Thicknesses (or axial dimensions) of primary alignment component 1516 and secondary alignment component 1518 can also be chosen as desired. In some embodiments, primary alignment component 1516 has a thickness of about 13.5 mm while secondary alignment component 1518 has a thickness of about 0.37 mm.

Primary alignment component 1516 can include a number of sectors, each of which can be formed of a number of primary magnets 1526, and secondary alignment component 1518 can include a number of sectors, each of which can be formed of a number of secondary magnets 1528. In the example shown, the number of primary magnets 1526 is equal to the number of secondary magnets 1528, and each sector includes exactly one magnet, but this is not required; for example, as described below a sector may include multiple magnets. Primary magnets 1526 and secondary magnets 1528 can have arcuate (or curved) shapes in the transverse plane such that when primary magnets 1526 (or secondary magnets 1528) are positioned adjacent to one another end-to-end, primary magnets 1526 (or secondary magnets 1528) form an annular structure as shown. In some embodiments, primary magnets 1526 can be in contact with each other at interfaces 1530, and secondary magnets 1528 can be in contact with each other at interfaces 1532. Alternatively, small gaps or spaces may separate adjacent primary magnets 1526 or secondary magnets 1528, providing a greater degree of tolerance during manufacturing.

In some embodiments, primary alignment component 1516 can also include an annular shield 1514 (also referred to as a DC magnetic shield or DC shield) disposed on a distal surface of primary magnets 1526. In some embodiments, shield 1514 can be formed as a single annular piece of material and adhered to primary magnets 1526 to secure primary magnets 1526 into position. Shield 1514 can be formed of a material that has high magnetic permeability, such as stainless steel, and can redirect magnetic fields to prevent them from propagating beyond the distal side of primary alignment component 1516, thereby protecting sensitive electronic components located beyond the distal side of primary alignment component 1516 from magnetic interference.

Primary magnets 1526 and secondary magnets 1528 can be made of a magnetic material such as an NdFeB material, other rare earth magnetic materials, or other materials that can be magnetized to create a persistent magnetic field. Each secondary magnet 1528 can have a single magnetic region with a magnetic polarity having a component in the radial direction in the transverse plane (as shown by magnetic polarity indicator 1517 in FIG. 15B). As described below, the magnetic orientation can be in a radial direction with respect to axis 1501 or another direction having a radial component in the transverse plane. Each primary magnet 1526 can include two magnetic regions having opposite magnetic orientations. For example, each primary magnet 1526 can include an inner arcuate magnetic region 1552 having a magnetic orientation in a first axial direction (as shown by polarity indicator 1553 in FIG. 15B), an outer arcuate magnetic region 1554 having a magnetic orientation in a second axial direction opposite the first direction (as shown by polarity indicator 1555 in FIG. 15B), and a central non-magnetized region 1556 that does not have a magnetic orientation. Central non-magnetized region 1556 can magnetically separate inner arcuate region 1552 from outer arcuate region 1554 by inhibiting magnetic fields from directly crossing through central region 1556. Magnets having regions of opposite magnetic orientation separated by a non-magnetized region are sometimes referred to herein as having a "quad-pole" configuration.

In some embodiments, each secondary magnet 1528 can be made of a magnetic material that has been ground and shaped into an arcuate structure, and a magnetic orientation having a radial component in the transverse plane can be created, e.g., using a magnetizer. Similarly, each primary magnet 1526 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 1526 can be a compound structure with two arcuate pieces of magnetic material providing inner arcuate magnetic region 1552 and outer arcuate magnetic region 1554; in such embodiments, central non-magnetized region 1556 can be can be formed of an arcuate piece of nonmagnetic (or demagnetized) material or formed as an air gap defined by sidewalls of inner arcuate magnetic region 1552 and outer arcuate magnetic region 1554. DC shield 1514 can be formed of a material that has high magnetic permeability, such as stainless steel or low carbon steel, and can be plated, e.g., with 17-10 μm of matte Ni. Alternatively, DC shield 1514 can be formed of a magnetic material having a radial magnetic orientation (in the opposite direction of secondary magnets 1528). In some embodiments, DC shield 1514 can be omitted entirely.

As shown in FIG. 15B, the magnetic polarity of secondary magnet 1528 (shown by indicator 1517) can be oriented such that when primary alignment component 1516 and secondary alignment component 1518 are aligned, the south pole of secondary magnet 1528 is oriented toward the north pole of inner arcuate magnetic region 1552 (shown by indicator 1553) while the north pole of secondary magnet 1528 is oriented toward the south pole of outer arcuate magnetic region 1554 (shown by indicator 1555). Accordingly, the respective magnetic orientations of inner arcuate magnetic region 1552, secondary magnet 1528 and outer arcuate magnetic region 1556 can generate magnetic fields 1540 that exert an attractive force between primary magnet 1526 and secondary magnet 1528, thereby facilitating alignment between respective electronic devices in which primary alignment component 1516 and secondary alignment component 1518 are disposed (e.g., as shown in FIG. 13). Shield 1514 can redirect some of magnetic fields 1540 away from regions below primary magnet 1526. Further, the "closed-loop" magnetic field 1540 formed around central non-magnetized region 1556 can have tight and compact field lines that do not stray outside of primary and secondary magnets 1526 and 1528 as far as magnetic field 1440 strays outside of primary and secondary magnets 1426 and 1428 in FIG. 14B. Thus, magnetically sensitive components can be placed relatively close to primary alignment component 1516 with reduced concern for stray magnetic fields. Accordingly, as compared to magnetic alignment system 1400, magnetic alignment system 1500 can help to reduce the overall size of a device in which primary alignment component 1516 is positioned and can also help reduce noise created by magnetic field 1540 in adjacent components or devices, such as an inductive receiver coil positioned inboard of secondary alignment component 1518.

While each primary magnet 1526 includes two regions of opposite magnetic orientation, it should be understood that the two regions can but need not provide equal magnetic field strength. For example, outer arcuate magnetized region 1554 can be more strongly polarized than inner arcuate magnetized region 1552. Depending on the particular implementation of primary magnets 1526, various techniques can be used to create asymmetric polarization strength. For example, inner arcuate region 1552 and outer arcuate region 1554 can have different radial widths; increasing radial width of a magnetic region increases the field strength of that region due to increased volume of magnetic material. Where inner arcuate region 1552 and outer arcuate region 1554 are discrete magnets, magnets having different magnetic strength can be used.

In some embodiments, having an asymmetric polarization where outer arcuate region 1554 is more strongly polarized than inner arcuate region 1552 can create a flux "sinking" effect toward the outer pole. This effect can be desirable in various situations. For example, when primary magnet 1526 is disposed within a wireless charger device and the wireless charger device is used to charge a "legacy" portable electronic device that has an inductive receiver coil but does not have a secondary (or any) annular magnetic alignment component, the (DC) magnetic flux from the primary annular alignment component may enter a ferrite shield around the inductive receiver coil. The DC magnetic flux can contribute to saturating the ferrite shield and reducing charging performance. Providing a primary annular alignment component with a stronger field at the outer arcuate region than the inner arcuate region can help to draw DC magnetic flux away from the ferrite shield, which can improve charging performance when a wireless charger device having an annular magnetic alignment component is used to charge a portable electronic device that lacks an annular magnetic alignment component.

It will be appreciated that magnetic alignment system 1500 is illustrative and that variations and modifications are possible. For instance, while primary alignment component 1516 and secondary alignment component 1518 are each shown as being constructed of eight arcuate magnets, other embodiments may use a different number of magnets, such as 136 magnets, 138 magnets, 152 magnets, 156 magnets, or any other number of magnets, and the number of primary magnets need not be equal to the number of secondary magnets. In other embodiments, secondary alignment component 1518 can be formed of a single, monolithic annular magnet. Similarly, primary alignment component 1516 can be formed of a single, monolithic annular piece of magnetic material with an appropriate magnetization pattern as described above, or primary alignment component 1516 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 16:
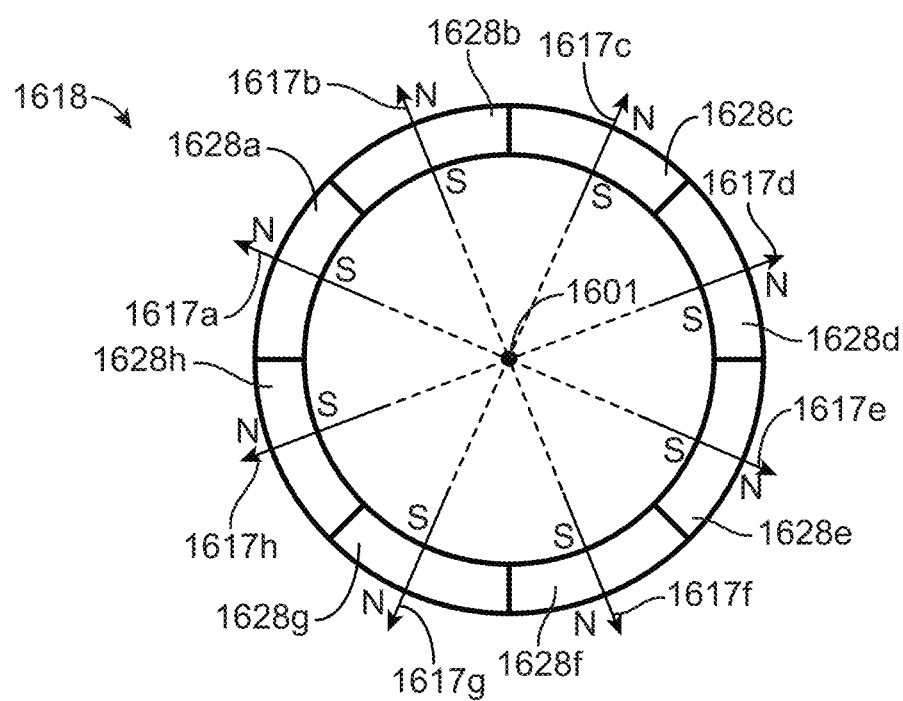
FIG. 16 shows a simplified top-down view of a secondary alignment component according to some embodiments.

As noted above, in embodiments of magnetic alignment systems having closed-loop magnetic orientations, such as magnetic alignment system 1500, secondary alignment component 1518 can have a magnetic orientation with a radial component. For example, in some embodiments, secondary alignment component 1518 can have a magnetic polarity in a radial orientation. FIG. 16 shows a simplified top-down view of a secondary alignment component 1618 according to some embodiments. Secondary alignment component 1618, like secondary alignment component 1518, can be formed of arcuate magnets 1628*a-h* having radial magnetic orientations as shown by magnetic polarity indicators 1617*a-h*. In this example, each arcuate magnet 1628*a-h* has a north magnetic pole oriented toward the radially outward side and a south magnetic pole toward the radially inward side; however, this orientation can be reversed, and the north magnetic pole of each arcuate magnet 1628*a-h* can be oriented toward the radially inward side while the south magnetic pole is oriented toward the radially outward side.

Figure 17A:
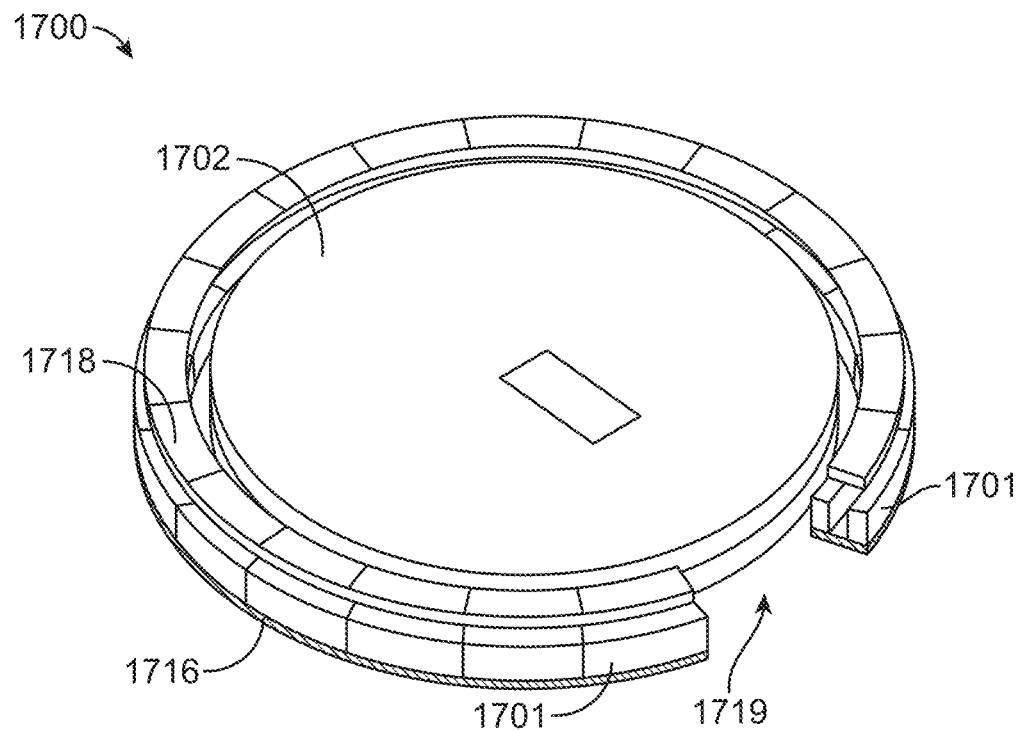
FIG. 17A shows a perspective view of a magnetic alignment system according to some embodiments.

FIG. 17A shows a perspective view of a magnetic alignment system 1700 according to some embodiments. Magnetic alignment system 1700, which can be an implementation of magnetic alignment system 1500, includes a secondary alignment component 1718 having a radially outward magnetic orientation (e.g., as shown in FIG. 16) and a complementary primary alignment component 1716. In this example, magnetic alignment system 1700 includes a gap 1719 between two of the sectors; however, gap 1719 is optional and magnetic alignment system 1700 can be a complete annular structure. Also shown are components 1702, which can include, for example an inductive coil assembly or other components located within the central region of primary magnetic alignment component 1716 or secondary magnetic alignment component 1718. Magnetic alignment system 1700 can have a closed-loop configuration similar to magnetic alignment system 1500 (as shown in FIG. 15B) and can include arcuate sectors 1701, each of which can be made of one or more arcuate magnets. In some embodiments, the closed-loop configuration of magnetic alignment system 1700 can reduce or prevent magnetic field leakage that may affect components 1702.

Figure 17B:
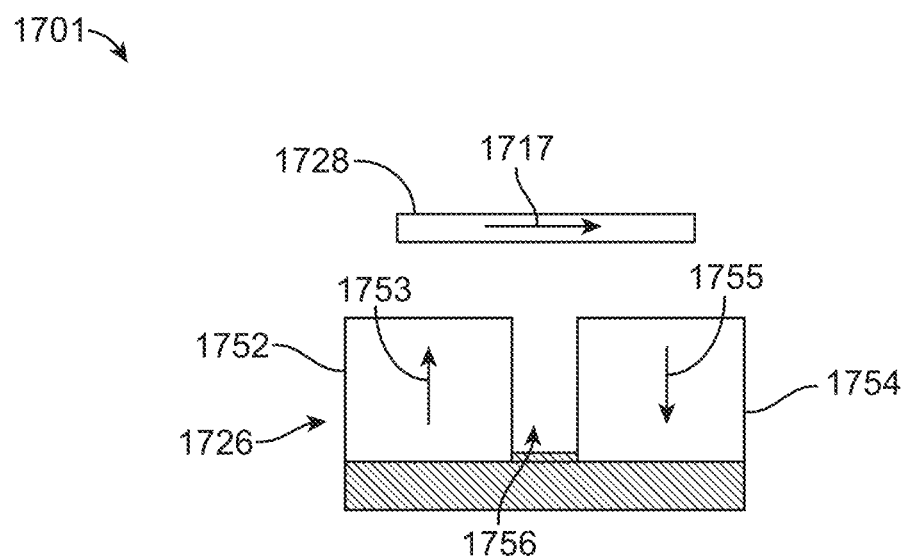

FIG. 17B shows an axial cross-section view through one of arcuate sectors 1701. Arcuate sector 1701 includes a primary magnet 1726 and a secondary magnet 1728. As shown by orientation indicator 1717, secondary magnet 1728 has a magnetic polarity oriented in a radially outward direction, i.e., the north magnetic pole is toward the radially outward side of magnetic alignment system 1700. Like primary magnets 1526 described above, primary magnet 1726 includes an inner arcuate magnetic region 1752, an outer arcuate magnetic region 1754, and a central non-magnetized region 1756 (which can include, e.g., an air gap or a region of nonmagnetic or non-magnetized material). Inner arcuate magnetic region 1752 has a magnetic polarity oriented axially such that the north magnetic pole is toward secondary magnet 1728, as shown by indicator 1753, while outer arcuate magnetic region 1754 has an opposite magnetic orientation, with the south magnetic pole oriented toward secondary magnet 1728, as shown by indicator 1755. As described above with reference to FIG. 15B, the arrangement of magnetic orientations shown in FIG. 17B results in magnetic attraction between primary magnet 1726 and secondary magnet 1728. In some embodiments, the magnetic polarities can be reversed such that the north magnetic pole of secondary magnet 1728 is oriented toward the radially inward side of magnetic alignment system 1700, the north magnetic pole of outer arcuate region 1754 of primary magnet 1726 is oriented toward secondary magnet 1728, and the north magnetic pole of inner arcuate region 1752 is oriented away from secondary magnet 1728.

When primary alignment component 1716 and secondary alignment component 1718 are aligned, the radially symmetrical arrangement and directional equivalence of magnetic polarities of primary alignment component 1716 and secondary alignment component 1718 allow secondary alignment component 1718 to rotate freely (relative to primary alignment component 1716) in the clockwise or counterclockwise direction in the lateral plane while maintaining alignment along the axis.

Figure 17C:
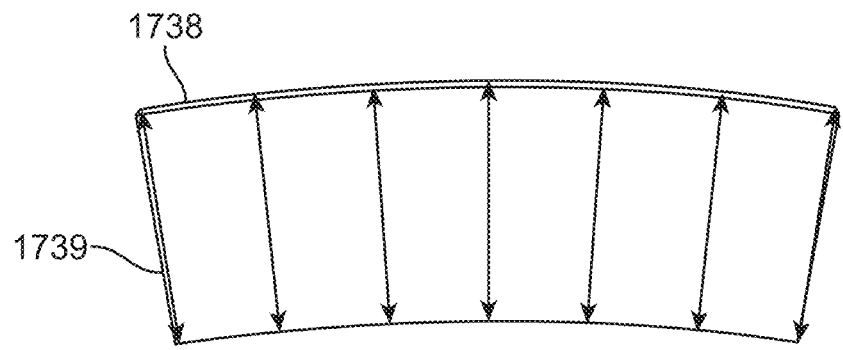
FIGS. 17C through 17E show examples of arcuate magnets with radial magnetic orientation according to some embodiments.
Figure 17D:
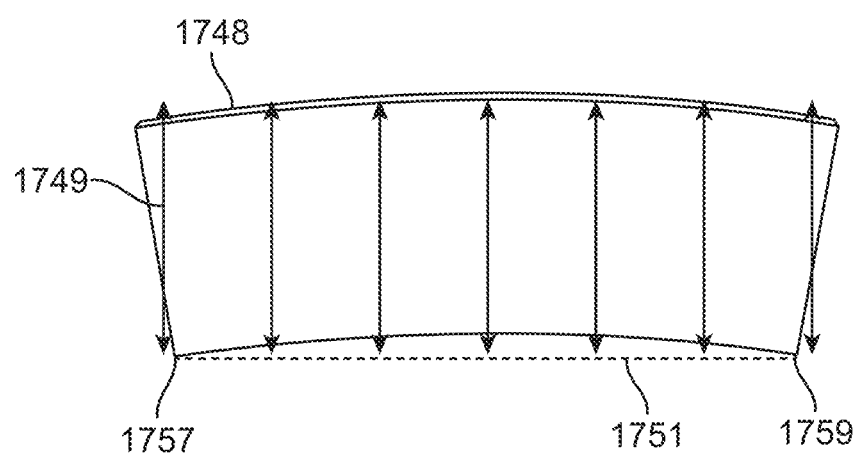
Figure 17E:
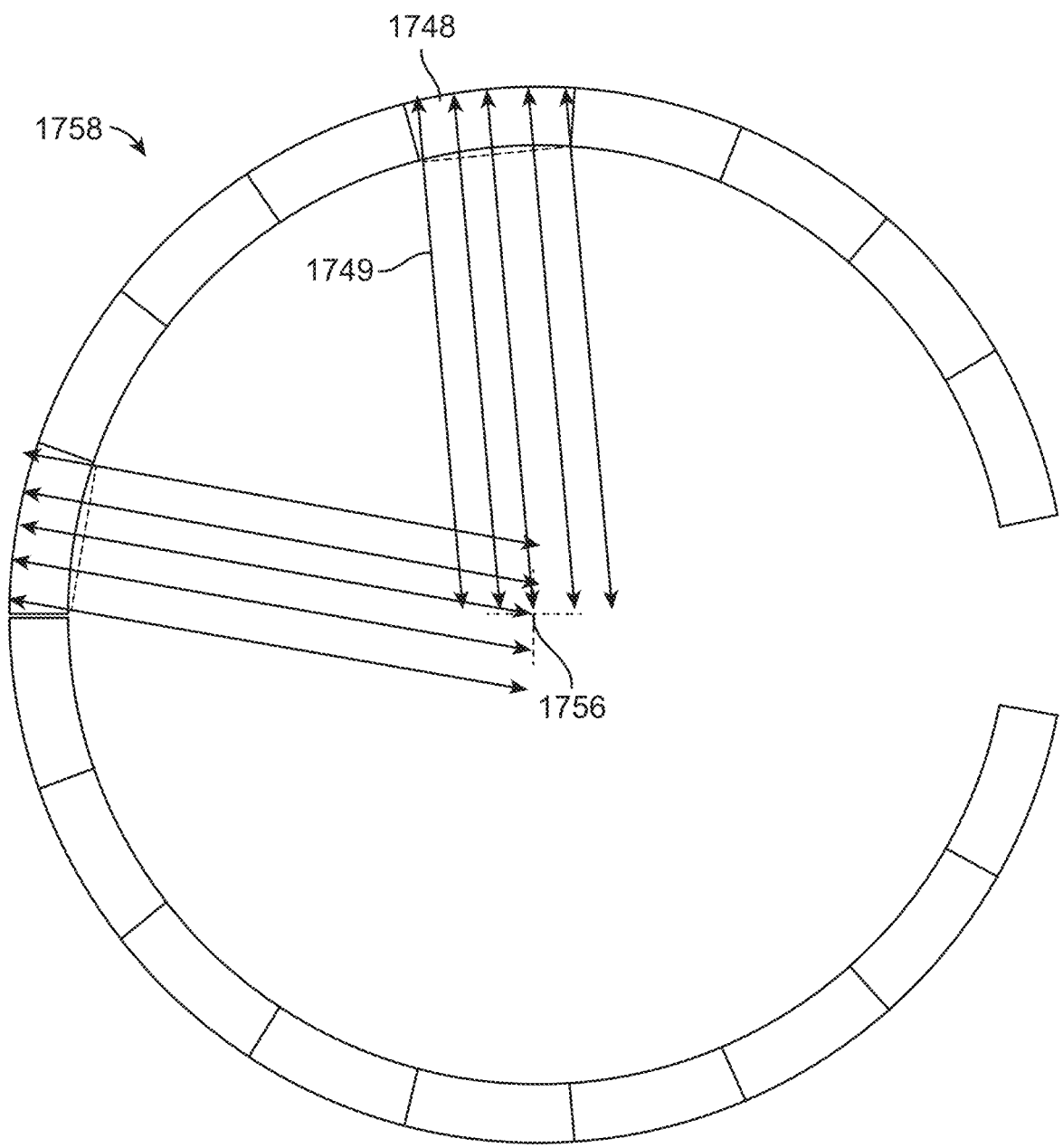

As used herein, a "radial" orientation need not be exactly or purely radial. For example, FIG. 17C shows a secondary arcuate magnet 1738 according to some embodiments. Secondary arcuate magnet 1738 has a purely radial magnetic orientation, as indicated by arrows 1739. Each arrow 1739 is directed at the center of curvature of magnet 1738; if extended inward, arrows 1739 would converge at the center of curvature. However, achieving this purely radial magnetization requires that magnetic domains within magnet 1738 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 17C. FIG. 17D shows a secondary arcuate magnet 1748 with pseudo-radial magnetic orientation according to some embodiments. Magnet 1748 has a magnetic orientation, shown by arrows 1749, that is perpendicular to a baseline 1751 connecting the inner corners 1757, 1759 of arcuate magnet 1748. If extended inward, arrows 1749 would not converge. Thus, neighboring magnetic domains in magnet 1748 are parallel to each other, which is readily achievable in magnetic materials such as NdFeB. The overall effect in a magnetic alignment system, however, can be similar to the purely radial magnetic orientation shown FIG. 17C. FIG. 17E shows a secondary annular alignment component 1758 made up of magnets 1748 according to some embodiments. Magnetic orientation arrows 1749 have been extended to the center point 1761 of annular alignment component 1758. As shown the magnetic field direction can be approximately radial, with the closeness of the approximation depending on the number of magnets 1748 and the inner radius of annular alignment component 1758. In some embodiments, 138 magnets 1748 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 1718 (e.g., as shown in FIG. 17B) provides a magnetic force profile between secondary alignment component 1718 and primary alignment component 1716 that is the same around the entire circumference of the magnetic alignment system. The radial magnetic orientation can also result in greater magnetic permeance, which allows secondary alignment component 1718 to resist demagnetization as well as enhancing the attractive force in the axial direction and improving shear force in the lateral directions when the two components are aligned.

Figure 18A:
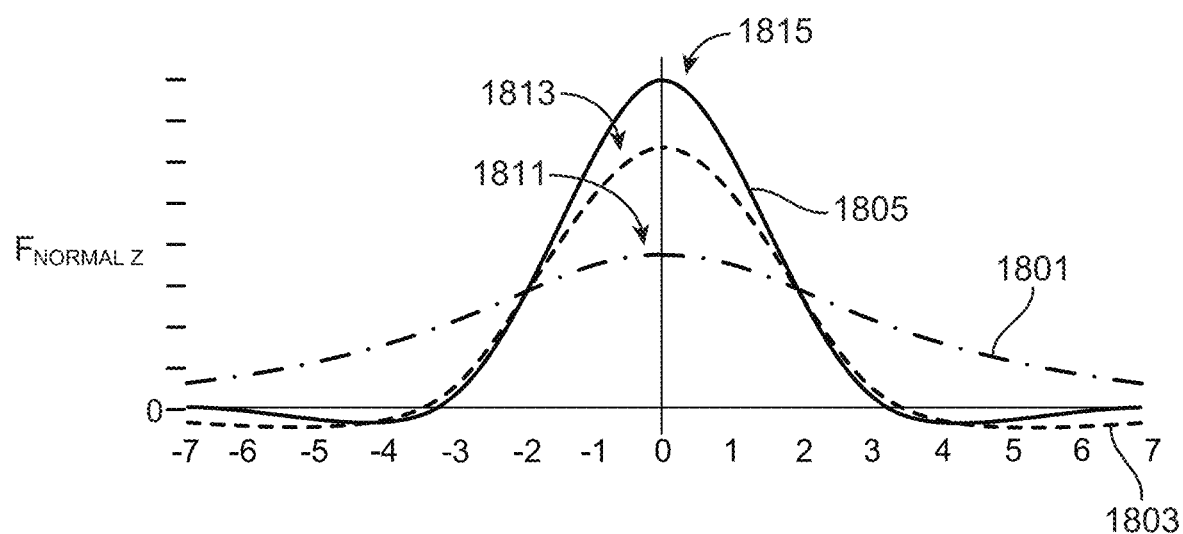
FIGS. 18A and 18B show graphs of force profiles for different magnetic alignment systems, according to some embodiments.
Figure 18B:
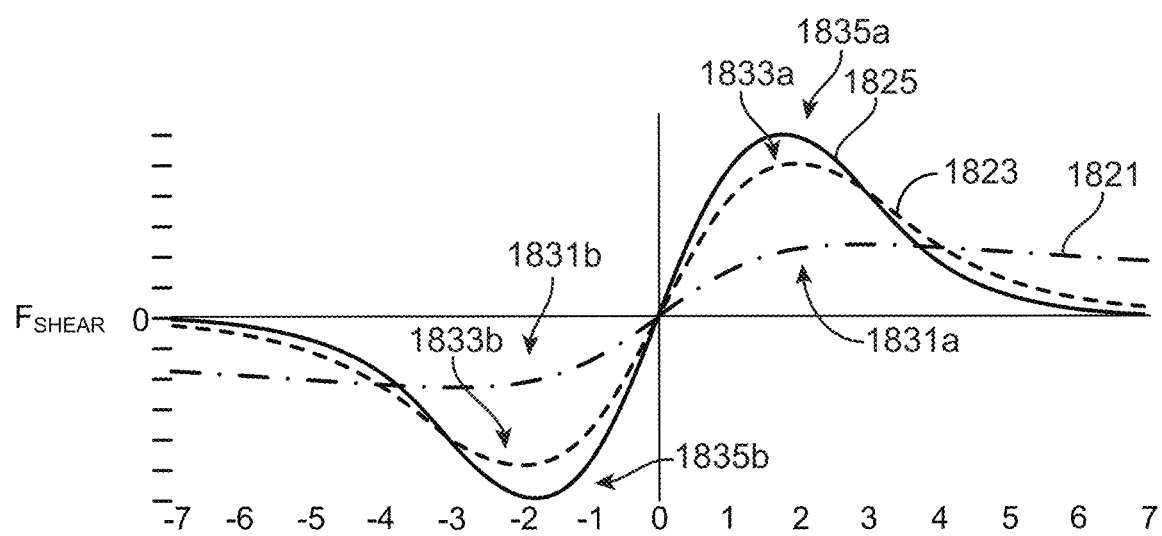

FIGS. 18A and 18B show graphs of force profiles for different magnetic alignment systems, according to some embodiments. Specifically, FIG. 18A shows a graph 1800 of vertical attractive (normal) force in the axial (z) direction for different magnetic alignment systems of comparable size and using similar types of magnets. Graph 1800 has a horizontal axis representing displacement from a center of alignment, where 0 represents the aligned position and negative and positive values represent displacements from the aligned position in opposite directions (in arbitrary units), and a vertical axis showing the normal force ($F_{NORMAL}$) as a function of displacement in the lateral plane (also in arbitrary units). For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 1800 shows normal force profiles for three different types of magnetic alignment systems. A first type of magnetic alignment system uses "central" alignment components, such as a pair of complementary disc-shaped magnets placed along an axis; a representative normal force profile for a central magnetic alignment system is shown as line 1801 (dot-dash line). A second type of magnetic alignment system uses annular alignment components with axial magnetic orientations, e.g., magnetic alignment system 1400 of FIGS. 14A and 14B; a representative normal force profile for such an annular-axial magnetic alignment system is shown as line 1803 (dashed line). A third type of magnetic alignment system uses annular alignment components with closed-loop magnetic orientations and radial symmetry (e.g., magnetic alignment system 1700 of FIGS. 17A and 17B); a representative normal force profile for a radially symmetric closed-loop magnetic alignment system is shown as line 1805 (solid line).

Similarly, FIG. 18B shows a graph 1820 of lateral (shear) force in a transverse direction for different magnetic alignment systems. Graph 1820 has a horizontal axis representing lateral displacement in opposing directions from a center of alignment, using the same convention as graph 1800, and a vertical axis showing the shear force ($F_{SHEAR}$) as a function of direction (in arbitrary units). For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 1820 shows shear force profiles for the same three types of magnetic alignment systems as graph 1800: a representative shear force profile for a central magnetic alignment system is shown as line 1821 (dot-dash line); a representative shear force profile for an annular-axial magnetic alignment system is shown as line 1823 (dashed line); and a representative normal force profile for a radially symmetric closed-loop magnetic alignment system is shown as line 1825 (solid line).

As shown in FIG. 18A, each type of magnetic alignment system achieves the strongest magnetic attraction in the axial direction (i.e., normal force) when the primary and secondary alignment components are in the aligned position (0 on the horizontal axis), as shown by respective peaks 1811, 1813, and 1815. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 1700 of FIG. 17) provides stronger magnetic attraction when in the aligned position than the other types of magnetic alignment systems. This strong attractive normal force can overcome small misalignments and can help to hold devices in the aligned position, thereby can achieving a more accurate and robust alignment between the primary and secondary alignment components, which in turn can provide a more accurate and robust alignment between a portable electronic device and a wireless charger device within which the magnetic alignment system is implemented.

As shown in FIG. 18B, the strongest shear forces are obtained when the primary and secondary alignment components are laterally just outside of the aligned position, e.g., at −2 and +2 units of separation from the aligned position, as shown by respective peaks 1831*a-b*, 1833*a-b*, and 1835*a-b*. These shear forces act to urge the alignment components toward the aligned position. Similarly to the normal force, the peak strength of shear force depends on the type of magnetic alignment system. In particular, a radially-symmetric closed-loop magnetic alignment system (e.g., magnetic alignment system 1700 of FIG. 17) provides higher magnitude of shear force when just outside of the aligned position than the other types of magnetic alignment systems. This strong shear force can provide tactile feedback (sometimes described as a sensation of "snappiness") to help the user identify when the two components are aligned. In addition, like the normal force, the shear force can overcome small misalignments due to frictional force and can achieve a more accurate and robust alignment between the primary and secondary alignment components, which in turn can provide a more accurate and robust alignment between a portable electronic device and a wireless charger device within which the magnetic alignment system is implemented.

Depending on the particular configuration of magnets, various design choices can be used to increase the sensation of snappiness for a closed-loop magnetic alignment system. For example, reducing the amount of magnetic material in the devices in areas near the magnetic alignment components—e.g., by using less material or by increasing the distance between the magnetic alignment component and the other magnetic material—can reduce stray fields and increase the perceived "snapping" effect of the magnetic alignment components. As another example, increasing the magnetic-field strength of the alignment magnets (e.g., by increasing the amount of material) can increase both shear and normal forces. As yet another example, the widths of the magnetized regions in the primary annular alignment component (and/or the relative strength of the magnetic field in each region) can be optimized based on the particular magnetic orientation pattern for the secondary annular alignment component (e.g., whether the secondary annular alignment components have the purely radial magnetic orientation of FIG. 17C or the pseudo-radial magnetic orientation of FIG. 17D). Another consideration can be the coefficient of friction between the surfaces of the devices containing primary and secondary alignment components; lower friction decreases resistance to the shear force exerted by the annular magnetic alignment components.

A radially-symmetric closed-loop magnetic alignment system (e.g., magnetic alignment system 1700 of FIGS. 17A and 17B) can provide accurate and robust alignment in the axial and lateral directions. Further, because of the radial symmetry, the alignment system does not have a preferred rotational orientation in the lateral plane about the axis; the shear force profile can be the same regardless of relative rotational orientation of the electronic devices being aligned.

Figure 19:
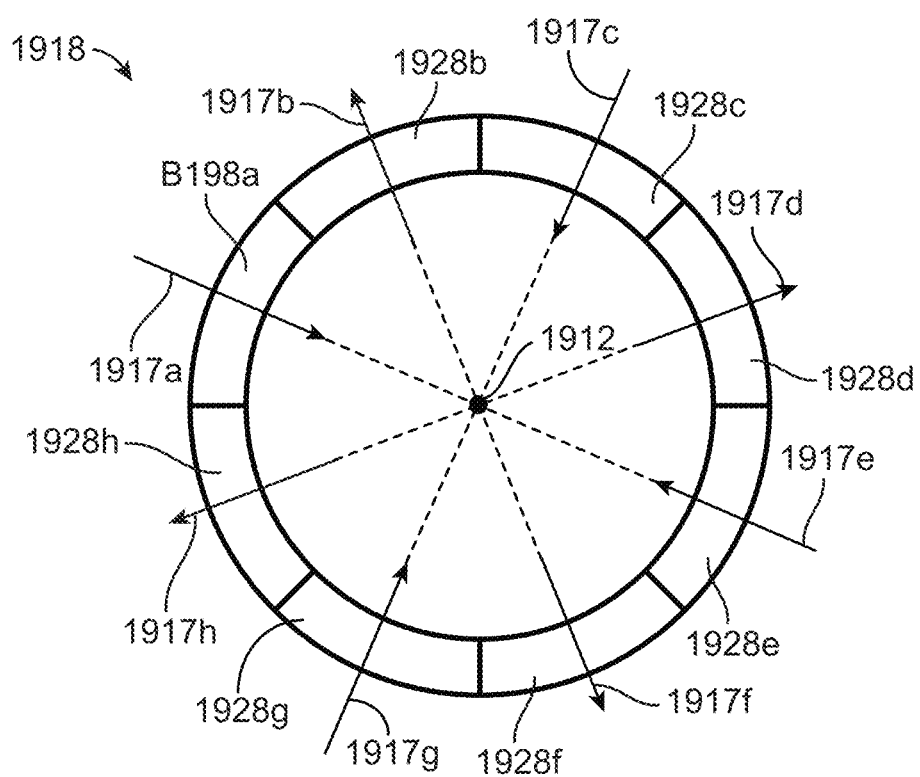
FIG. 19 shows a simplified top-down view of a secondary alignment component according to some embodiments.

In some embodiments, a closed-loop magnetic alignment system can be designed to provide one or more preferred rotational orientations. FIG. 19 shows a simplified top-down view of a secondary alignment component 1918 according to some embodiments. Secondary alignment component 1918 includes sectors 1928*a-h* having radial magnetic orientations as shown by magnetic polarity indicators 1917*a-h*. Each of sectors 1928*a-h* can include one or more secondary arcuate magnets. In this example, secondary magnets in sectors 1928*b*, 1928*d*, 1928*f*, and 1928*h* each have a north magnetic pole oriented toward the radially outward side and a south magnetic pole toward the radially inward side, while secondary magnets in sectors 1928*a*, 1928*c*, 1928*e*, and 1928*g* each have a north magnetic pole oriented toward the radially inward side and a south magnetic pole toward the radially outward side. In other words, magnets in adjacent sectors 1928*a-h* of secondary alignment component 1918 have alternating magnetic orientations.

A complementary primary alignment component can have sectors with correspondingly alternating magnetic orientations. For example, FIG. 20A shows a perspective view of a magnetic alignment system 2000 according to some embodiments. Magnetic alignment system 2000 includes a secondary alignment component 2018 having alternating radial magnetic orientations (e.g., as shown in FIG. 19) and a complementary primary alignment component 2016. Some of the arcuate sections of magnetic alignment system 2000 are not shown in order to reveal internal structure; however, it should be understood that magnetic alignment system 2000 can be a complete annular structure. Also shown are components 2002, which can include, for example, inductive coil assemblies or other components located within the central region of primary annular alignment component 2016 and/or secondary annular alignment component 2018. Magnetic alignment system 2000 can be a closed-loop magnetic alignment system similar to magnetic alignment system 1500 described above and can include arcuate sectors 2001*b*, 2001*c* of alternating magnetic orientations, with each arcuate sector 2001*b*, 2001*c* including one or more arcuate magnets in each of primary annular alignment component 2016 and secondary annular alignment component 2018. In some embodiments, the closed-loop configuration of magnetic alignment system 2000 can reduce or prevent magnetic field leakage that may affect component 2002. Like magnetic alignment system 1700, magnetic alignment system 2000 can include a gap 2003 between two sectors.

FIG. 20B shows an axial cross-section view through one of arcuate sectors 2001*b*, and FIG. 20C shows an axial cross-section view through one of arcuate sectors 2001*c*. Arcuate sector 2001*b* includes a primary magnet 2026*b* and a secondary magnet 2028*b*. As shown by orientation indicator 2017*b*, secondary magnet 2028*b* has a magnetic polarity oriented in a radially outward direction, i.e., the north magnetic pole is toward the radially outward side of magnetic alignment system 2000. Like primary magnets 1526 described above, primary magnet 2026*b* includes an inner arcuate magnetic region 2052*b*, an outer arcuate magnetic region 2054*b*, and a central non-magnetized region 2056*b*

(which can include, e.g., an air gap or a region of nonmagnetic or non-magnetized material). Inner arcuate magnetic region 2052b has a magnetic polarity oriented axially such that the north magnetic pole is toward secondary magnet 2028b, as shown by indicator 2053b, while outer arcuate magnetic region 2054b has an opposite magnetic orientation, with the south magnetic pole oriented toward secondary magnet 2028b, as shown by indicator 2055b. As described above with reference to FIG. 15B, the arrangement of magnetic orientations shown in FIG. 20B results in magnetic attraction between primary magnet 2026b and secondary magnet 2028b.

As shown in FIG. 20C, arcuate sector 2001c has a "reversed" magnetic orientation relative to arcuate sector 2001b. Arcuate sector 2001c includes a primary magnet 2026c and a secondary magnet 2028c. As shown by orientation indicator 2017c, secondary magnet 2028c has a magnetic polarity oriented in a radially inward direction, i.e., the north magnetic pole is toward the radially inward side of magnetic alignment system 2000. Like primary magnets 1526 described above, primary magnet 2026c includes an inner arcuate magnetic region 2052c, an outer arcuate magnetic region 2054c, and a central non-magnetized region 2056c (which can include, e.g., an air gap or a region of nonmagnetic or non-magnetized material). Inner arcuate magnetic region 2052c has a magnetic polarity oriented axially such that the south magnetic pole is toward secondary magnet 2028c, as shown by indicator 2053c, while outer arcuate magnetic region 2054c has an opposite magnetic orientation, with the north magnetic pole oriented toward secondary magnet 2028c, as shown by indicator 2055c. As described above with reference to FIG. 15B, the arrangement of magnetic orientations shown in FIG. 20C results in magnetic attraction between primary magnet 2026c and secondary magnet 2028c.

An alternating arrangement of magnetic polarities as shown in FIGS. 19 and 20A-8C can create a "ratcheting" feel when secondary alignment component 2018 is aligned with primary alignment component 2016 and one of alignment components 2016, 2018 is rotated relative to the other about the common axis. For instance, as secondary alignment component 2016 is rotated relative to primary alignment component 2016, each radially-outward magnet 2028b alternately comes into proximity with a complementary magnet 2026b of primary alignment component 2016, resulting in an attractive magnetic force, or with an anti-complementary magnet 2026c of primary alignment component 2016, resulting in a repulsive magnetic force. If primary magnets 2026b, 2026c and secondary magnets 2028b, 2028c have the same angular size and spacing, in any given orientation, each pair of magnets will experience similar net (attractive or repulsive) magnetic forces such that alignment is stable and robust in rotational orientations in which complementary magnet pairs 2026b, 2028b and 2026c, 2028c are in proximity. In other rotational orientations, a torque toward a stable rotational orientation can be experienced.

Figure 21A:
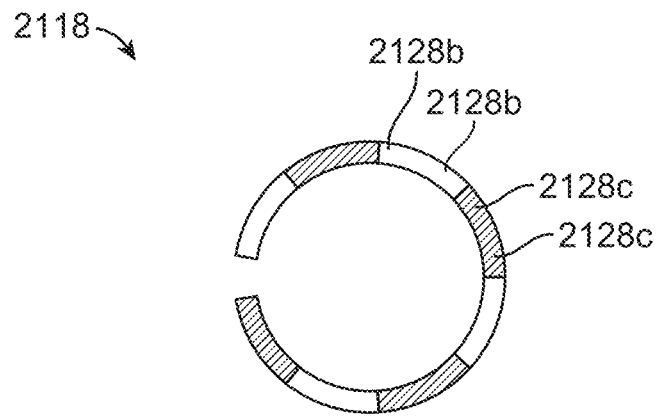
FIGS. 21A and 21B show simplified top-down views of secondary alignment components according to various embodiments.
Figure 21B:
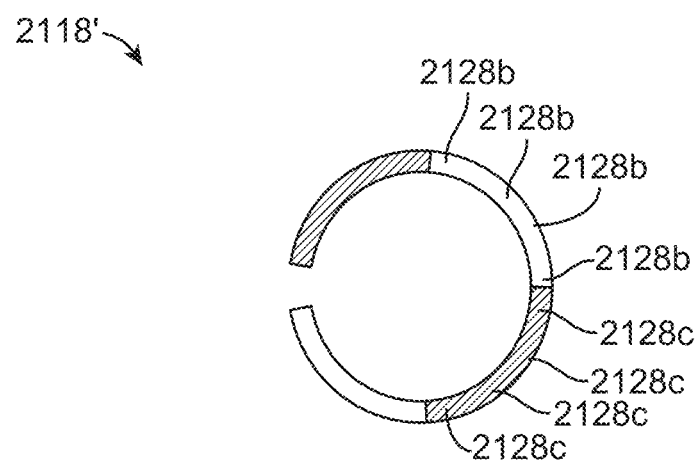

In the examples shown in FIGS. 19 and 20A-8C, each sector includes one magnet, and the direction of magnetic orientation alternates with each magnet. In some embodiments, a sector can include two or more magnets having the same direction of magnetic orientation. For example, FIG. 21A shows a simplified top-down view of a secondary alignment component 2118 according to some embodiments. Secondary alignment component 2118 includes secondary magnets 2128b with radially outward magnetic orientations and secondary magnets 2128c with radially inward orientations, similarly to secondary alignment component 2018 described above. In this example, the magnets are arranged such that a pair of outwardly-oriented magnets 2128b (forming a first sector 2101) are adjacent to a pair of inwardly-oriented magnets 2128c (forming a second sector 2103 adjacent to first sector 2101). The pattern of alternating sectors (with two magnets per sector) repeats around the circumference of secondary alignment component 2118. Similarly, FIG. 21B shows a simplified top-down view of another secondary alignment component 2118' according to some embodiments. Secondary alignment component 2118' includes secondary magnets 2128b with radially outward magnetic orientations and secondary magnets 2128c with radially inward orientations. In this example, the magnets are arranged such that a group of four radially-outward magnets 2128b (forming a first sector 2111) is adjacent to a group of four radially-inward magnets 2128c (forming a second sector 2113 adjacent to first sector 2111). The pattern of alternating sectors (with four magnets per sector) repeats around the circumference of secondary alignment component 2118'.

Although not shown in FIGS. 21A and 21B, the structure of a complementary primary alignment component for secondary alignment component 2118 or 2118' should be apparent in view of FIGS. 20A-8C. A shear force profile for the alignment components of FIGS. 21A and 21B can be similar to the ratcheting profile described above, although the number of rotational orientations that provide stable alignment will be different.

Figure 22:
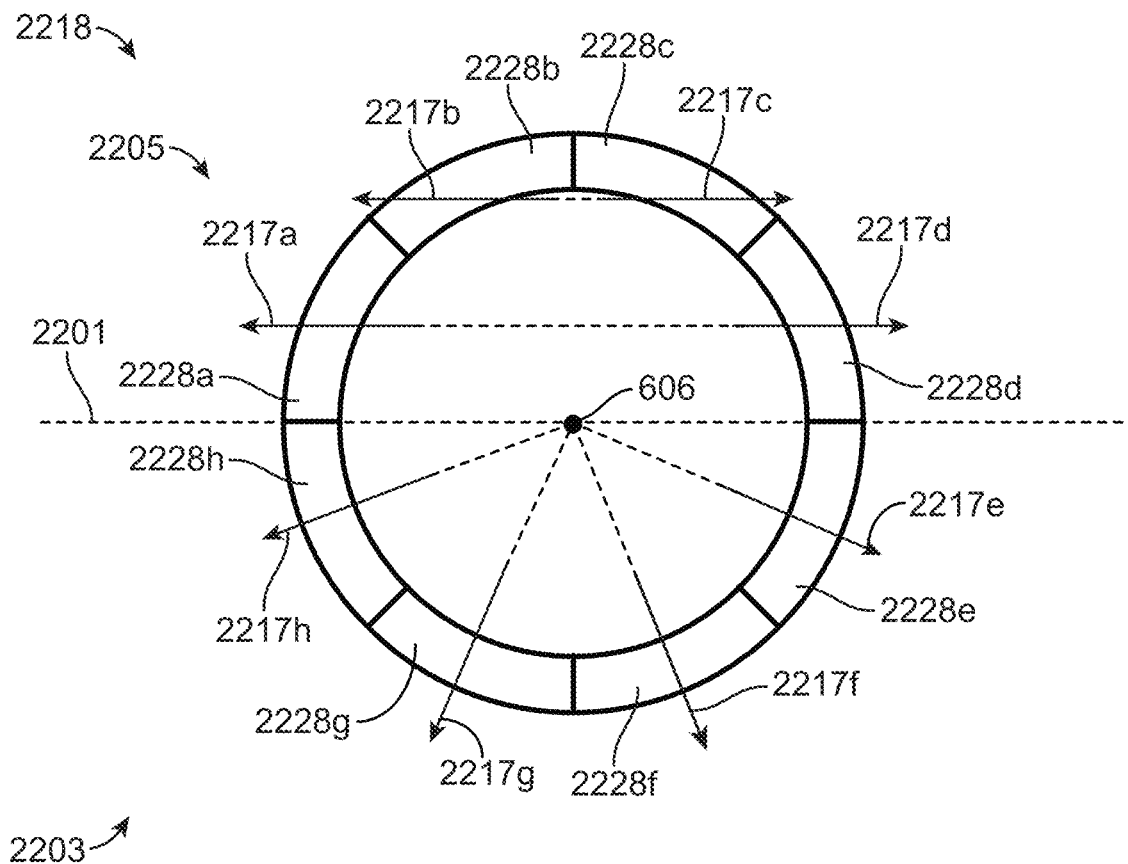
FIG. 22 shows a simplified top-down view of a secondary alignment component according to some embodiments.

In other embodiments, a variety of force profiles can be created by changing the magnetic orientations of different sectors within the primary and/or secondary alignment components. As just one example, FIG. 22 shows a simplified top-down view of a secondary alignment component 2218 according to some embodiments. Secondary alignment component has sectors 2228a-h with sector-dependent magnetic orientations as shown by magnetic polarity indicators 2217a-h. In this example, secondary alignment component 2218 can be regarded as bisected by bisector line 2201, which defines two halves of secondary alignment component 2218. In a first half 2203, sectors 2228e-h have magnetic polarities oriented radially outward, similarly to examples described above.

In the second half 2205, sectors 2228a-d have magnetic polarities oriented substantially parallel to bisector line 2201 rather than radially. In particular, sectors 2228a and 2228b have magnetic polarities oriented in a first direction parallel to bisector line 2201, while sectors 2228c and 2228d have magnetic polarities oriented in the direction opposite to the direction of the magnetic polarities of sectors 2228a and 2228b. A complementary primary alignment component can have an inner annular region with magnetic north pole oriented toward secondary alignment component 2218, an outer annular region with magnetic north pole oriented away from secondary alignment component 2218, and a central non-magnetized region, providing a closed-loop magnetic orientation as described above. The asymmetric arrangement of magnetic orientations in secondary alignment component 2218 can modify the shear force profile such that secondary alignment component 2218 generates less shear force resisting motion in the direction toward second half 2205 (upward in the drawing) than in the direction toward first half 2203 (downward in the drawing). In some embodiments, an asymmetrical arrangement of this kind can be used where the primary alignment component is mounted in a docking station and the secondary alignment component is mounted in a portable electronic device that docks with the docking station. Assuming secondary annular alignment component 2218 is oriented in the portable electronic device such that half-annulus 2205 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

In the embodiments described above, the secondary annular magnetic alignment component has a magnetic orientation that is generally aligned in the transverse plane. In some alternative embodiments, a secondary annular magnetic alignment component can instead have a quad-pole configuration similar to that of primary annular magnetic alignment component 1516 of FIGS. 15A and 15B, with or without a DC shield (which, if present, can be similar to DC shield 1514 of FIGS. 15A and 15B) on the distal surface of the secondary arcuate magnets. Using quad-pole magnetic configurations in both the primary and secondary alignment components can provide a closed-loop DC magnetic flux path and a strong sensation of "snappiness"; however, the thickness of the secondary magnetic alignment component may need to be increased to accommodate the quad-pole magnets and DC shield, which may increase the overall thickness of a portable electronic device that houses the secondary magnetic alignment component. To reduce thickness, the DC shield on the distal surface of the secondary alignment component can be omitted; however, omitting the DC shield may result in increased flux leakage into neighboring components.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations that exert forces toward the desired position of alignment. Different combinations of magnetic orientations may create different shear force profiles, and the selection of magnetic orientations may be made based on a desired shear force profile (e.g., high snappiness), avoidance of DC flux leakage into other components, and other design considerations.

In various embodiments described above, a magnetic alignment system can provide robust alignment in a lateral plane and may or may not provide rotational alignment. For example, radially symmetric magnetic alignment system 1700 of FIGS. 17A-5B may not define a preferred rotational orientation. Radially alternating magnetic alignment system 2000 of FIGS. 20A-8C can define multiple equally preferred rotational orientations. For some applications, such as alignment of a portable electronic device with a wireless charger puck or mat, rotational orientation may not be a concern. In other applications, such as alignment of a portable electronic device in a docking station or other mounting accessory, a particular rotational alignment may be desirable. Accordingly, in some embodiments an annular magnetic alignment component can be augmented with one or more rotational alignment components positioned outboard of and spaced apart from the annular magnetic alignment components. The rotational alignment component(s) can help guide devices into a target rotational orientation relative to each other.

Figure 23:
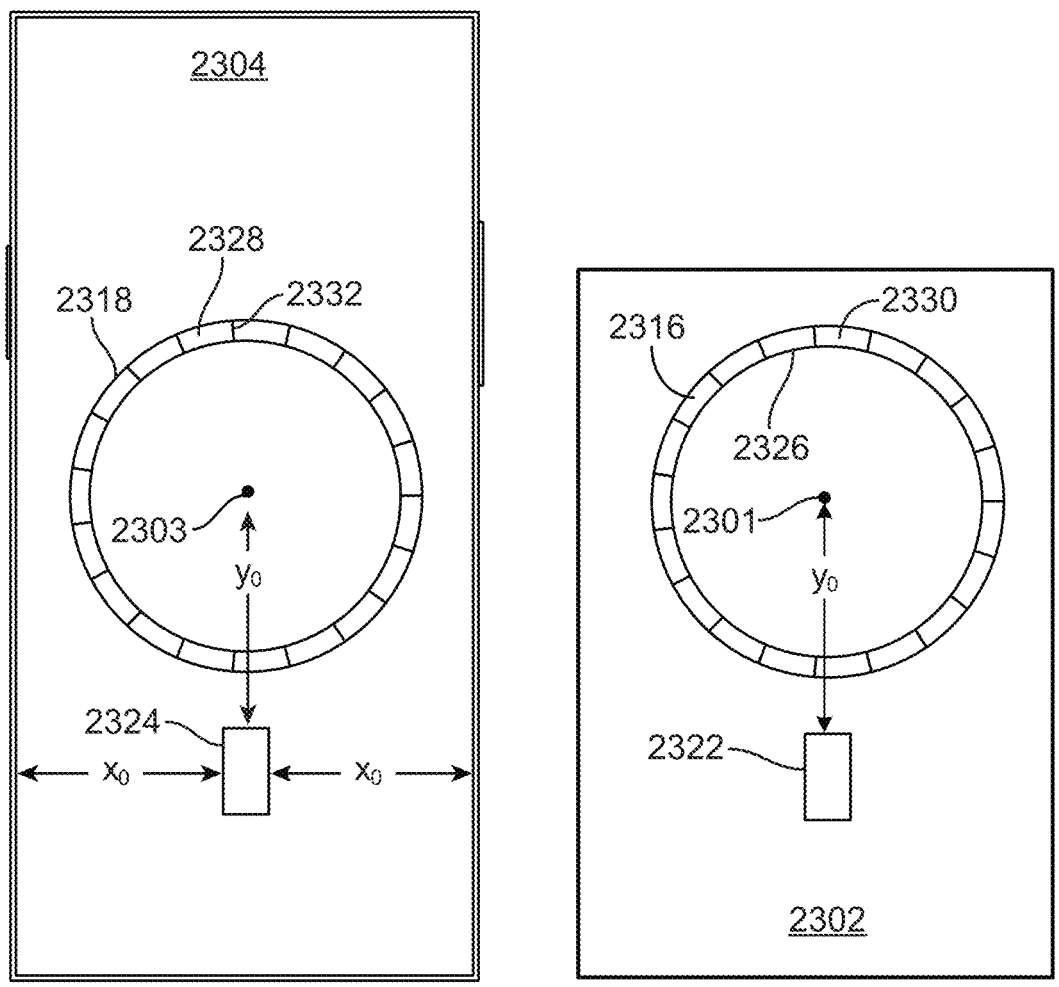
FIG. 23 shows an example of a portable electronic device and an accessory incorporating a magnetic alignment system with an annular alignment component and a rotational alignment component according to some embodiments.

FIG. 23 shows an example of a magnetic alignment system with an annular alignment component and a rotational alignment component according to some embodiments. FIG. 23 shows respective proximal surfaces of a portable electronic device 2304 and an accessory device 2302. In this example, primary alignment components of the magnetic alignment system are included in an accessory device 2302, and secondary alignment components of the magnetic alignment system are included in a portable electronic device 2304. Portable electronic device 2304 can be, for example, a smart phone whose front surface provides a touchscreen display and whose back surface is designed to support wireless charging. Accessory device 2302 can be, for example, a charging dock that supports portable electronic device 2304 such that its display is visible and accessible to a user. For instance, accessory device 2302 can support portable electronic device 2304 such that the display is vertical or at a conveniently tilted angle for viewing and/or touching. In the example shown, accessory device 2302 supports portable electronic device 2304 in a "portrait" orientation (shorter sides of the display at the top and bottom); however, in some embodiments accessory device 2302 can support portable electronic device 2304 in a "landscape" orientation (longer sides of the display at the top and bottom). Accessory device 2302 can also be mounted on a swivel, gimbal, or the like, allowing the user to adjust the orientation of portable electronic device 2304 by adjusting the orientation of accessory device 2302.

As described above, components of a magnetic alignment system can include a primary annular alignment component 2316 disposed in accessory device 2302 and a secondary annular alignment component 2318 disposed in portable electronic device 2304. Primary annular alignment component 2316 can be similar or identical to any of the primary alignment components described above. For example, primary annular alignment component 2316 can be formed of arcuate magnets 2326 arranged in an annular configuration. Although not shown in FIG. 23, one or more gaps can be provided in primary annular alignment component 2316, e.g., by omitting one or more of arcuate magnets 2326 or by providing a gap at one or more interfaces 2330 between adjacent arcuate magnets 2326. In some embodiments, each arcuate magnet 2326 can include an inner arcuate region having a first magnetic orientation (e.g., axially oriented in a first direction), an outer arcuate region having a second magnetic orientation opposite the first magnetic orientation (e.g., axially oriented opposite the first direction), and a central non-magnetized arcuate region between the inner and outer regions (as described above, the non-magnetized central region can include an air gap or a nonmagnetic material). In some embodiments, primary annular alignment component 2316 can also include a DC shield (not shown) on the distal side of arcuate magnets 2326.

Likewise, secondary annular alignment component 2318 can be similar or identical to any of the secondary alignment components described above. For example, secondary annular alignment component 2318 can be formed of arcuate magnets 2328 arranged in an annular configuration. Although not shown in FIG. 23, one or more gaps can be provided in secondary annular alignment component 2318, e.g., by omitting one or more arcuate magnets 2328 or by providing a gap at one or more interfaces 2332 between adjacent magnets 2328. As described above, arcuate magnets 2328 can provide radially-oriented magnetic polarities. For instance, all sectors of secondary annular alignment component 2318 can have a radially-outward magnetic orientation or a radially-inward magnetic orientation, or some sectors of secondary annular alignment component 2318 may have a radially-outward magnetic orientation while other sectors of secondary annular alignment component 2318 have a radially-inward magnetic orientation.

As described above, primary annular alignment component 2316 and secondary annular alignment component 2318 can provide shear forces that promote alignment in the lateral plane so that center point 2301 of primary annular alignment component 2316 aligns with center point 2303 of secondary annular alignment component 2318. However, primary annular alignment component 2316 and secondary annular alignment component 2318 might not provide torque forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 23, a primary rotational alignment component 2322 can be disposed outboard of and spaced apart from primary annular alignment component 2316 while a secondary rotational alignment component 2324 is disposed outboard of and spaced apart from secondary annular alignment component 2318. Secondary rotational alignment component 2324 can be positioned at a fixed distance ($y_0$) from center point 2303 of secondary annular alignment component 2318 and centered between the side edges of portable electronic device 2304 (as indicated by distance $x_0$ from either side edge). Similarly, primary rotational alignment component 2322 can be positioned at the same distance $y_0$ from center point 2301 of primary annular alignment component 2316 and located at a rotational angle that results in a torque profile that favors the desired orientation of portable electronic device 2304 relative to accessory device 2302 when secondary rotational alignment component 2324 is aligned with primary rotational alignment component 2322. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 2322 and secondary rotational alignment component 2324 can be implemented using one or more magnets (e.g., rare earth magnets such as NdFeB) each of which has each been magnetized such that its magnetic polarity is oriented in a desired direction. In the example of FIG. 23, the magnets have rectangular shapes; however, other shapes (e.g., rounded shapes) can be substituted. The magnetic orientations of rotational alignment components 2322 and 2324 can be complementary so that when the proximal surfaces of rotational alignment components 2322 and 2324 are near each other, an attractive magnetic force is exerted. This attractive magnetic force can help to rotate portable electronic device 2304 and accessory device 2302 into a preferred rotational orientation in which the proximal surfaces of rotational alignment components 2322 and 2324 are aligned with each other. Examples of magnetic orientations for rotational alignment components 2322 and 2324 that can be used to provide a desired attractive force are described below. In some embodiments, primary rotational alignment component 2322 and secondary rotational alignment component 2324 can have the same lateral (xy) dimensions and the same thickness. The dimensions can be chosen based on a desired magnetic field strength and/or torque, the dimensions of devices in which the rotational alignment components are to be deployed, and other design considerations. In some embodiments, the lateral dimensions can be about 6 mm (x direction) by about 23 mm (y direction), and the thickness can be anywhere from about 0.3 mm to about 1.5 mm; the particular dimensions can be chosen based on the sizes of the devices that are to be aligned. In some embodiments, each of primary rotational alignment component 2322 and secondary rotational alignment component 2324 can be implemented using two or more rectangular blocks of magnetic material positioned adjacent to each other. As in other embodiments, a small gap may be present between adjacent magnets, e.g., due to manufacturing tolerances.

Figure 24A:
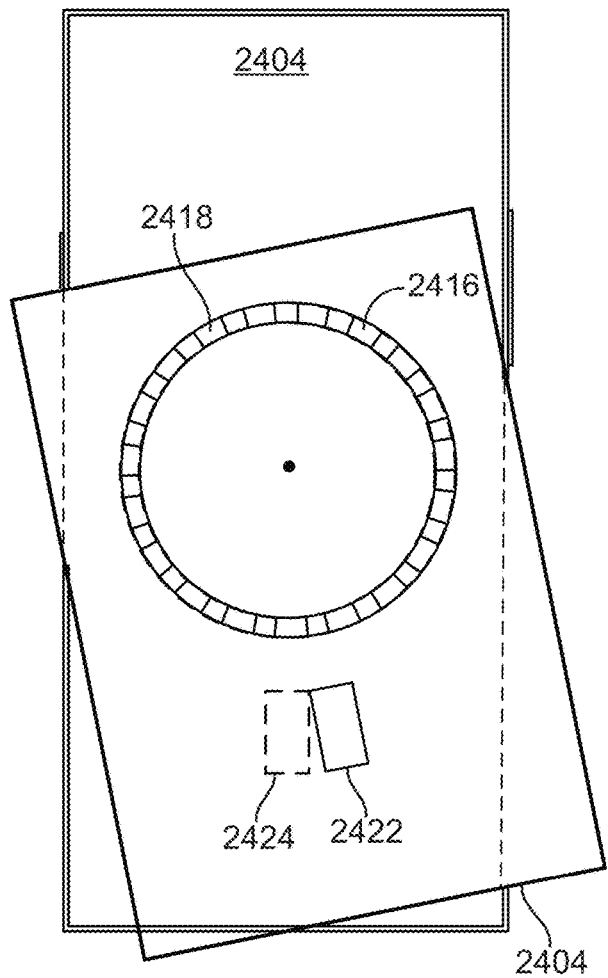
FIGS. 24A and 24B show an example of rotational alignment according to some embodiments.
Figure 24B:
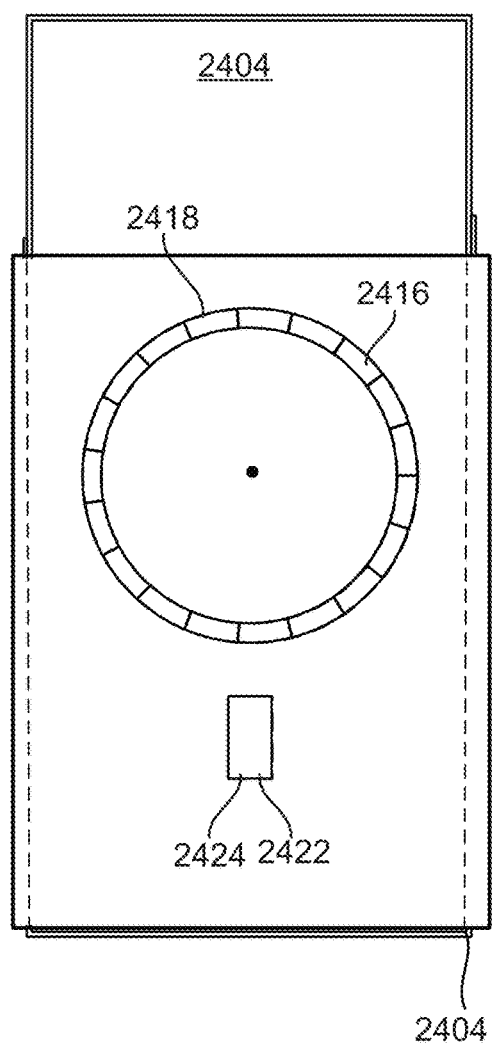

FIGS. 24A and 24B show an example of rotational alignment according to some embodiments. In FIG. 24A, accessory device 2302 is placed on the back surface of portable electronic device 2304 such that primary annular alignment component 2316 and secondary alignment component 2318 are aligned with each other in the lateral plane such that, in the view shown, center point 2301 of primary annular alignment component 2316 overlies center point 2303 of secondary annular alignment component 2318. A relative rotation is present such that rotational alignment components 2322 and 2324 are not aligned. In this configuration, an attractive force between rotational alignment components 2322 and 2324 can urge portable electronic device 2304 and accessory device 2302 toward a target rotational orientation. In FIG. 24B, the attractive magnetic force between rotational alignment components 2322 and 2324 has brought portable electronic device 2304 and accessory device 2302 into the target rotational alignment with the sides of portable electronic device 2304 parallel to the sides of accessory device 2302. In some embodiments, the attractive magnetic force between rotational alignment components 2322 and 2324 can also help to hold portable electronic device 2304 and accessory device 2302 in a fixed rotational alignment.

Figures 25A, 25B:
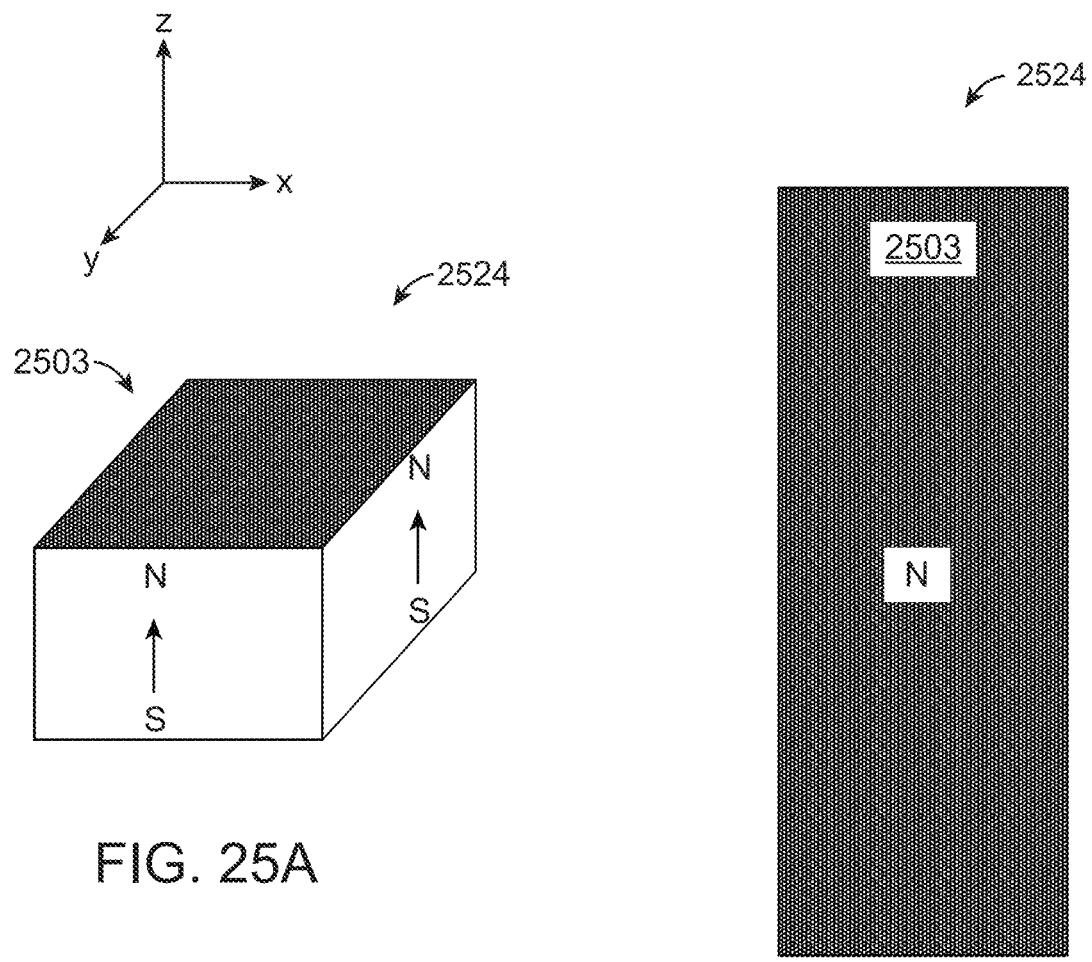
FIGS. 25A and 25B show a perspective view and a top view of a rotational alignment component having a "z-pole" configuration according to some embodiments.

Rotational alignment components 2322 and 2324 can have various patterns of magnetic orientations. As long as the magnetic orientations of rotational alignment components 2322 and 2324 are complementary to each other, a torque toward the target rotational orientation can be present when the devices are brought into lateral alignment and close to the target rotational orientation. FIGS. 25A-21B show examples of magnetic orientations for a rotational alignment component according to various embodiments. While the magnetic orientation is shown for only one rotational alignment component, it should be understood that the magnetic orientation of a complementary rotational alignment component can be complementary to the magnetic orientation of shown.

FIGS. 25A and 25B show a perspective view and a top view of a rotational alignment component 2524 having a "z-pole" configuration according to some embodiments. It should be understood that the perspective view is not to any particular scale and that the lateral (xy) dimensions and axial (z) thickness can be varied as desired. As shown in FIG. 25A, rotational alignment component 2524 can have a uniform magnetic orientation along the axial direction, as indicated by arrows 2505. Accordingly, as shown in FIG. 25B, a north magnetic pole (N) may be nearest the proximal surface 2503 of rotational alignment component 2524. A complementary z-pole alignment component can have a uniform magnetic orientation with a south magnetic pole nearest the proximal surface. The z-pole configuration can provide reliable alignment.

Other configurations can provide reliable alignment as well as a stronger, or more salient, "clocking" sensation for the user. A "clocking sensation," in this context, refers to a user-perceptible torque about the common axis of the annular alignment components that urges toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration of FIGS. 25A and 25B.

Figure 26A:
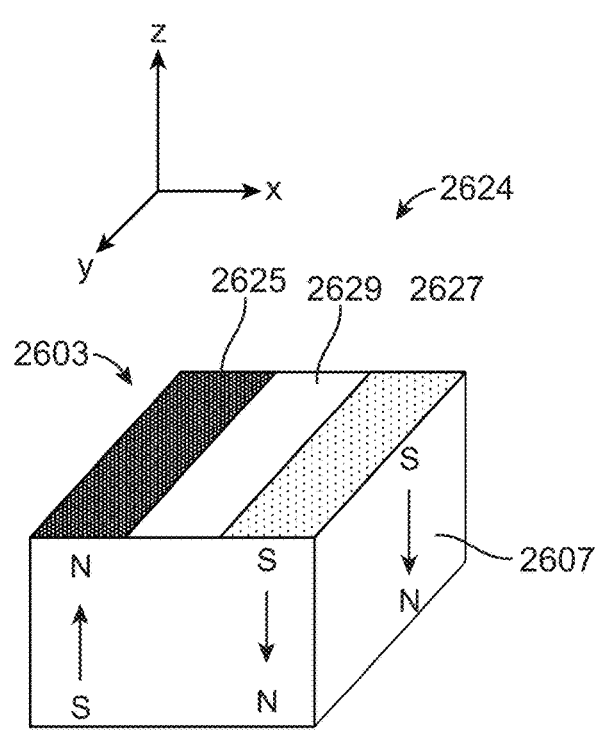
FIGS. 26A and 26B show a perspective view and a top view of a rotational alignment component having a "quad pole" configuration according to some embodiments.
Figure 26B:
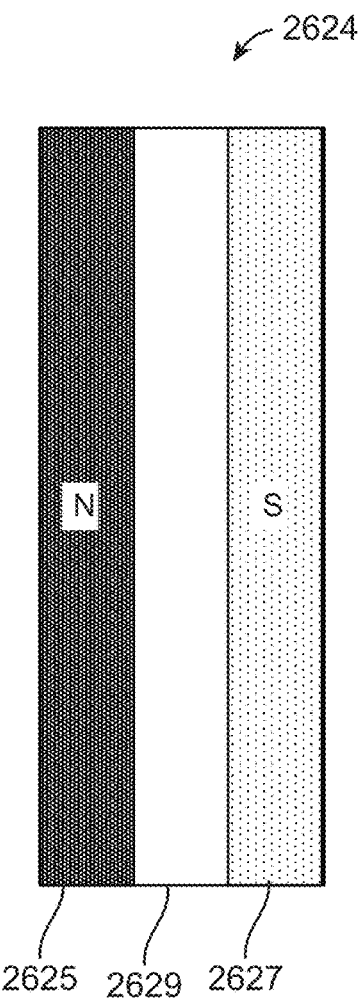

FIGS. 26A and 26B show a perspective view and a top view of a rotational alignment component 2624 having a "quad pole" configuration according to some embodiments. It should be understood that the perspective view is not to any particular scale and that the lateral (xy) dimensions and axial (z) thickness can be varied as desired. As shown in FIG. 26A, rotational alignment component 2624 has a first magnetized region 2625 with a magnetic orientation along the axial direction such that the north magnetic pole (N) is nearest the proximal (+z) surface 2603 of rotational alignment component 2624 (as indicated by arrow 2605) and a second magnetized region 2627 with a magnetic orientation opposite to the magnetic orientation of the first region such that the south magnetic pole (S) is nearest to proximal surface 2603 (as indicated by arrows 2607). Between magnetized regions 2625 and 2627 is a central region 2629 that is not magnetized. In some embodiments, rotational alignment component 2624 can be formed from a single piece of magnetic material that is exposed to a magnetizer to create regions 2625, 2627, 2629. Alternatively, rotational alignment component 2624 can be formed using two pieces of magnetic material with a nonmagnetic material or an air gap between them. As shown in FIG. 26B, the proximal surface of rotational alignment component 2624 can have one region having a "north" polarity and another region having a "south" polarity. A complementary quad-pole rotational alignment component can have corresponding regions of south and north polarity at the proximal surface.

Figure 27A:
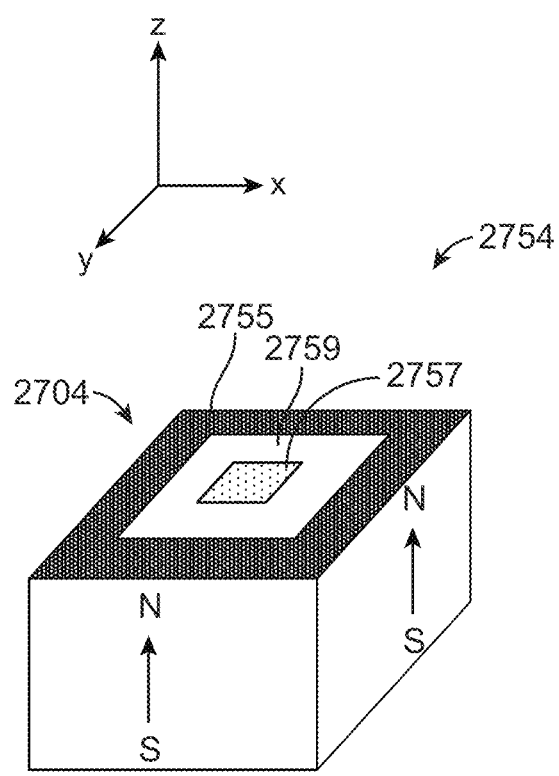
FIGS. 27A and 27B show a perspective view and a top view of a rotational alignment component having an "annulus design" configuration according to some embodiments.
Figure 27B:
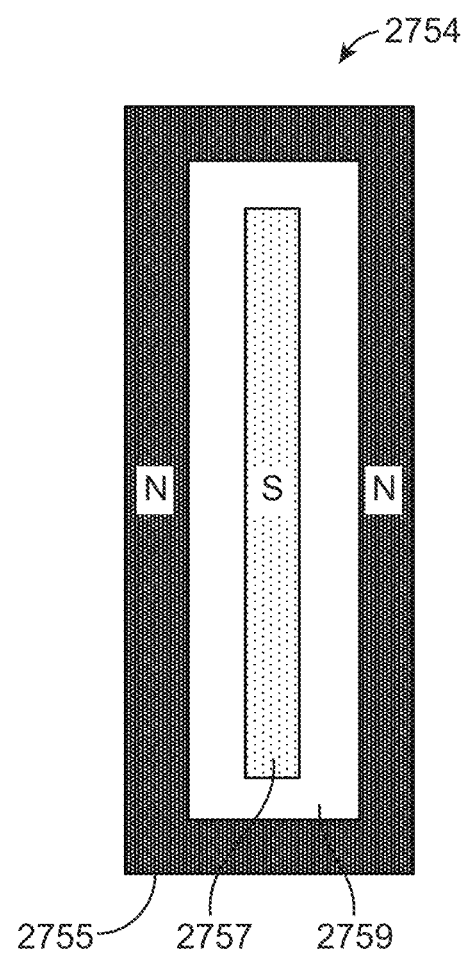

FIGS. 27A and 27B show a perspective view and a top view of a rotational alignment component 2724 having an "annulus design" configuration according to some embodiments. It should be understood that the perspective view is not to any particular scale and that the lateral (xy) dimensions and axial (z) thickness can be varied as desired. As shown in FIG. 27A, rotational alignment component 2724 has an annular outer magnetized region 2725 with a magnetic orientation along the axial direction such that the north magnetic pole (N) is nearest the proximal (+z) surface 2703 of rotational alignment component 2724 (as shown by arrows 2705) and an inner magnetized region 2727 with a magnetic orientation opposite to the magnetic orientation of the first region such that the south magnetic pole (S) is nearest to proximal surface 2703. Between magnetized regions 2725 and 2727 is a neutral annular region 2729 that is not magnetized. In some embodiments, rotational alignment component 2724 can be formed from a single piece of magnetic material that is exposed to a magnetizer to create regions 2725, 2727, 2729. Alternatively, rotational alignment component 2724 can be formed using two or more pieces of magnetic material with a nonmagnetic material or an air gap between them. As shown in FIG. 27B, the proximal surface of rotational alignment component 2724 can have an annular outer region having a "north" polarity and an inner region having a "south" polarity. The proximal surface of a complementary annulus-design rotational alignment component can have an annular outer region of south polarity and an inner region of north polarity.

Figure 28A:
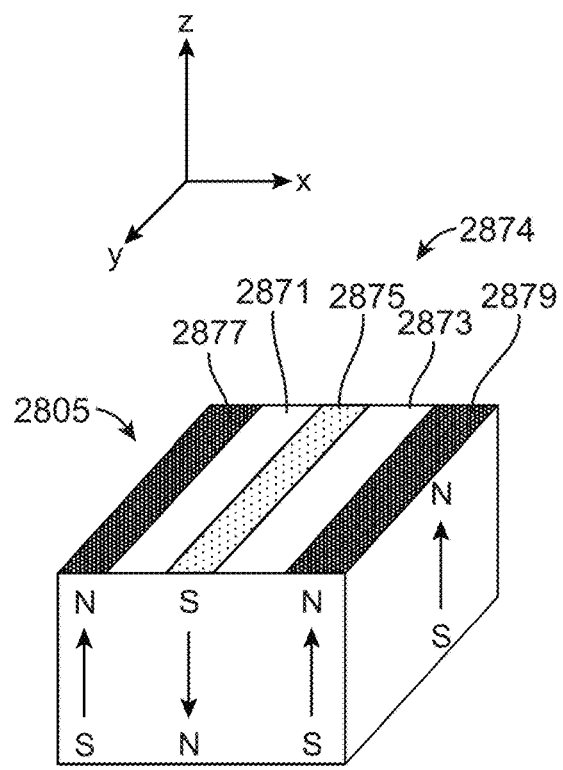
FIGS. 28A and 28B show a perspective view and a top view of a rotational alignment component having a "triple pole" configuration according to some embodiments.
Figure 28B:
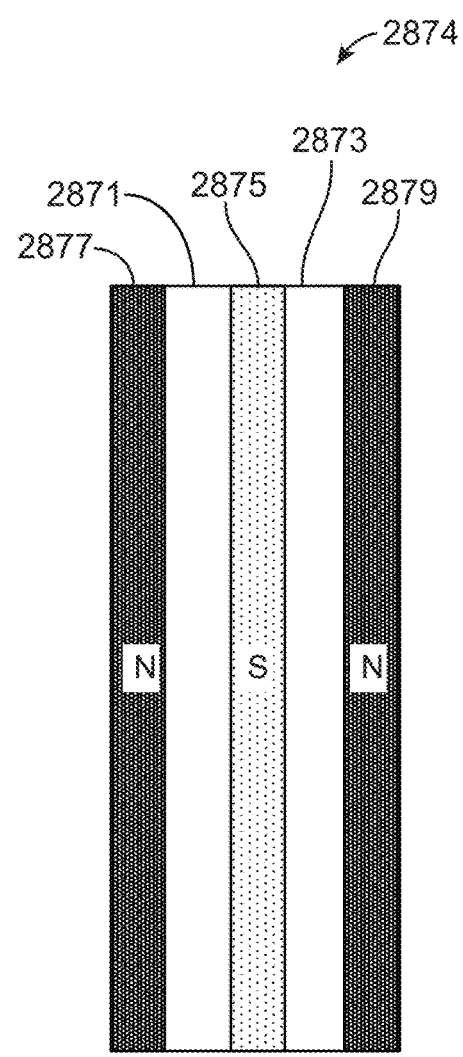

FIGS. 28A and 28B show a perspective view and a top view of a rotational alignment component 2824 having a "triple pole" configuration according to some embodiments. It should be understood that the perspective view is not to any particular scale and that the lateral (xy) dimensions and axial (z) thickness can be varied as desired. As shown in FIG. 28A, rotational alignment component 2824 has a central magnetized region 2825 with a magnetic orientation along the axial direction such that the south magnetic pole (S) is nearest the proximal (+z) surface 2803 of rotational alignment component 2824 (as shown by arrow 2805) and outer magnetized regions 2827, 2829 with a magnetic orientation opposite to the magnetic orientation of central region 2825 such that the north magnetic pole (N) is nearest to proximal surface 2803 (as shown by arrows 2807, 2809). Between central magnetized region 2825 and each of outer magnetized regions 2827, 2829 is a neutral region 2831, 2833 that is not strongly magnetized. In some embodiments, rotational alignment component 2824 can be formed from a single piece of magnetic material that is exposed to a magnetizer to create regions 2825, 2827, 2829. Alternatively, rotational alignment component 2824 can be formed using three (or more) pieces of magnetic material with nonmagnetic materials or air gaps between them. As shown in FIG. 28B, the proximal surface may have a central region having a "south" polarity with an outer region having "north" polarity to either side. The proximal surface of a complementary triple-pole rotational alignment component can have a central region of north polarity with an outer region of south polarity to either side.

It should be understood that the examples in FIGS. 25A-21B are illustrative and that other configurations may be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque profile. For example, as noted above, it may be desirable to provide a salient clocking sensation to a user when close to the desired rotational alignment. The clocking sensation can be a result of torque about a rotational axis defined by the annular alignment components. The amount of torque depends on various factors, including the distance between the axis and the rotational alignment component (distance y0 in FIG. 23) and the length (in the y direction as defined in FIG. 23) of the rotational alignment component, as well as the strength of the magnetic fields of the rotational alignment components (which may depend on the size of the rotational alignment components) and whether the annular alignment components exert any torque toward a preferred rotational orientation.

Figure 29:
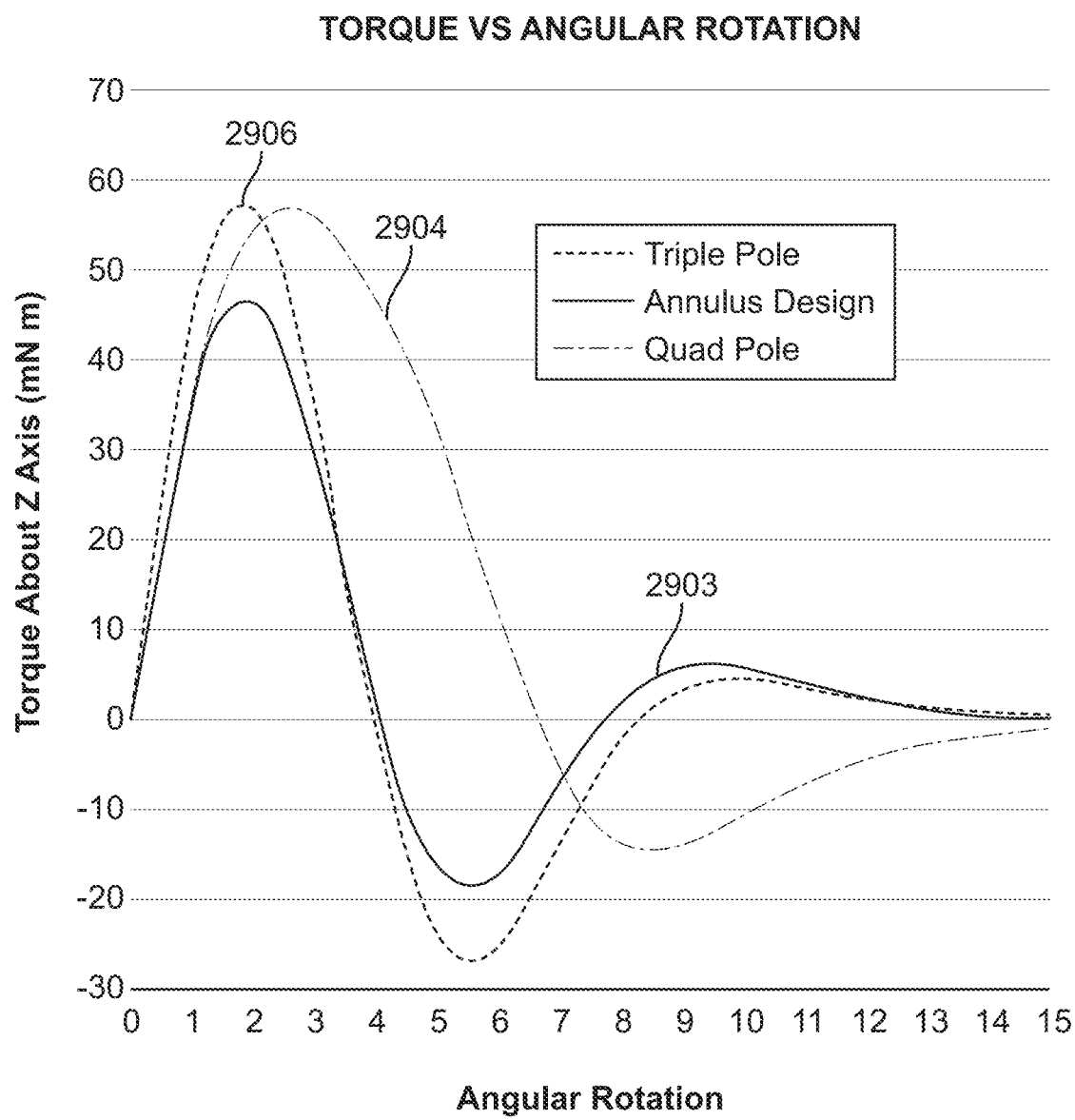
FIG. 29 shows graphs of torque as a function of angular rotation for magnetic alignment systems having rotational alignment components according to various embodiments.

FIG. 29 shows a graph of torque as a function of angular rotation (in degrees) for an alignment system of the kind shown in FIG. 23, for different magnetization configurations of the rotational alignment component according to various embodiments. Angular rotation is defined such that zero degrees corresponds to the target rotational alignment (where the proximal surfaces of rotational angular components 2322 and 2324 are in closest proximity, e.g., as shown in FIG. 24B). Torque is defined such that positive (negative) values indicate force in the direction of decreasing (increasing) rotational angle. For purpose of generating the torque profiles, it is assumed that annular alignment components 2316 and 2318 are rotationally symmetric and do not exert torque about the z axis defined by center points 2301 and 2303. Three different magnetization configurations are considered. Line 2904 corresponds to the quad-pole configuration of FIGS. 26A and 26B. Line 2905 corresponds to the annulus design configuration of FIGS. 27A and 27B. Line 2906 corresponds to the triple-pole configuration of FIGS. 28A and 28B. As shown, the annulus design (line 2905) and triple-pole (line 2906) configurations provide a sharper peak in the torque and therefore a more salient clocking sensation for the user, as compared to the quad-pole configuration (line 2904). In addition, the triple-pole configuration provides a stronger peak torque and therefore a more salient clocking sensation than the annulus-design configuration. (The triple-pole configuration can also provide reduced flux leakage as compared to other configurations.) It should be understood that the numerical values in FIG. 29 are illustrative, and that torque in a particular embodiment may depend on a variety of other factors in addition to the magnetization configuration, such as the magnet volume, aspect ratio, and distance $y_0$ from the center of the annular alignment component.

Figure 30:
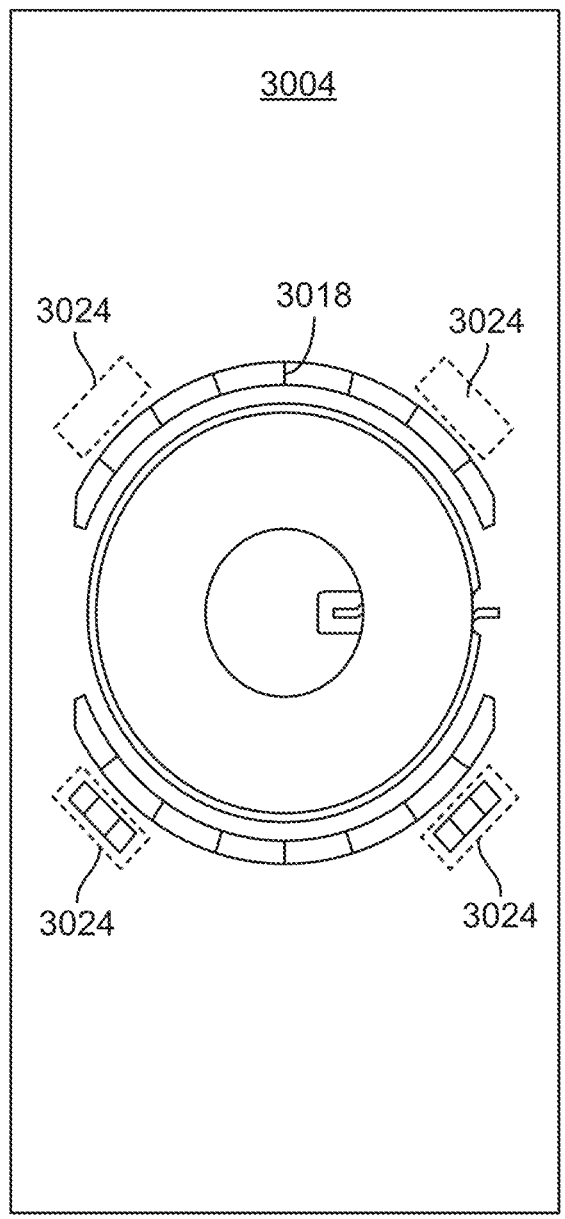
FIG. 30 shows a portable electronic device having an alignment system with multiple rotational alignment components according to some embodiments.

In the example shown in FIG. 23, a single rotational alignment component is placed outboard of the annular alignment component at a distance $y_0$ from the center of the annular alignment component. This arrangement allows a single magnetic element to generate torque that produces a salient clocking sensation for a user aligning devices. In some embodiments, other arrangements are also possible. For example, FIG. 30 shows a portable electronic device 3004 having an alignment system 3000 with multiple rotational alignment components according to some embodiments. In this example, alignment system 3000 includes an annular alignment component 3018 and a set of rotational alignment components 3024 positioned at various locations around the perimeter of annular alignment component 3018. In this example, there are four rotational alignment components 3024 positioned at angular intervals of approximately 90 degrees. In other embodiments, different numbers and spacing of rotational alignment components can be used. Each rotational alignment component 3024 can have any of the magnetization configurations described above, including z-pole, quad-pole, triple-pole, or annulus-design configurations, or a different configuration. Further, different rotational alignment components 3024 can have different magnetization configurations from each other. It should be noted that rotational alignment components 3024 can be placed close to the perimeter of annular alignment component 3018, and the larger number of magnetic components can provide sufficient torque with a shorter lever arm. Complementary rotational alignment components can be disposed around the outer perimeter of any type of annular alignment component (e.g., primary alignment components, secondary alignment components, or annular alignment components as described herein).

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 2304 of FIG. 23 can align rotationally to accessory device 2302 (which has both annular alignment component 2316 and rotational alignment component 2322) as well as aligning laterally to another accessory (such as battery pack 100 or any of the other battery packs shown here or are otherwise consistent with an embodiment of the present invention) that has annular alignment component 2316 but not rotational alignment component 2322. In the latter case, lateral alignment can be achieved, e.g., to support efficient wireless charging, but there may be no preferred rotational alignment, or rotational alignment may be achieved using a nonmagnetic feature (e.g., a mechanical retention feature such as a ledge, a clip, a notch, or the like). A rotational magnetic alignment component can be used together with any type of annular magnetic alignment component (e.g., primary annular magnetic alignment components, secondary annular magnetic alignment components, or auxiliary annular magnetic alignment components as described below).

In embodiments described above, it is assumed (though not required) that the magnetic alignment components are fixed in position relative to the device enclosure and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 31A through 31C illustrate examples of moving magnets according to an embodiment of the present invention. In this example, first electronic device 3100 can be a battery pack, such as battery pack 100 or any of the other battery packs shown here or are otherwise consistent with an embodiment of the present invention, a wireless charging device, or other device having a magnet 3110 (which can be, e.g., any of the annular or other magnetic alignment components such as the magnet array 120 and alignment magnets 122 described above.) In FIG. 31A, moving magnet 3110 can be housed in a first electronic device 3100. First electronic device 3100 can include device enclosure 3130, magnet 3110, and shield 3120. Magnet 3110 can be in a first position (not shown) adjacent to nonmoving shield 3120. In this position, magnet 3110 can be separated from device enclosure 3130. As a result, the magnetic flux 3112 at a surface of device enclosure 3130 can be relatively low, thereby protecting magnetic devices and magnetically stored information, such as information stored on payment cards. As magnet 3110 in first electronic device 3100 is attracted to a second magnet (not shown) in a second electronic device (not shown), magnet 3110 can move, for example it can move away from shield 3120 to be adjacent to device enclosure 3130, as shown. With magnet 3110 at this location, magnetic flux 3112 at surface of device enclosure 3130 can be relatively high. This increase in magnetic flux 3112 can help to attract the second electronic device to first electronic device 3100.

With this configuration, it can take a large amount of magnetic attraction for magnet 3110 to separate from shield 3120. Accordingly, these and other embodiments of the present invention can include a shield that is split into a shield portion and a return plate portion. For example, in FIG. 31B, line 3160 can be used to indicate a split of shield 3120 into a shield 3140 and return plate 3150.

In FIG. 31C, moving magnet 3110 can be housed in first electronic device 3100.

First electronic device 3100 can include device enclosure 3130, magnet 3110, shield 3140, and return plate 3150. In the absence of a magnetic attraction, magnet 3110 can be in a first position (not shown) such that shield 3140 can be adjacent to return plate 3150. Again, in this configuration, magnetic flux 3112 at a surface of device enclosure 3130 can be relatively low. As magnet 3110 and first electronic device is attracted to a second magnet (not shown) in a second electronic device (not shown), magnet 3110 can move, for example it can move away from return plate 3150 to be adjacent to device enclosure 3130, as shown. In this configuration, shield 3140 can separate from return plate 3150 and the magnetic flux 3112 at a surface of device enclosure 3130 can be increased. As before, this increase in magnetic flux 3112 can help to attract the second electronic device to the first electronic device 3100.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 32B:
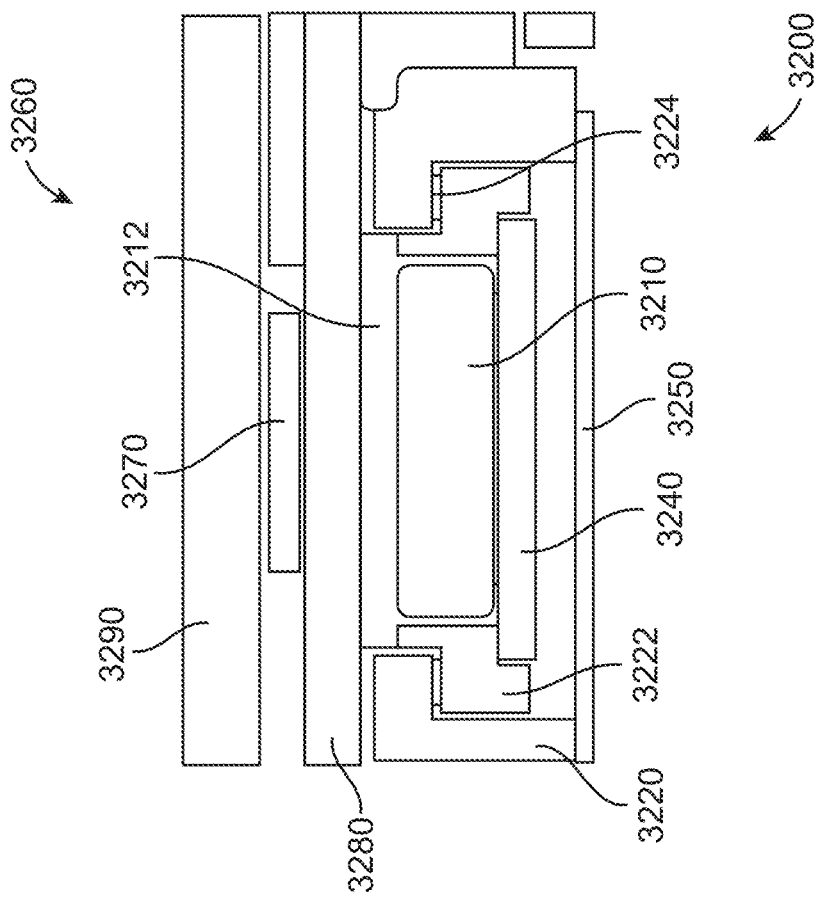
FIGS. 32A and 32B illustrate a moving magnetic structure according to an embodiment of the present invention.
Figure 32A:
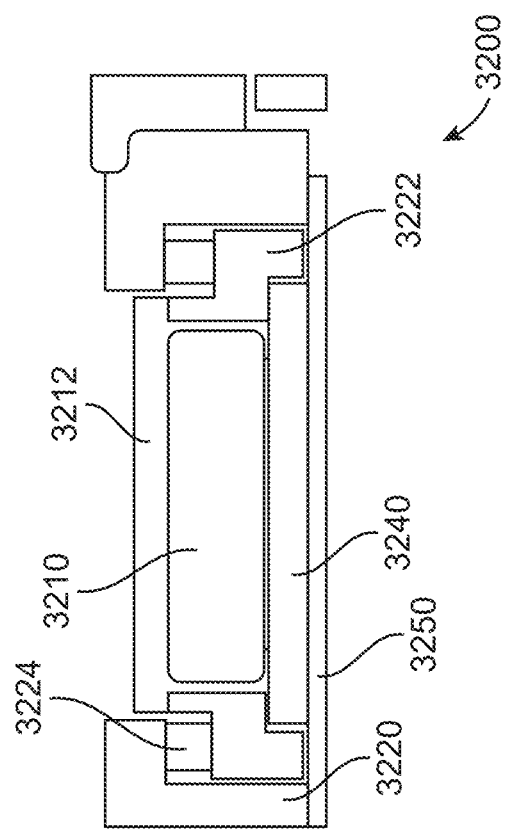

FIGS. 32A and 32B illustrate a moving magnetic structure according to an embodiment of the present invention. In this example, first electronic device 3200 can be a battery pack, such as battery pack 100 or any of the other battery packs shown here or are otherwise consistent with an embodiment of the present invention, a wireless charging device, or other device having a magnet 3210 (which can be, e.g., any of the annular or other magnetic alignment components such as the magnet array 120 and alignment magnets 122 described above.) FIG. 32A illustrates a moving first magnet 3210 in a first electronic device 3200. First electronic device 3200 can include first magnet 3210, protective surface 3212, housings 3220 and 3222, compliant structure 3224, shield 3240, and return plate 3250. In this figure, first magnet 3210 is not attracted to a second magnet (not shown), and therefore shield 3240 is magnetically attracted to or attached to return plate 3250. In this position, compliant structure 3224 can be expanded or relaxed. Compliant structure 3224 can be formed of an elastomer, silicon rubber open cell foam, silicon rubber, polyurethane foam, or other foam or other compressible material.

In FIG. 32B, second electronic device 3260 has been brought into proximity of first electronic device 3200. Second magnet 3270 can attract first magnet 3210, thereby causing shield 3240 and return plate 3250 to separate from each other. Housings 3220 and 3222 can compress compliant structure 3224, thereby allowing protective surface 3212 of first electronic device 3200 to move towards or adjacent to housing 3280 of second electronic device 3260. Second magnet 3270 can be held in place in second electronic device 3260 by housing 3290 or other structure. As second electronic device 3260 is removed from first electronic device 3200, first magnet 3210 and shield 3240 can be magnetically attracted to return plate 3250, as shown in FIG. 32A.

FIGS. 33A and 33B illustrate moving magnetic structures according to an embodiment of the present invention. In this example, first electronic device 3300 can be a battery pack, such as battery pack 100 or any of the other battery packs shown here or are otherwise consistent with an embodiment of the present invention, a wireless charging device, or other device having a magnet 3310 (which can be, e.g., any of the annular or other magnetic alignment components such as the magnet array 120 and alignment magnets 122 described above.) FIG. 33A illustrates a moving first magnet 3310 in a first electronic device 3300. First electronic device 3300 can include first magnet 3310, pliable surface 3312, housing portions 3320 and 3322, shield 3340, and return plate 3350. In this figure, first magnet 3310 is not attracted to a second magnet, and therefore shield 3340 is magnetically attached or attracted to return plate 3350. In this position, pliable surface 3312 can be relaxed. Pliable surface 3312 can be formed of an elastomer, silicon rubber open cell foam, silicon rubber, polyurethane foam, or other foam or other compressible material.

In FIG. 33B, second electronic device 3360 has been brought into the proximity of first electronic device 3300. Second magnet 3370 can attract first magnet 3310, thereby causing shield 3340 and return plate 3350 to separate from each other. First magnet 3310 can stretch pliable surface 3312 towards second electronic device 3360, thereby allowing first magnet 3310 of first electronic device 3300 to move towards housing 3380 of second electronic device 3360. Second magnet 3370 can be held in place in second electronic device 3360 by housing 3390 or other structure. As second electronic device 3360 is removed from first electronic device 3300, first magnet 3310 and shield 3340 can be magnetically attracted to return plate 3350 as shown in FIG. 33A.

Figure 34:
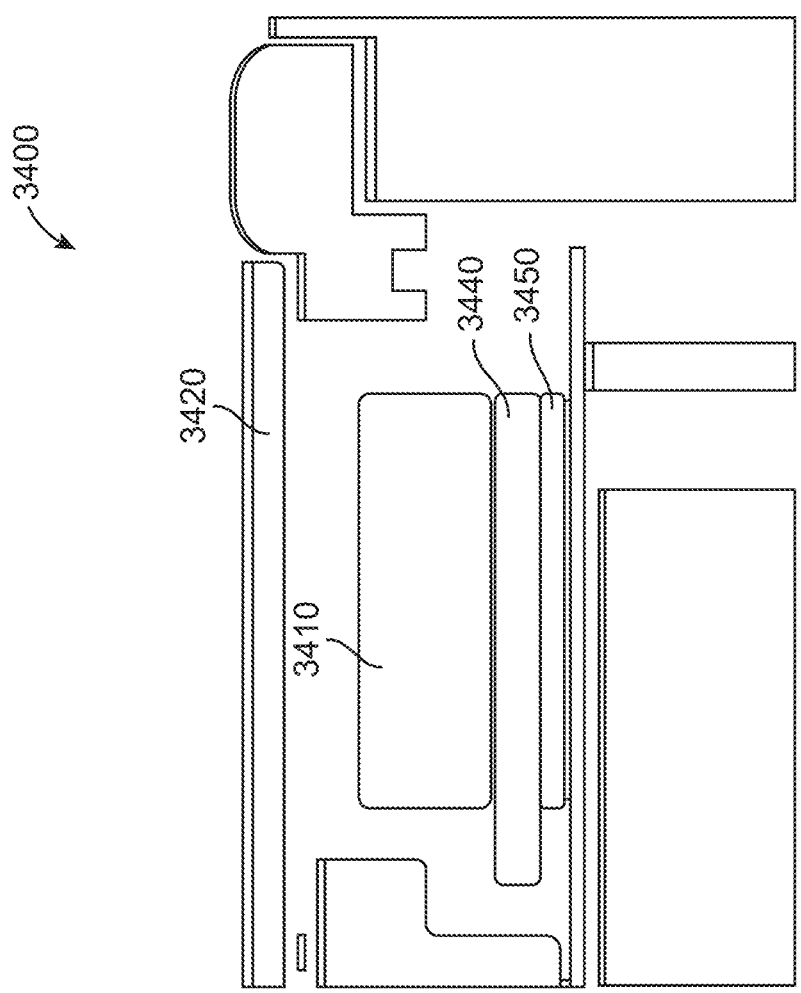
FIGS. 34 through FIG. 36 illustrate a moving magnetic structure according to an embodiment of the present invention.
Figure 35:
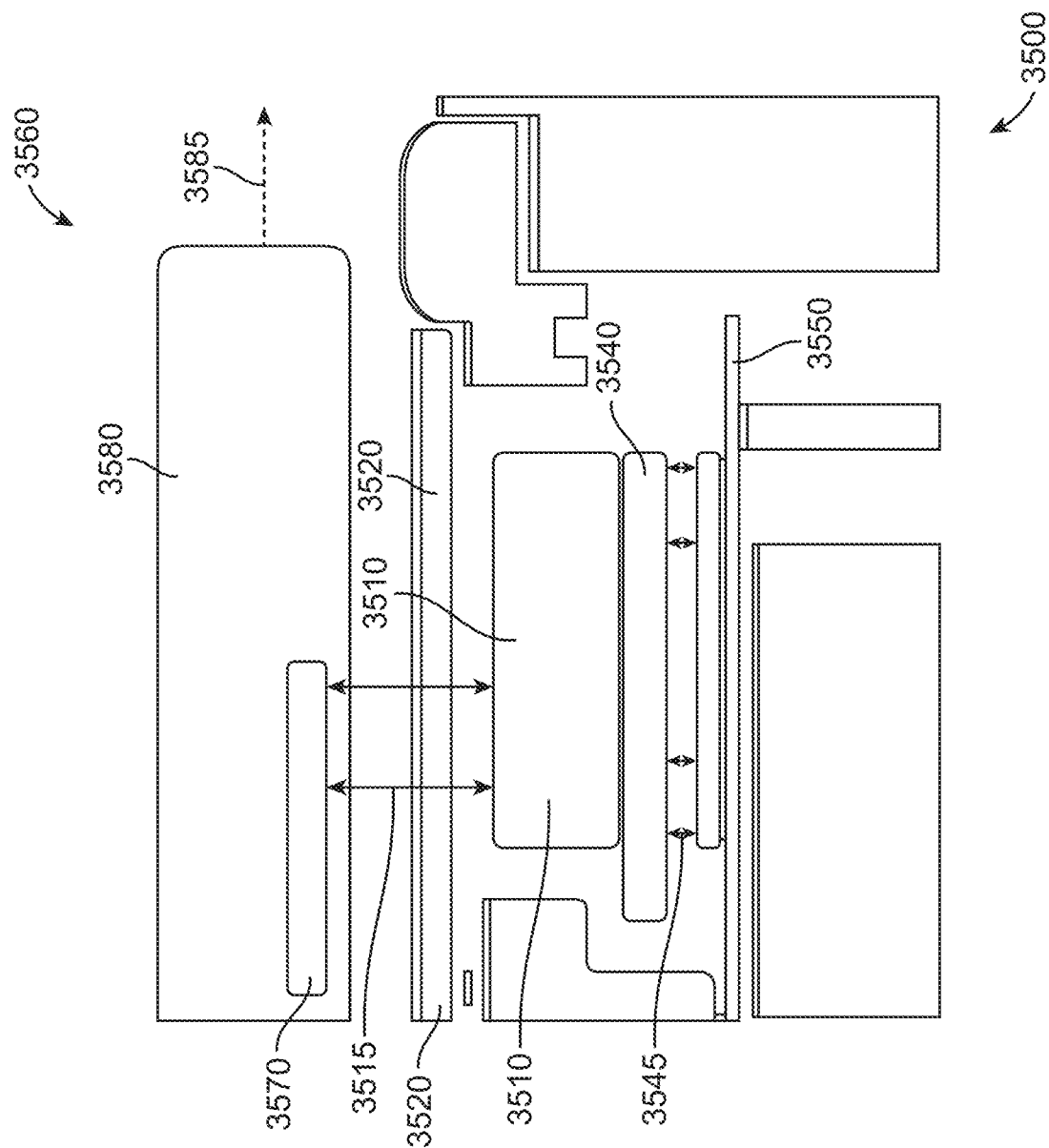
Figure 36:
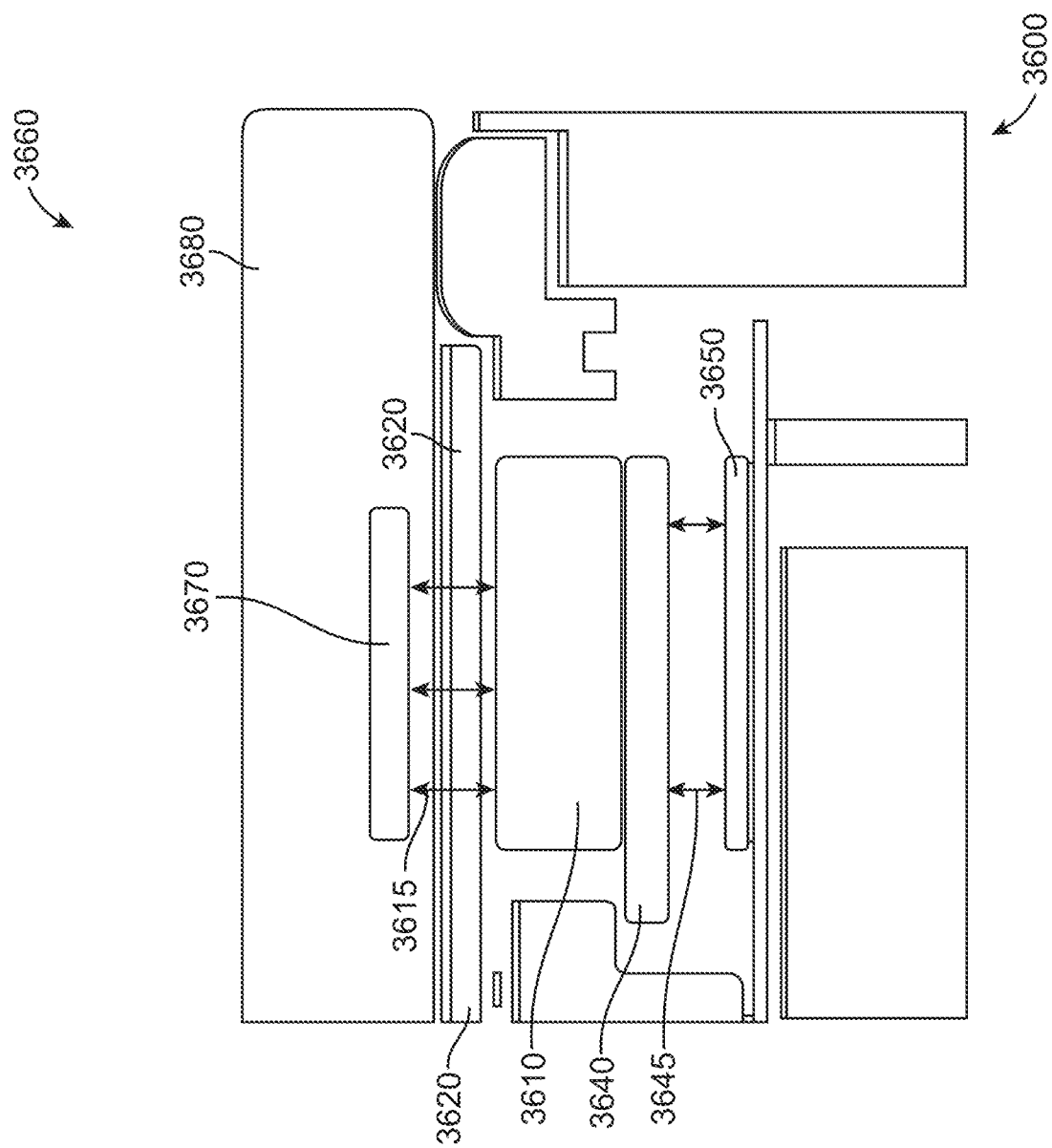

FIG. 34 to FIG. 36 illustrate a moving magnetic structure according to an embodiment of the present invention. In this example, first electronic device 3400 can be a battery pack, such as battery pack 100 or any of the other battery packs shown here or are otherwise consistent with an embodiment of the present invention, a wireless charging device, or other device having a magnet 3410 (which can be, e.g., any of the annular or other magnetic alignment components such as the magnet array 120 and alignment magnets 122 described above.) In FIG. 34, first magnet 3410 and shield 3440 can be magnetically attracted or attached to return plate 3450 in first electronic device 3400. First electronic device 3400 can be at least partially housed in device enclosure 3420. In FIG. 35, housing 3480 of second electronic device 3460 can move laterally across a surface of device enclosure 3420 of first electronic device 3400 in a direction 3485. Second magnet 3470 in second electronic device 3460 can begin to attract first magnet 3410 in first electronic device 3400. This magnetic attraction 3415 can cause first magnet 3410 and shield 3440 to pull away from return plate 3450 by overcoming the magnetic attraction 3445 between shield 3440 and return plate 3450. In FIG. 36, second magnet 3470 in second electronic device 3460 has become aligned with first magnet 3410 in first electronic device 3400. First magnet 3410 and shield 3440 have pulled away from return plate 3450 thereby reducing the magnetic attraction 3445. First magnet 3410 has moved nearby or adjacent to device enclosure 3420, thereby increasing the magnetic attraction 3415 to second magnet 3470 in second electronic device 3460.

As shown in FIGS. 34 through FIG. 36, the magnetic attraction between first magnet 3410 in first electronic device 3400 and the second magnet 3470 in the second electronic device 3460 can increase when first magnet 3410 and shield 3440 pull away from return plate 3450. This is shown graphically in the following figures.

Figure 37:
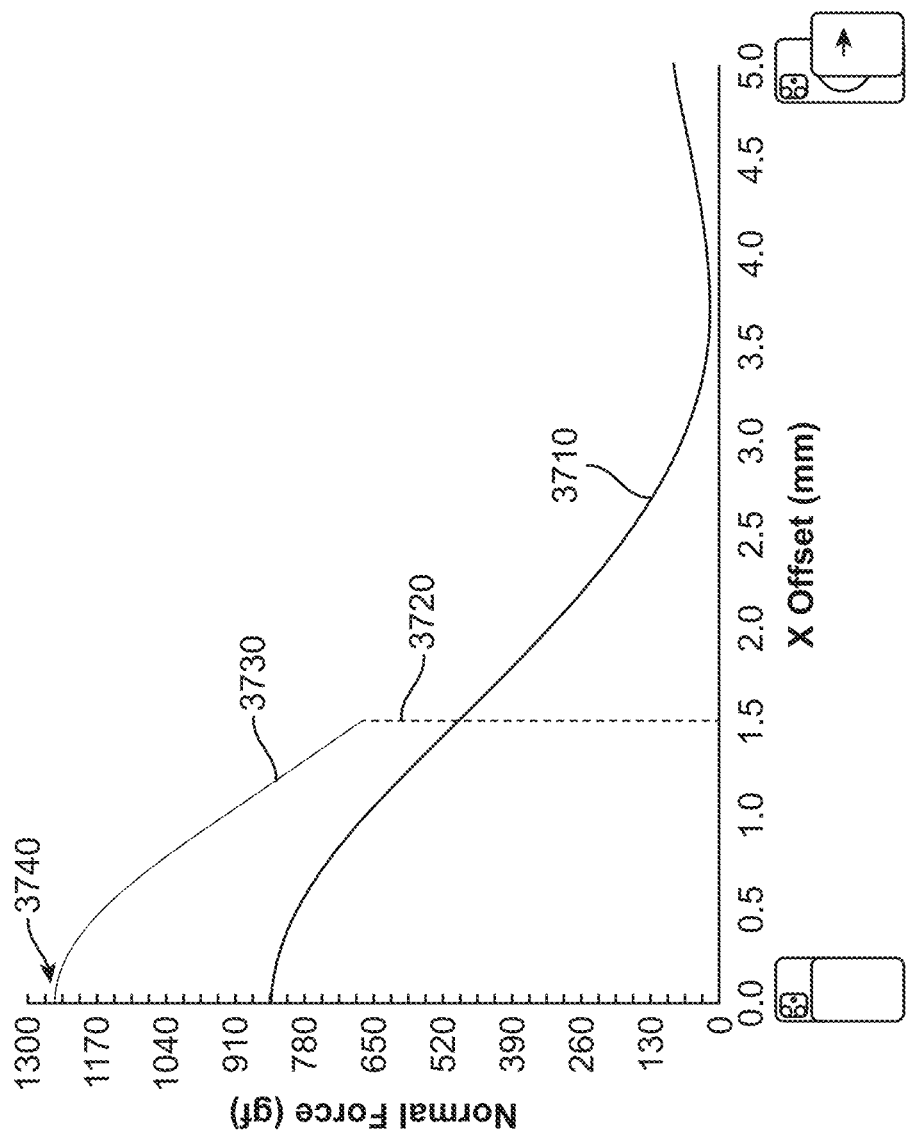
FIG. 37 illustrates a normal force between a first magnet in a first electronic device and a second magnet in a second electronic device.

FIG. 37 illustrates a normal force between a first magnet in first electronic device and a second magnet in a second electronic device as a function of a lateral offset between them. As shown in FIGS. 34-36, with a large offset between first magnet 3410 and second magnet 3670, first magnet 3410 and shield 3440 can remain attached to return plate 3450 in first electronic device 3400 and the magnetic attraction 3415 can be minimal. The shear force necessary to overcome this magnetic attraction is illustrated here as curve 3710. As shown in FIG. 35, as the offset or lateral distance between first magnet 3410 and second magnet 3470 decreases, first magnet 3410 and shield 3440 can pull away or separate from return plate 3450, thereby increasing the magnetic attraction 3415 between first magnet 3410 and second magnet 3470. This is illustrated here as discontinuity 3720. As shown in FIG. 36, as first magnet 3410 and second magnet 3470 come into alignment, the magnetic attraction 3415 increases along curve 3730 to a maximum 3740. The difference between curve 3710 and curve 3730 can show the increase in magnetic attraction between a phone or other electronic device, such as second electronic device 3460 and a battery pack, such as battery pack 100 or any of the other battery packs shown here or are otherwise consistent with an embodiment of the present invention, or other wireless charging device, such as first electronic device 3400, that results from first magnet 3410 being able to move axially. It should also be noted that in this example first magnet 3410 does not move in a lateral direction, though in other examples it is capable of such movement. Where first magnet 3410 is capable of moving in a lateral direction, curve 3730 can have a flattened peak from an offset of zero to an offset that can be overcome by a range of possible lateral movement of first magnet 3410.

Figure 38:
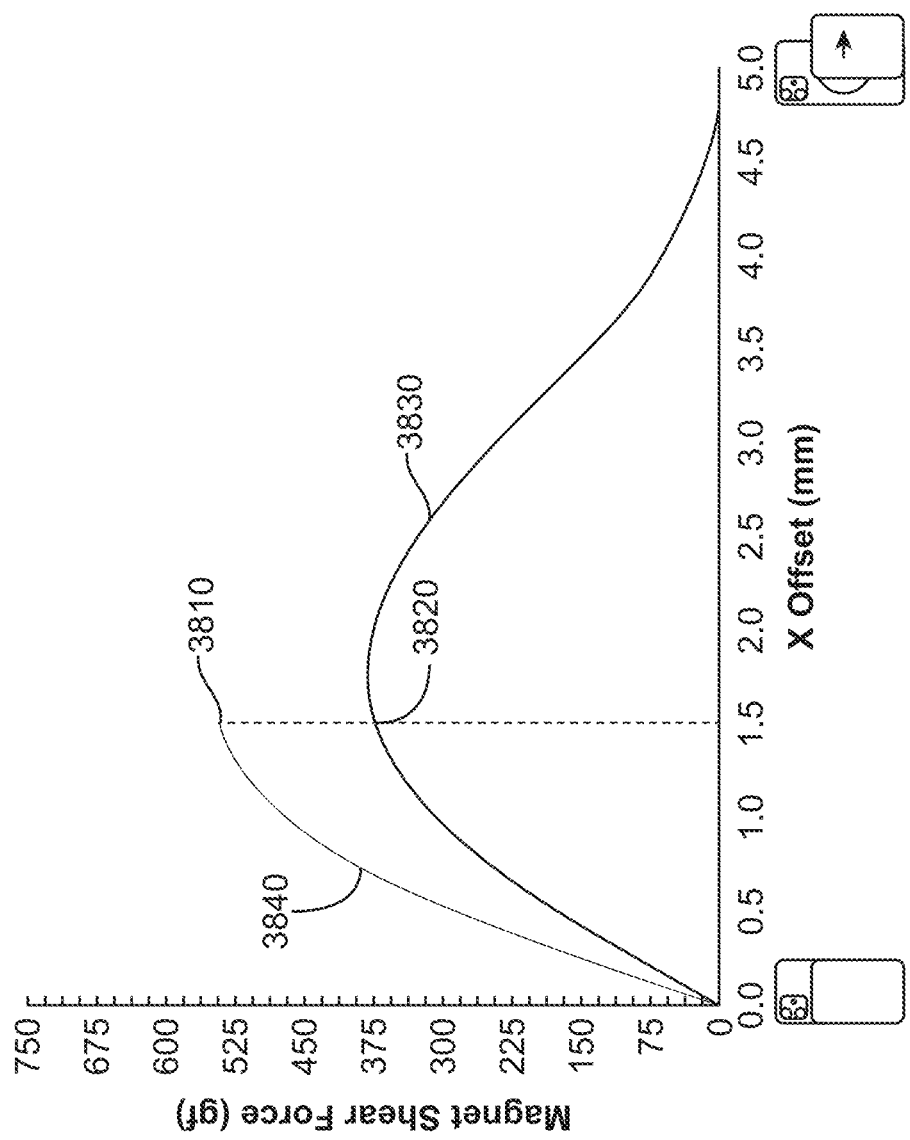
FIG. 38 illustrates a shear force between a first magnet in a first electronic device and a second magnet in a second electronic device.

FIG. 38 illustrates a shear force between a first magnet in a first electronic device and a second magnet in a second electronic device as a function of a lateral offset between them. With no offset between first magnet 3410 and second magnet 3470, there it is no shear force to move second magnet 3470 relative to first magnet 3410, as shown in FIG. 34. As the offset is increased, the shear force, that is the force attempting to realign the magnets, can increase along curve 3840. At discontinuity 3810, first magnet 3410 and shield 3440 can return to return plate 3450 (as shown in FIGS. 34-36), thereby decreasing the magnetic shear force to point 3820. The magnetic shear force can continue to drop off along curve 3830 as the offset increases. The difference between curve 3830 and curve 3840 can show the increase in magnetic attraction between a phone or other electronic device, such as second electronic device 3460 and a battery pack, such as battery pack 100 or any of the other battery packs shown here or are otherwise consistent with an embodiment of the present invention, or other wireless charging device, such as first electronic device 3400, that results from first magnet 3410 being able to move axially. It should also be noted that in this example first magnet 3410 does not move in a lateral direction, though in other examples it is capable of such movement. Where first magnet 3410 is capable of moving in a lateral direction, curve 3830 can remain at zero until the lateral movement of the second magnet 3470 overcomes the range of possible lateral movement of first magnet 3410.

In these and other embodiments of the present invention, it can be desirable to further increase this shear force. Accordingly, embodiments of the present invention can provide various high friction or high stiction surfaces, suction cups, pins, or other structures to increase this shear force.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication, including device identification, from a tag circuit located in one device to a reader circuit located in another device. (As used herein, "NFC" encompasses various protocols, including known standard protocols, that use near-field electromagnetic radiation to communicate data between antenna structures, e.g., coils of wire, that are in proximity to each other.) For example, each device that has an annular magnetic alignment component can also have an NFC coil that can be disposed inboard of and concentric with the annular magnetic alignment component. Where the device also has an inductive charging coil (which can be a transmitter coil or a receiver coil), the NFC coil can be disposed in an annular gap between the inductive charging coil and the annular magnetic alignment component. In some embodiments, an NFC protocol can be used to allow a portable electronic device to identify an accessory device when the respective magnetic alignment components of the portable electronic device and the accessory device are brought into alignment. For example, the NFC coil of a portable electronic device can be coupled to an NFC reader circuit while the NFC coil of an accessory device is coupled to an NFC tag circuit. When devices are brought into proximity, the NFC reader circuit of the portable electronic device can be activated to read the NFC tag of the accessory device. In this manner, the portable electronic device can obtain information (e.g., device identification) from the accessory device.

In some embodiments, an NFC reader in a portable electronic device can be triggered by detecting a change in a DC (or static) magnetic field within the portable electronic device that corresponds to a change expected when an accessory device having a complementary magnetic alignment component is brought into alignment. When the expected change is detected, the NFC reader can be activated to read an NFC tag in the other device, assuming the other device is present.

Examples of devices incorporating NFC circuitry and magnetic alignment components will now be described.

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 39:
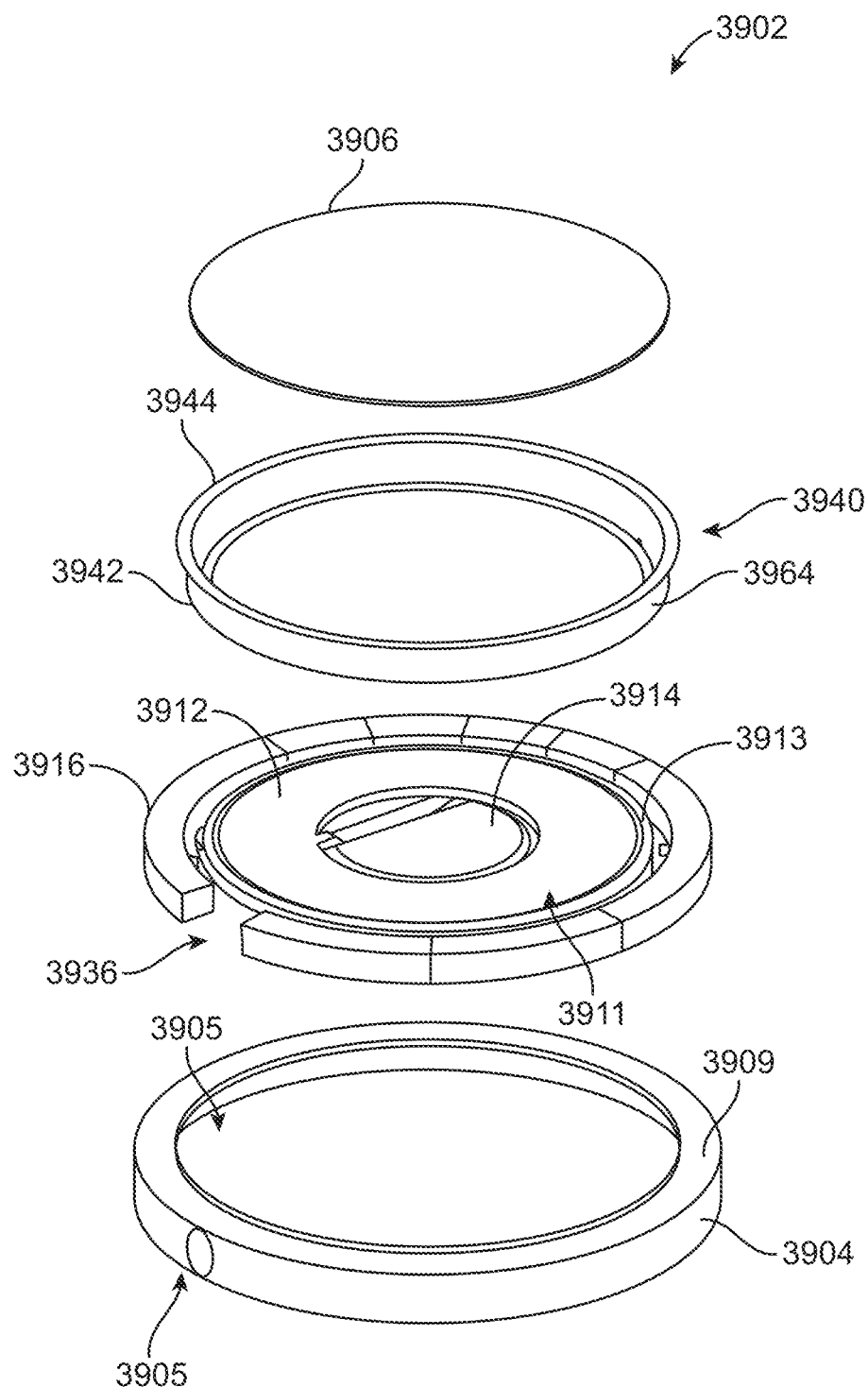
FIG. 39 shows an exploded view of a wireless charger device incorporating an NFC tag circuit according to some embodiments.
Figure 40:
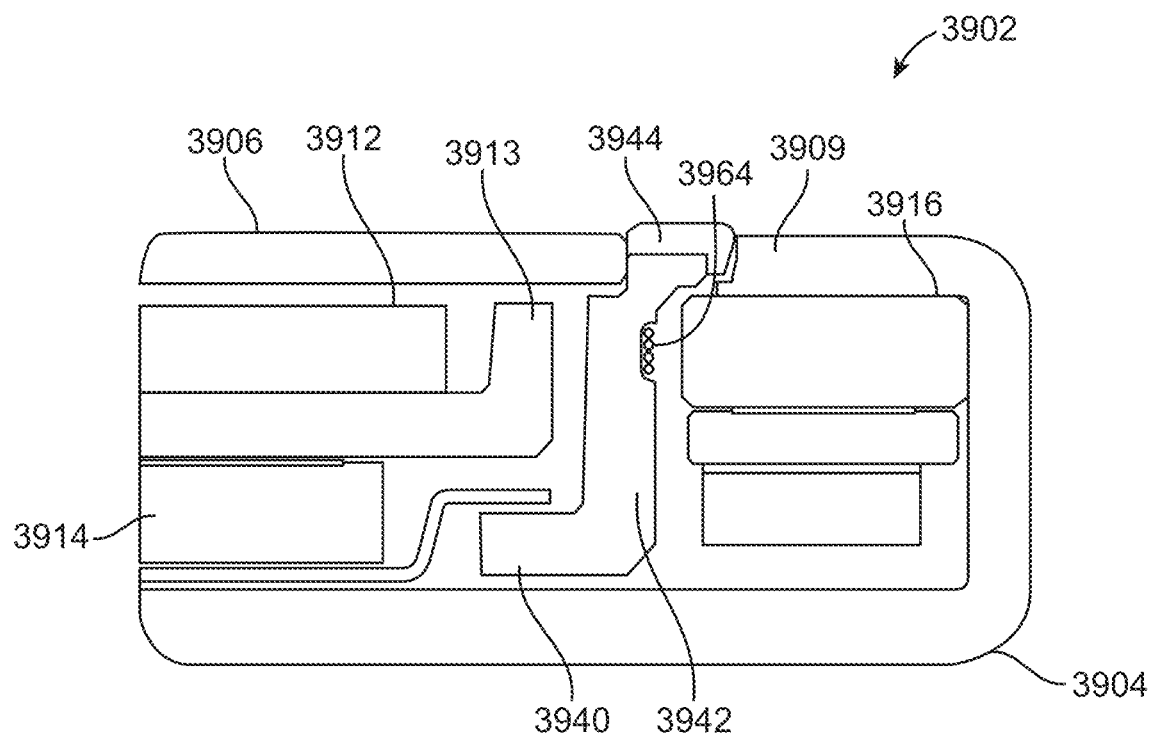
FIG. 40 shows a partial cross-section view of wireless charger device according to some embodiments.

FIG. 39 shows an exploded view of a wireless charger device 3902 incorporating an NFC tag according to some embodiments, and FIG. 40 shows a partial cross-section view of wireless charger device 3902 according to some embodiments. As shown in FIG. 39, wireless charger device 3902 can include an enclosure 3904, which can be made of plastic or metal (e.g., aluminum), and a contacting surface 3906, which can be made of silicone, plastic, glass, or other material that is permeable to AC and DC magnetic fields. Contacting surface 3906 can be shaped to fit within a circular opening 3903 at the top of enclosure 3904.

A wireless transmitter coil assembly 3911 can be disposed within enclosure 3904. Wireless transmitter coil assembly 3911 can include a wireless transmitter coil 3912 for inductive power transfer to another device as well as AC magnetic and/or electric shield(s) 3913 disposed around some or all surfaces of wireless transmitter coil 3912. Control circuitry 3914 (which can include, e.g., a logic board and/or power circuitry) to control wireless transmitter coil 3912 can be disposed in the center of coil 3912 and/or underneath coil 3912. In some embodiments, control circuitry 3914 can operate wireless transmitter coil 3912 in accordance with a wireless charging protocol such as the Qi protocol or other protocols.

A primary annular magnetic alignment component 3916 can surround wireless transmitter coil assembly 3911. Primary annular magnetic alignment component 3916 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above.) In some embodiments, the diameter and thickness of primary annular magnetic alignment component 3916 is chosen such that arcuate magnet sections of primary annular magnetic alignment component 3916 fit under a lip 3909 at the top surface of enclosure 3904, as best seen in FIG. 40. For instance, each arcuate magnet section can be inserted into position under lip 3909, either before or after magnetizing the inner and outer regions. In some embodiments, primary annular magnetic alignment component 3916 can have a gap 3936 between two adjacent arcuate magnet sections. Gap 3936 can be aligned with an opening 3907 in a side surface of enclosure 3904 to allow external wires to be connected to wireless transmitter coil 3912 and/or control circuitry 3914.

A support ring subassembly 3940 can include an annular frame 3942 that extends in the axial direction and a friction pad 3944 at the top edge of frame 3942. Friction pad 3944 can be made of a material such as silicone or thermoplastic elastomers (TPE) such as thermoplastic urethane (TPU) and can provide support and protection for contacting surface 3906. Frame 3942 can be made of a material such as polycarbonate (PC), glass-fiber reinforced polycarbonate (GFPC), or glass-fiber reinforced polyamide (GFPA). Frame 3942 can have an NFC coil 3964 disposed thereon. For example, NFC coil 3964 can be a four-turn or five-turn solenoidal coil made of copper wire or other conductive wire that is wound onto frame 3942. NFC coil 3964 can be electrically connected to NFC tag circuitry (not shown) that can be part of control circuitry 3914. The relevant design principles of NFC circuits are well understood in the art and a detailed description is omitted. Frame 3942 can be inserted into a gap region 3917 between primary annular magnetic alignment component 3916 and wireless transmitter coil assembly 3911. In some embodiments, gap region 3917 is shielded by AC shield 3913 from AC electromagnetic fields generated in wireless transmitter coil 3912 and is also shielded from DC magnetic fields of primary annular magnetic alignment component 3916 by the closed-loop configuration of the arcuate magnet sections.

As described above, an accessory device such as a case for a mobile phone may include an auxiliary magnetic alignment component, with or without a wireless charging coil. The auxiliary magnetic alignment component can act as a "repeater" to support the use of a primary magnetic alignment component and a secondary alignment component to align the wireless charging transmitter coil of a charger device with the wireless charging receiver coil of a portable electronic device while the portable electronic device is attached to (e.g., inserted into) the accessory device.

Figure 41:
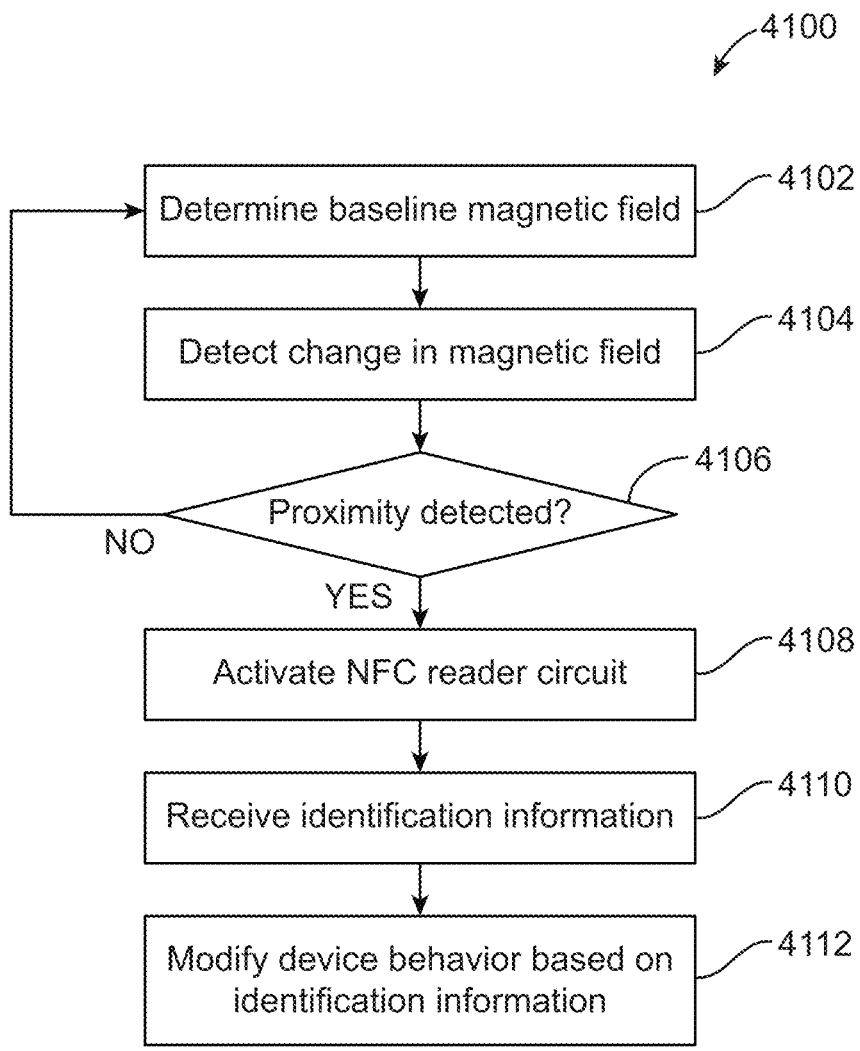
FIG. 41 shows a flow diagram of a process that can be implemented in a portable electronic device according to some embodiments.

FIG. 41 shows a flow diagram of a process 4100 that can be implemented in portable electronic device 5004 according to some embodiments. In some embodiments, process 4100 can be performed iteratively while portable electronic device 5004 is powered on. At block 4102, process 4100 can determine a baseline magnetic field, e.g., using magnetometer 5080. At block 4104, process 4100 can continue to monitor signals from magnetometer 5080 until a change in magnetic field is detected. At block 4106, process 4100 can determine whether the change in magnetic field matches a magnitude and direction of change associated with alignment of a complementary magnetic alignment component. If not, then the baseline magnetic field can be updated at block 4102. If, at block 4106, the change in magnetic field matches a magnitude and direction of change associated with alignment of a complementary alignment component, then at block 4108, process 4100 can activate the NFC reader circuitry associated with NFC coil 5060 to read an NFC tag of an aligned device. In some embodiments, NFC tags associated with different types of devices (e.g., a passive accessory versus an active accessory such as a wireless charger) are tuned to respond to different stimulating signals from the NFC reader circuitry, and information about the particular change in magnetic field can be used to determine a particular stimulating signal to be generated by the NFC reader circuitry. At block 4110, process 4100 can receive identification information read from the NFC tag. At block 4112, process 4100 can modify a behavior of portable electronic device 5004 based on the identification information, for example, generating a color wash effect as described above. After block 4112, process 4100 can optionally return to block 4102 to provide continuous monitoring of magnetometer 5080. It should be understood that process 4100 is illustrative and that other processes may be performed in addition to or instead of process 4100.

It will be appreciated that the NFC tag and NFC reader circuits described above are illustrative and that variations and modifications are possible. For example, coil designs can be modified by replacing wound wire coils with etched coils (or vice versa) and solenoidal coils with flat coils (or vice versa). "Wound wire" coils can be made using a variety of techniques, including by winding a wire, by stamping a coil from a copper sheet and molding plastic over the stamped part, or by using a needle dispenser to deposit wire on a plastic part; the wire can be heated so that it embeds into the softened plastic. Etched coils can be made by coating a surface with metal and etching away the unwanted metal. The number of turns in various NFC coils can be modified for a particular application. The choice of wound wire coils or etched coils for a particular device may depend on various design considerations. For instance, in devices that have an internal logic board, a wound wire NFC coil can terminate to the logic board; where a logic board is absent, an etched coil may simplify termination of the coil. Other design considerations may include the Q factor of the coil (a wound coil can provide higher Q in a smaller space) and/or ease of assembly.

Further, where a device that has an NFC tag circuit also has active circuitry (such as wireless charger devices that have active circuitry to control charging behavior), the NFC tag circuit is not limited to being a passive tag; an active NFC tag circuit can be provided to enable two-way communication with a compatible portable electronic device. For example, active NFC circuits in a portable electronic device and a wireless charger device can be used to support delivery of firmware updates to the wireless charger device.

Proximity-detection techniques can also be varied. For example, a different type of magnetometer (e.g., a single-axis magnetometer) can be used, or multiple magnetometers in different locations relative to the magnetic alignment components can be used. In some embodiments, a Hall effect sensor can be used instead of a magnetometer, although false positives may increase because a Hall effect sensor can generally only indicate a change or no-change rather than measuring a magnitude or direction of change.

In these and other embodiments of the present invention, portions of the attachment devices can be conductive. These conductive portions, such as a shield, return plate, backplate, and other portions can be formed using stamping, forging, metal-injection molding, 3-D printing, CNC or other machining, or other manufacturing process. They can be formed of stainless steel, aluminum, or other material.

In these and other embodiments of the present invention, portions of the attachment devices can be nonconductive. These nonconductive portions, such as a housing for the attachment portion, stalk, a contacting surface, and other nonconductive portions, can be formed using injection or other molding, 3-D printing, machining, or other manufacturing process. They can be formed of silicon or silicone, rubber, hard rubber, plastic, nylon, liquid-crystal polymers (LCPs), or other nonconductive material or combination of materials.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A battery pack comprising:
    a housing comprising a contacting surface and an enclosure, the housing supporting:
    a magnet array to magnetically attach the battery pack to an electronic device, the magnet array comprising a plurality of magnets in an annular arrangement;
    a shield fixed to the magnet array;
    a return plate magnetically attracted to the shield and the magnet array, the return plate fixed to the housing, wherein the magnet array and the shield separate from the return plate when the battery pack is attached to the electronic device;
    a battery;
    a coil to inductively provide power to the electronic device;
    a connector receptacle to receive power from an external source; and
    control circuitry coupled to the coil, the battery, and the connector receptacle.

2. The battery pack of claim 1 wherein each of the plurality of magnets in the magnet array comprises an inner annular region having a magnetic polarity oriented in a first axial direction;
    an outer annular region having a magnetic polarity oriented in a second axial direction opposite the first axial direction; and
    a non-magnetized central annular region disposed between the inner annular region and the outer annular region.

3. The battery pack of claim 2 wherein the control circuitry is coupled to receive power via the coil and to charge the battery.

4. The battery pack of claim 2 wherein the control circuitry is coupled to receive power from the battery and to provide power to the electronic device using the coil and is further coupled to receive power via the connector receptacle and to charge the battery.

5. The battery pack of claim 4 further comprising an alignment magnet wherein the alignment magnet aligns the battery pack to a surface of the electronic device in a specific orientation.

6. The battery pack of claim 1 further comprising a damper between the shield and the return plate.

7. The battery pack of claim 5 wherein the magnet array and the shield move towards the contacting surface when the battery pack is attached to the electronic device.

8. The battery pack of claim 7 further comprising a damper between the shield and the return plate.

9. The battery pack of claim 8 wherein an outside surface of the enclosure is primarily a first color, the enclosure comprising a scooped portion, wherein the scooped portion is primarily a second color, the second color different than the first color.

10. A battery pack comprising:
    a housing comprising a contacting surface and an enclosure, the housing supporting:

a magnet array to magnetically attach the battery pack to an electronic device;

a shield supporting and attached to the magnet array;

a return plate magnetically attracted to the magnet array and shield;

a damper between the shield and the return plate, a battery;

a coil;

a connector receptacle; and control electronics coupled to the coil, the battery, and the connector receptacle.

11. The battery pack of claim 10 wherein the magnet array and the shield separate from the return plate when the battery pack is attached to the electronic device.

12. The battery pack of claim 11 wherein the damper is attached to the return plate.

13. The battery pack of claim 11 wherein the damper is attached to the shield.

14. The battery pack of claim 11 wherein the damper is formed of foam the magnet array comprises a plurality of rare earth magnets.

15. A battery pack comprising:

a housing comprising a contacting surface and an enclosure, the housing supporting:

a magnet array to magnetically attach the battery pack to an electronic device, the magnet array comprising a plurality of magnets in an annular arrangement;

a shield fixed to the magnet array;

a return plate magnetically attracted to the shield and the magnet array, the return plate fixed to the housing, wherein the magnet array and shield are separable from the return plate;

a battery;

a coil to inductively provide power to the electronic device;

a connector receptacle to receive power from an external source; and control circuitry coupled to the coil, the battery, and the connector receptacle.

16. The battery pack of claim 15 wherein each of the plurality of magnets in the magnet array comprises an inner annular region having a magnetic polarity oriented in a first axial direction;

an outer annular region having a magnetic polarity oriented in a second axial direction opposite the first axial direction; and a non-magnetized central annular region disposed between the inner annular region and the outer annular region.

17. The battery pack of claim 16 further comprising a damper between the shield and the return plate.

18. The battery pack of claim 17 wherein the damper is attached to the return plate.

19. The battery pack of claim 17 wherein the damper is attached to the shield.

20. The battery pack of claim 17 wherein the damper is formed of foam.

* * * * *